United States Patent
Bareman et al.

(10) Patent No.: US 10,273,182 B2
(45) Date of Patent: Apr. 30, 2019

(54) APPARATUS, METHOD, AND PROCESS WITH LASER INDUCED CHANNEL EDGE

(71) Applicant: Gentex Corporation, Zeeland, MI (US)

(72) Inventors: Donald L. Bareman, Zeeland, MI (US); William L. Tonar, Holland, MI (US); Niels A. Olesen, Zeeland, MI (US); Thomas J. Scott, Belmont, MI (US); David J. Cammenga, Zeeland, MI (US); Henry A. Luten, Holland, MI (US); George A. Neuman, Holland, MI (US)

(73) Assignee: GENTEX CORPORATION, Zeeland, MI (US)

( * ) Notice: Subject to any disclaimer, the term of this patent is extended or adjusted under 35 U.S.C. 154(b) by 931 days.

(21) Appl. No.: 14/465,368

(22) Filed: Aug. 21, 2014

(65) Prior Publication Data
US 2014/0363624 A1 Dec. 11, 2014

Related U.S. Application Data

(63) Continuation of application No. 13/956,957, filed on Aug. 1, 2013, now Pat. No. 8,842,358.

(60) Provisional application No. 61/678,137, filed on Aug. 1, 2012, provisional application No. 61/713,929, filed on Oct. 15, 2012.

(51) Int. Cl.
| | |
|---|---|
| C03B 33/00 | (2006.01) |
| C03B 33/09 | (2006.01) |
| G02F 1/157 | (2006.01) |
| C03C 23/00 | (2006.01) |
| G02F 1/153 | (2006.01) |
| G02B 5/08 | (2006.01) |
| C03C 27/10 | (2006.01) |

(52) U.S. Cl.
CPC ........ *C03B 33/091* (2013.01); *C03C 23/0025* (2013.01); *C03C 27/10* (2013.01); *G02B 5/08* (2013.01); *G02F 1/157* (2013.01); *G02F 1/1533* (2013.01); *Y10T 428/24273* (2015.01); *Y10T 428/24355* (2015.01); *Y10T 428/24777* (2015.01)

(58) Field of Classification Search
CPC ........................... B23K 26/382; C03B 33/091
See application file for complete search history.

(56) References Cited

U.S. PATENT DOCUMENTS

| | | | |
|---|---|---|---|
| 5,213,244 A * | 5/1993 | Curtis | G02B 6/243 225/2 |
| 5,928,572 A | 7/1999 | Tonar et al. | |
| 5,998,617 A | 12/1999 | Srinivasa et al. | |

(Continued)

FOREIGN PATENT DOCUMENTS

| | | |
|---|---|---|
| WO | WO-98/42796 A1 | 10/1998 |
| WO | WO-99/02621 | 1/1999 |

(Continued)

*Primary Examiner* — William P Watkins, III
(74) *Attorney, Agent, or Firm* — Foley & Lardner LLP; Bradley D. Johnson

(57) ABSTRACT

An apparatus, method, and process that includes a substantially transparent substrate having a first surface, a second surface, and an edge extending around at least a portion of a perimeter of the substantially transparent substrate, wherein the edge is a laser induced channel edge having enhanced edge characteristics.

18 Claims, 30 Drawing Sheets

(56) References Cited

U.S. PATENT DOCUMENTS

| | | | |
|---|---|---|---|
| 6,020,987 A | 2/2000 | Baumann et al. | |
| 6,037,471 A | 3/2000 | Srinivasa et al. | |
| 6,137,620 A | 10/2000 | Guarr et al. | |
| 6,141,137 A | 10/2000 | Byker et al. | |
| 6,193,912 B1 | 2/2001 | Thieste et al. | |
| 6,241,916 B1 | 6/2001 | Claussen et al. | |
| 6,249,369 B1 | 6/2001 | Theiste et al. | |
| 6,521,862 B1 * | 2/2003 | Brannon | B23K 26/0075 219/121.66 |
| 6,700,692 B2 | 3/2004 | Tonar et al. | |
| 7,372,611 B2 | 5/2008 | Tonar et al. | |
| 7,821,696 B2 | 10/2010 | Tonar et al. | |
| 8,169,684 B2 | 5/2012 | Bugno et al. | |
| 8,201,800 B2 | 6/2012 | Filipiak | |
| 8,210,695 B2 | 7/2012 | Roth et al. | |
| 8,264,761 B2 | 9/2012 | Cammenga et al. | |
| 2002/0015214 A1 | 2/2002 | Nishikitani et al. | |
| 2007/0176181 A1 * | 8/2007 | Kusunoki | B28D 5/0011 257/79 |
| 2009/0296190 A1 | 12/2009 | Anderson et al. | |
| 2010/0033857 A1 | 2/2010 | Filipiak | |
| 2010/0147813 A1 * | 6/2010 | Lei | C03B 33/082 219/121.72 |
| 2010/0277786 A1 | 11/2010 | Anderson | |
| 2011/0049765 A1 * | 3/2011 | Li et al. | B29C 35/08 264/400 |
| 2011/0317241 A1 | 12/2011 | Cammenga et al. | |
| 2012/0218655 A1 | 8/2012 | Steel et al. | |
| 2012/0218656 A1 | 8/2012 | Roth et al. | |
| 2012/0229882 A1 | 9/2012 | Fish et al. | |
| 2012/0268961 A1 | 10/2012 | Cammenga et al. | |
| 2012/0327234 A1 | 12/2012 | Fish et al. | |
| 2013/0062497 A1 | 3/2013 | Van Huis et al. | |
| 2013/0170013 A1 | 7/2013 | Tonar et al. | |
| 2013/0194650 A1 | 8/2013 | Roth et al. | |
| 2014/0063630 A1 | 3/2014 | Busscher et al. | |
| 2017/0028505 A1 * | 2/2017 | Hosseini | B23K 26/0057 |

FOREIGN PATENT DOCUMENTS

| | | |
|---|---|---|
| WO | WO-2009/103313 | 8/2009 |
| WO | WO-2012/006736 | 1/2012 |

* cited by examiner

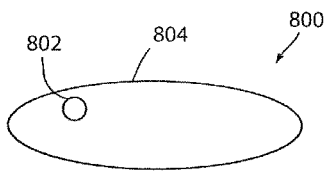
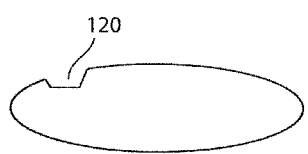
FIG. 8  FIG. 9
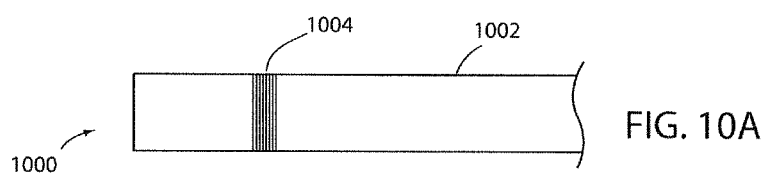
FIG. 10A
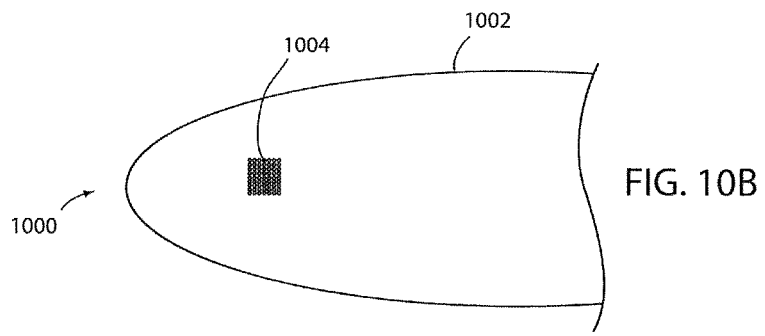
FIG. 10B
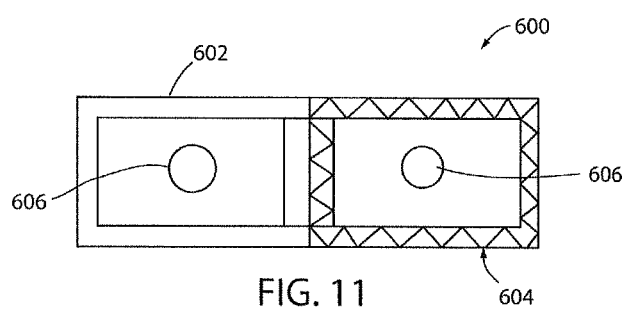
FIG. 11

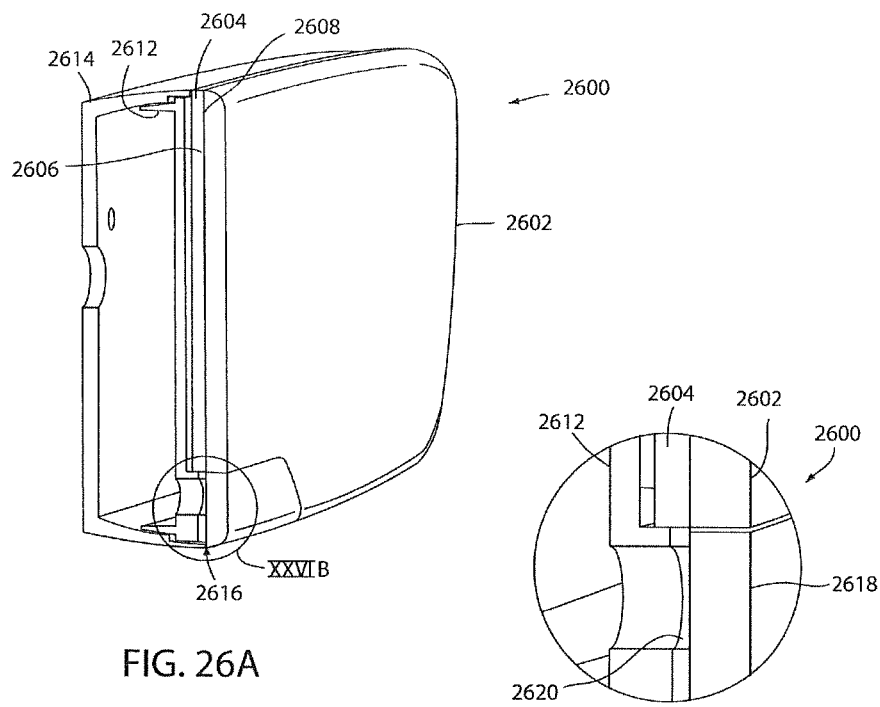
FIG. 26A
FIG. 26B
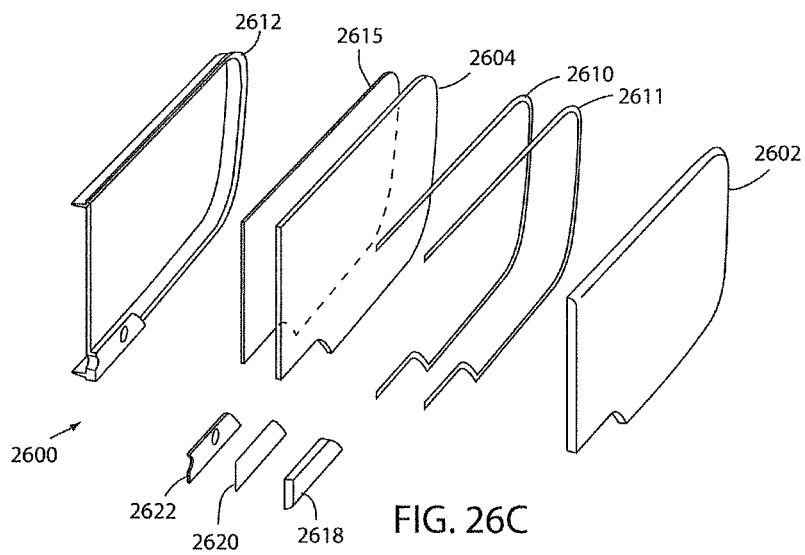
FIG. 26C

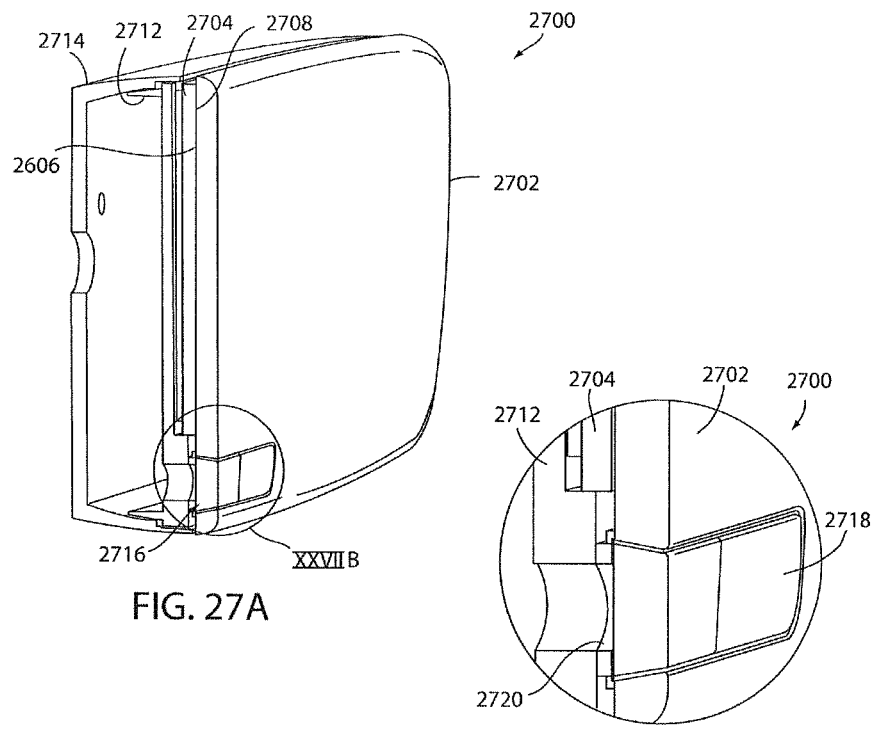
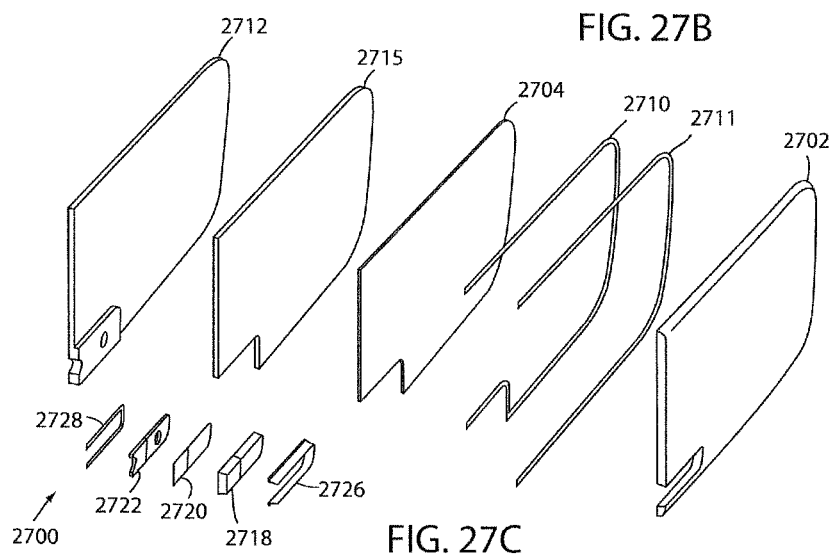

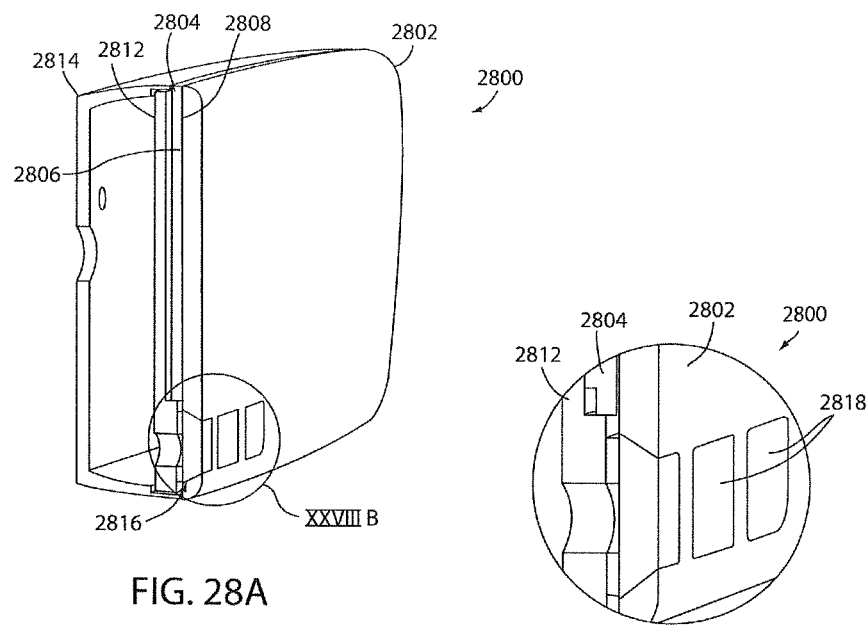
FIG. 28A
FIG. 28B
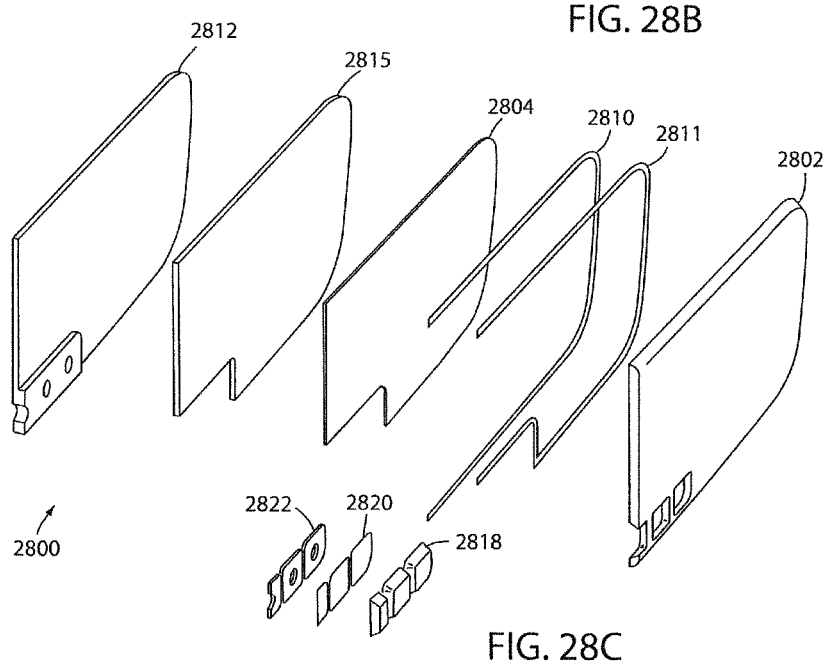
FIG. 28C

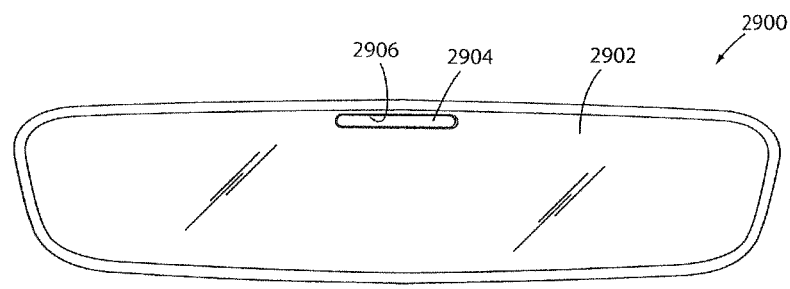
FIG. 29A
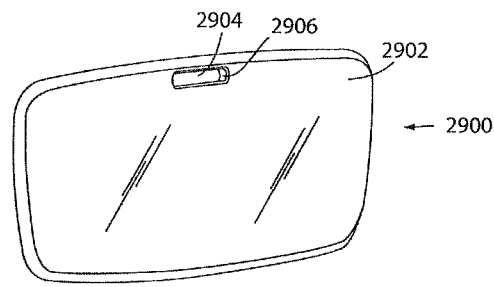
FIG. 29B
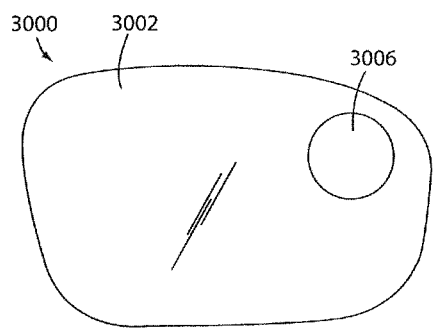
FIG. 30A
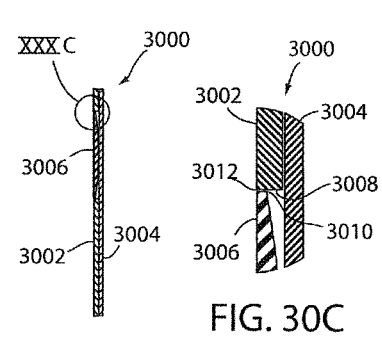
FIG. 30B
FIG. 30C

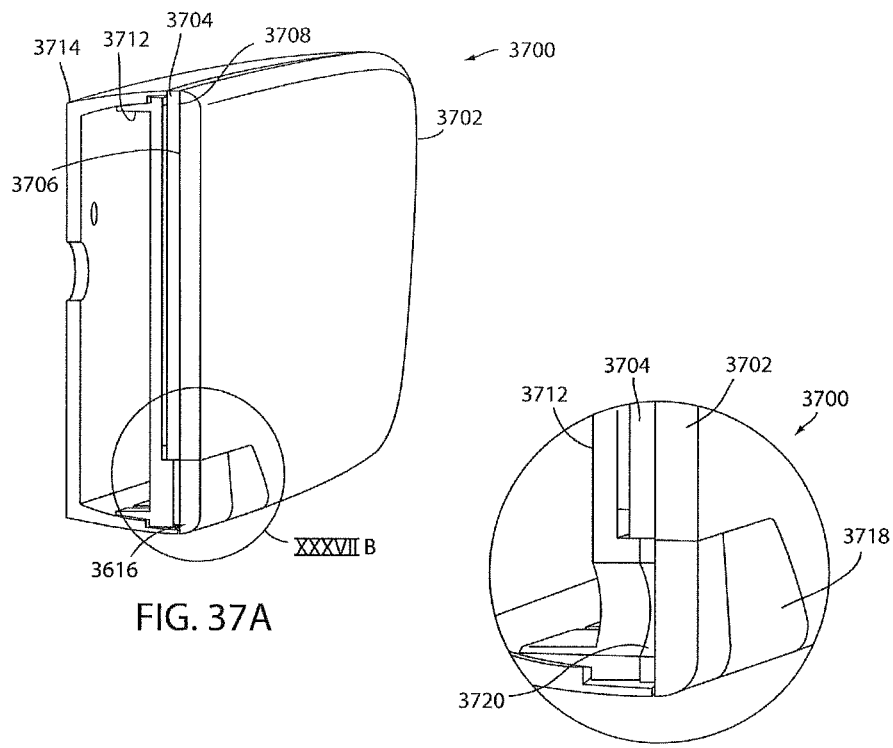
FIG. 37A
FIG. 37B
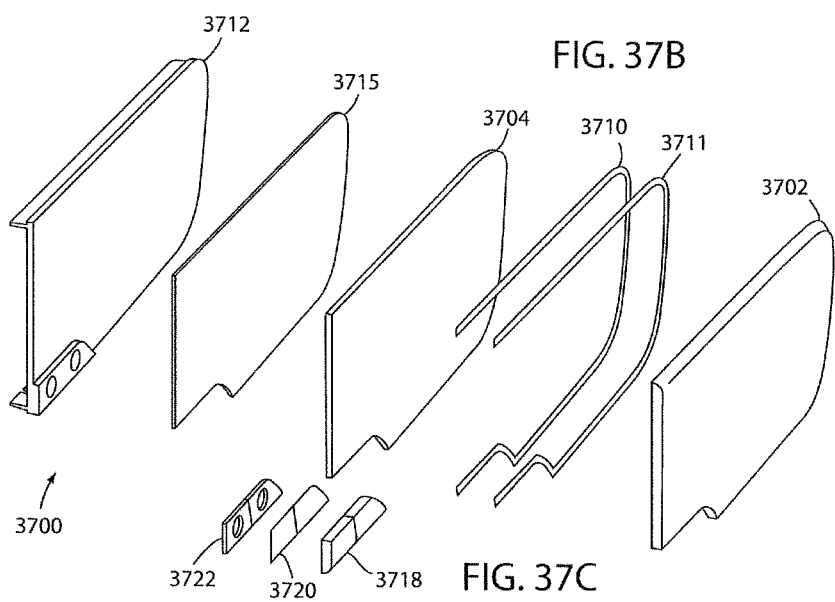
FIG. 37C

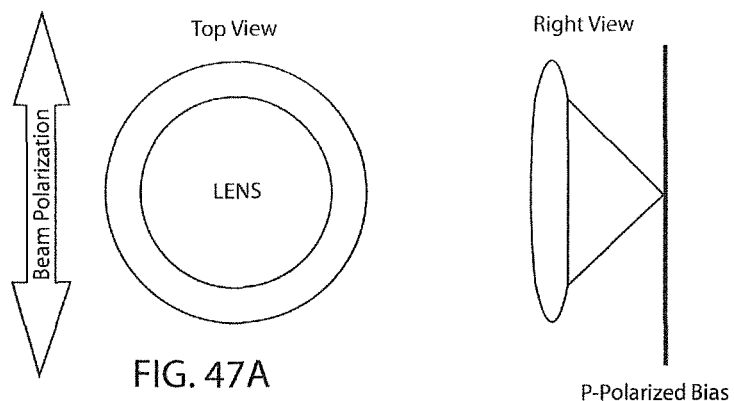
FIG. 47A
FIG. 47B
FIG. 47C
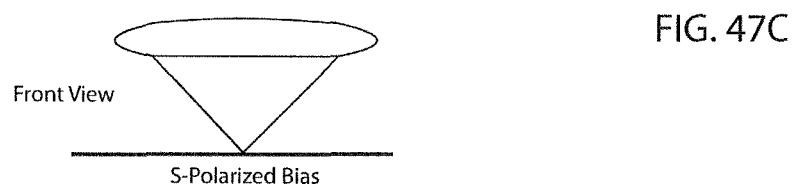
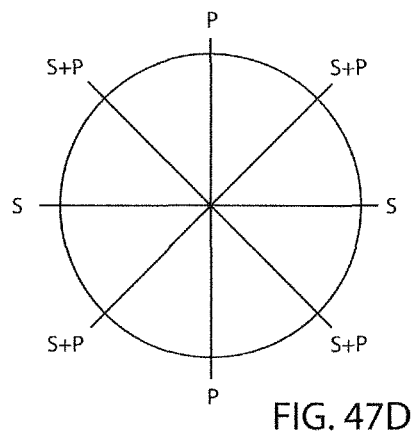
FIG. 47D
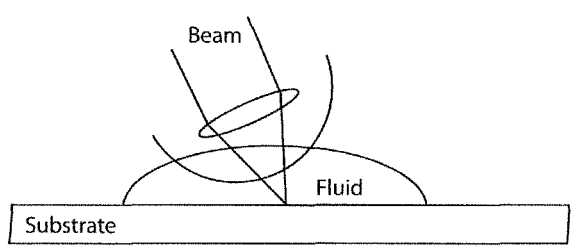
FIG. 48

APPARATUS, METHOD, AND PROCESS WITH LASER INDUCED CHANNEL EDGE

CROSS-REFERENCED TO RELATED APPLICATION

This application is a continuation of U.S. patent application Ser. No. 13/956,957, filed on Aug. 1, 2013, which claims the benefit of U.S. Provisional Patent Application No. 61/678,137, filed on Aug. 1, 2012, and U.S. Provisional Patent Application No. 61/713,929, filed on Oct. 15, 2012, and the entire content of each listed application is hereby incorporated by reference.

FIELD OF THE INVENTION

The present invention generally relates to a laser induced channel assembly and method thereof, and more particularly, an assembly comprising a substantially transparent substrate having laser induced channels and method thereof.

BACKGROUND OF THE INVENTION

In many mirror products today a very uniform fit between the edge of the glass shape and the surrounding flush mounted bezel or housing is desired to produce an aesthetically pleasing product. A large or non-uniform gap between the glass edge and the bezel or housing is unsightly. A uniform gap produces a smooth, pleasing seamless transition between the bezel or housing and the mirror element. In a traditional scribe and break process the score or scribe line of the desired glass shape can be placed very accurately but the subsequent breaking process produces an uneven glass edge. The glass "grows" in size because the uneven edge has peaks and valleys in close proximity and the peaks add to the overall size of the glass shape. The appearance of the shiny, non-uniform glass edge is undesirable because of its non-uniform reflection of light. A smooth, frosty edge appearance can be obtained by additional post seaming or grinding the glass. Enough glass must be removed to frost or smooth all of the deep valleys created during the glass separation process. This results in the glass shape being undersized relative to the scribed shape. Because of tool wear and inconsistent removal rate of glass over time, the size of the final glass shape changes with time. As a result a tight consistent glass fit to a bezel or housing is difficult to maintain. Glass can also be cut using a high pressure water jet process. In this process a high pressure jet of water loaded with abrasive particles traverses along a path and erodes away the glass as it travels. The final glass shape and size is dependent on many variables: The diameter of the jet, the water pressure, the size and distribution of abrasive particles, jet traverse speed. Maintaining a consistent accurate shape over time is difficult. The high pressure impingement can also chip and damage the glass edge. More material is removed from the water jet entrance side of the glass than the exit side of the glass resulting in an edge with a tapered erosion pattern. This also negatively impacts shape cut accuracy and edge appearance. Grinding, seaming and water jet shaping of glass abrades the glass away by removing chips or particles of glass. As a result the finished glass piece has chips or particles of glass that are loosely attached and can be dislodged is subsequent handling operations. This is undesirable if subsequent processing operations are sensitive to particulate contamination.

As mentioned above, it is often aesthetically desirable to have a frosty or smooth shiny/polished glass edge. A frosty edge can be achieved by grinding or seaming the glass edge, acid etching the glass edge or coating the glass edge with a paint or coating that produces a frosty appearance. A grinding or seaming process produces a frosty edge by roughening the glass surface through a process of mechanically "fracturing" small particles off of the glass surface using a harder than glass abrasive media. The glass cracking and fracturing damage penetrates a substantial depth into the glass creating a less than ideal surface full of defects. These defects create weak spots in the glass that can cause the glass to break when stresses thermally or mechanically. Acid etch frosting requires exposing the glass to a corrosive material that presents safety hazards when handled in bulk in a production environment. Painting the glass edge requires additional coating and curing processing steps.

SUMMARY OF THE INVENTION

According to an embodiment, an apparatus includes a transparent substrate having oppositely facing surfaces. The apparatus also includes a laser induced channel edge extending between the oppositely facing surfaces of the transparent substrate. The laser induced channel edge includes a plurality of spaced apart laser induced channels located between the oppositely facing surfaces. At least a portion of the laser induced channel edge forms an oblique angle with one or both of the oppositely facing surfaces.

According to an embodiment, a method includes the steps of: providing a transparent substrate comprising oppositely facing surfaces; forming a plurality of laser induced channels in the transparent substrate between said oppositely facing surfaces and spaced apart along a cutting path; and separating the transparent substrate into pieces along the cutting path to form a laser induced channel edge with essentially zero kerf.

These and other features, advantages, and objects of the present invention will be further understood and appreciated by those skilled in the art by reference to the following specification, claims, and appended drawings.

BRIEF DESCRIPTION OF THE DRAWINGS

The present invention will become more fully understood from the detailed description and the accompanying drawings, wherein:

FIG. 8 is a front view of a rearview assembly, accordance with an embodiment of the present invention;

FIG. 9 is a front view of a rearview assembly, in accordance with an embodiment of the present invention;

FIG. 10A is a cross-sectional view of a substrate, in accordance with an embodiment of the present invention;

FIG. 10B is a front view of the substrate of FIG. 10A;

FIG. 11 is front view of a substrate having buttons, in accordance with an embodiment of the present invention;

FIGS. 26A and 26B are cross-sectional views of a rearview assembly, in accordance with an embodiment of the present invention;

FIG. 26C is an exploded view of the rearview assembly of FIG. 26A;

FIGS. 27A and 27B are cross-sectional views of a rearview assembly, in accordance with an embodiment of the present invention;

FIG. 27C is an exploded view of the rearview assembly of FIG. 27A;

FIGS. 28A and 28B are cross-sectional views of a rearview assembly, in accordance with an embodiment of the present invention;

FIG. 28C is an exploded view of the rearview assembly of FIG. 28A

FIG. 29A is a front view of a rearview assembly having a slot in a substrate, in accordance with an embodiment of the present invention;

FIG. 29B is a perspective view of the rearview assembly of FIG. 29A;

FIG. 30A is a front view of a rearview assembly having an auxiliary substrate, in accordance with an embodiment of the present invention;

FIGS. 30B and 30C are cross-sectional views of the rearview assembly of 30A, in accordance with an embodiment of the present invention;

FIGS. 37A and 37B are cross-sectional views of a rearview assembly, in accordance with an embodiment of the present invention;

FIG. 37C is an exploded view of the rearview assembly of FIG. 37A;

FIGS. 47A-47D are illustrations of light being focused by a lens in a conical pattern;

FIG. 48 is an illustration of an assembly having a medium between a laser optic and a substrate, in accordance with an embodiment of the present invention;

DETAILED DESCRIPTION

Figure 1:
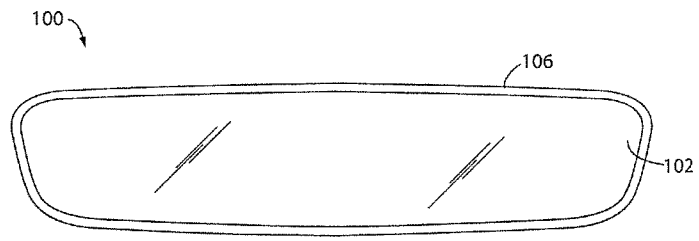
FIG. 1 is a front view of a rearview mirror assembly, in accordance with an embodiment of the present invention.

The present illustrated embodiments reside primarily in combinations of method steps and apparatus components related to a laser induced channel assembly and method thereof. Accordingly, the apparatus components and method steps have been represented, where appropriate, by conventional symbols in the drawings, showing only those specific details that are pertinent to understanding the embodiments of the present invention so as not to obscure the disclosure with details that will be readily apparent to those of ordinary skill in the art having the benefit of the description herein. Further, like numerals in the description and drawings represent like elements.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

According to at least one embodiment, a laser system can be used to form one or more laser induced channels in a substantially clear substrate. A plurality of laser induced channels can be formed in the substantially clear substrate, such that the substrate can be severed into multiple pieces in a desired shape. Additionally, once separated into small pieces, laser induced channels, which now are the edge, have enhanced edge characteristics, such as, but not limited to, enhanced edge strength and reduced roughness as compared with edges that are formed by prior art cutting or separating systems/methods, material change, etc. Thus, one advantage is that the laser induced channel edge does not require further processing to smooth the edge and/or increase the edge strength. Typically, these laser induced channel edges substantially do not contain particulates that can be dislodged during subsequent processing.

By way of explanation and not limitation, the laser induced channels can be formed in a substantially clear substrate in a desired shape, such as, but not limited to, the shape of the mirror from the larger glass substrate or larger glass lamination. After separating (e.g., breaking, venting, etc.), the substantially transparent substrate has a straight or angled laser induced channel edge (e.g., smooth edge) that can be placed as accurately as a score line on glass without requiring shape altering post processing operations. The substantially transparent substrate, when separated along a path of adjacent laser induced channels, has an edge that even though it is severed and separated from a single sheet of substantially transparent material, can have at least one of the following an enhanced edge strength, a reduced damaged area from the edge extending inwards of the substantially transparent material, a reduced roughness, reduced tendency to shed particulates, essentially zero kerf such that the cut or shape is essentially the same as the cutting path (e.g., essentially equal can be zero or essentially zero kerf), the like, or a combination thereof, as described in greater detail herein.

Figure 25A:
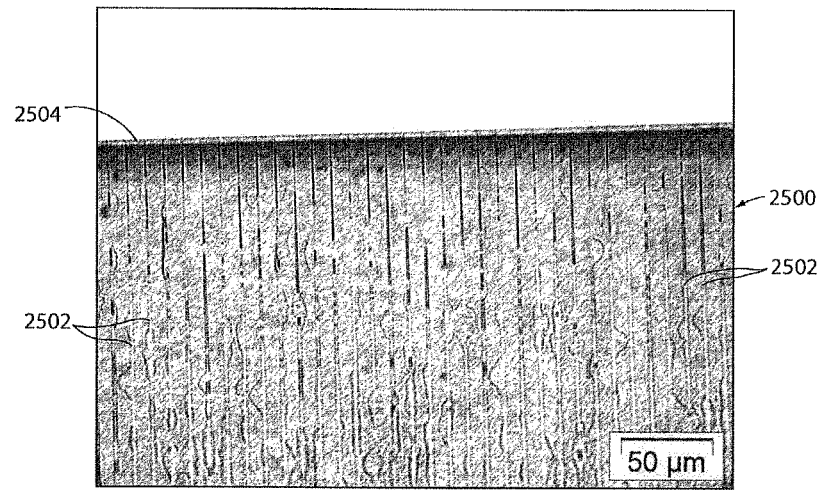
FIG. 25A is an illustration of a substrate having a surface where a laser enters the substrate to form laser induced channels, in accordance with an embodiment of the present invention.
Figure 25B:
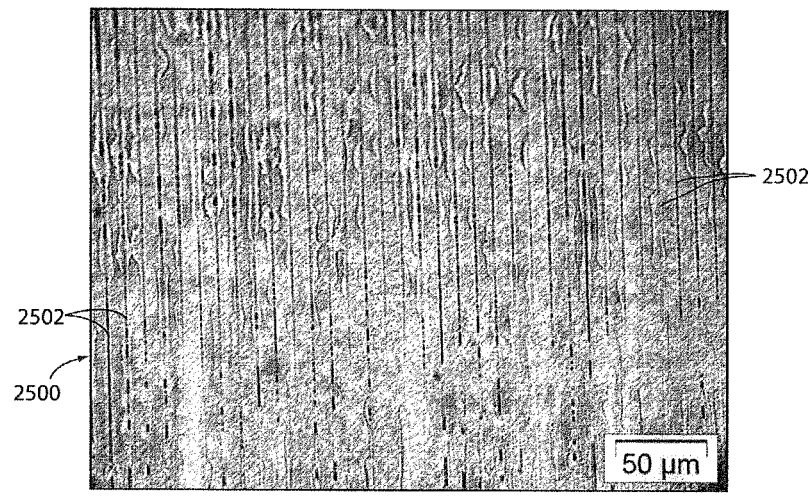
FIG. 25B is an illustration of a middle of the substrate of FIG. 25A.
Figure 25C:
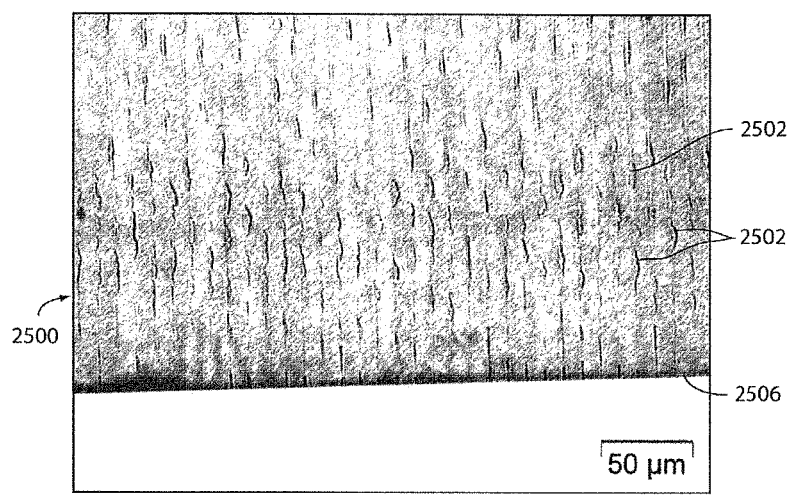
FIG. 25C is an illustration of a surface of the substrate of FIG. 25A that is opposite the entry surface.

In regards to FIGS. 25A-25C, a substrate 2500 can include a plurality of laser induced channels 2502. At least a portion (e.g., all) of the plurality of laser induced channels 2502 can be continuous channels extending from a surface 2504 where the laser enters the substrate 2500 to a depth in the substrate 2500 distant from the entry surface 2504. The laser induced channels can be continuous, in that there are no areas within a channel (or segment) that do not have a material or physical change. The laser damaged channels 2502 can extend from the entry surface 2504 to any depth of the substrate 2500 including through the substrate 2500 to a surface 2506 opposite the entry surface 2504, either alone or in combination with another laser induced channel. Additionally or alternatively, the laser induced channels 2502 can be approximately uniformly spaced from one another, except for start/stop area, as described herein. For example, the laser induced channels can be spaced approximately 5 microns apart, approximately 10 microns apart, etc.

Typically, the transparency of the substantially transparent substrate having at least one laser induced channel edge, as described herein, is based upon the wavelength of light emitted by a laser that is used to form the one or more laser induced channels. For example, a first material can be transparent to a first wavelength of light but a second material may not be transparent to the first wavelength of light, yet the second material can be transparent to a second wavelength of light. Both materials in such an example can be substantially transparent, according to an embodiment.

For purposes of explanation and not limitation, the substantially transparent substrate can be glass (e.g., soda-lime float glass, EAGLE glass, alkaline earth boro-aluminosilicate glass, GORILLA glass, alkali-aluminosilcate glass, chemically strengthened glass, insulated glass, tempered glass), sapphire, silicon, silicon carbide, compound semiconductor, optical crystals, liquid crystal substrate, diamond, quartz, and ceramic.

For example, to separate a small piece of substantially transparent material from a large piece, a series of laser induced channels are formed, wherein each laser induced channel can extend from approximately a top surface of the material to the bottom surface of the material. The laser induced channels can be formed in the substrate in a pattern inhere the material is to be separated. The laser induced channels can have a diameter ranging from and including approximately 0.5 microns to approximately 10 microns, ranging from and including approximately 0.5 microns to approximately 3 microns, or a combination thereof. Additionally or alternatively, the laser induced channels can be spaced ranging from and including approximately 0.3 microns to approximately 100 microns, ranging from and including approximately 1.5 microns to approximately 10 microns, or a combination thereof.

One example of an enhanced edge characteristic of a laser induced channel edge is the reduced roughness of the edge. In regards to FIG. 44, the roughness of a laser induced channel edge across the thickness can be an Rq value of less than approximately 1.6, an Rq value of less than approximately 1.5, an Rq value of less than approximately 1.3, an Rq value of less than approximately 1.2, an Rq value ranging from and including approximately 0.9 to approximately 1.6, an Rq value ranging from and including approximately 1.0 to approximately 1.5, an Rq value ranging from and including approximately 1.1 to approximately 1.4, an Rq value of approximately 1.16, or a combination thereof. Such exemplary roughness measurements for a laser induced channel edge are smoother than prior art rough ground edges (e.g., ground edge outside electrochromic mirror) which have Rq values of greater than 1.66. One such prior art example had Rq values ranging from 1.6674 microns to 2.1463. In such a prior art example a grinder having a 230/270 grit can be used.

Figure 44:
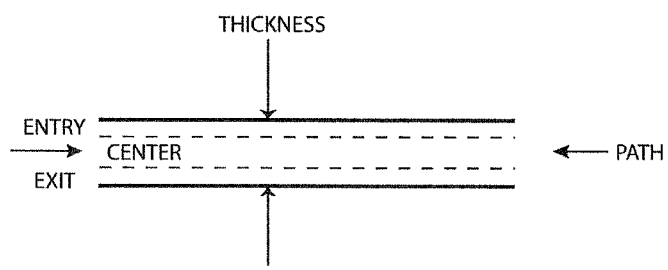
FIG. 44 is a diagram illustrating a thickness and path orientations of an edge of a substrate.

With continued referenced to FIG. 44, additionally or alternatively, the roughness of a laser induced channel edge when measured along the path can vary depending upon where in the thickness the measurement is taken (e.g., a first or entry portion wherein the laser beam enters the substantially transparent substrate, a second or center portion of the substantially transparent substrate, a third or exit portion that is opposite the first portion (depending upon a depth of the laser induced channel, the laser induced channel can extend through the surface of the substantially transparent substrate, etc.). The first portion of the laser induced channel edge can have an Rq value of less than approximately 1.0, an Rq value of less than approximately 0.9, an Rq value of less than approximately 0.8, an Rq value of less than approximately 0.7, an Rq value ranging from and including approximately 0.5 to approximately 1, an Rq value ranging from and including approximately 0.6 to approximately 0.9, an Rq value of approximately 0.69, or a combination thereof. The second portion of the laser induced channel edge can have an Rq value of less than approximately 1.6, an Rq value of less than approximately 1.5, an Rq value of less than approximately 1.4, an Rq value ranging from and including approximately 1.0 to approximately 1.6, an Rq value ranging from and including approximately 1.1 to approximately 1.5, an Rq value ranging from and including approximately 1.2 to approximately 1.4, an Rq value of approximately 1.34, or a combination thereof. The third portion of the laser induced channel edge can have an Rq value of less than approximately 1.5, an Rq value of less than approximately 1.0, an Rq value of less than approximately 0.9 microns, an Rq value ranging from and including approximately 0.6 to approximately 1.5, an Rq value ranging from and including approximately 0.7 to approximately 1.1, an Rq value ranging from and including approximately 0.8 to approximately 1.0, an Rq value of approximately 0.85, or a combination thereof. Thus, the first, second, and third portions can each have different roughness's, or two of the first, second, and third portions can have approximately similar roughness's that differ from the other remaining portion. The Rq value of each of the first, second, and third portions can be depended upon the thickness of the glass. Example thicknesses range from about 0.95 mm to about 3 mm. Typically, the path can be substantially perpendicular to the laser induced channels.

Figure 54A:
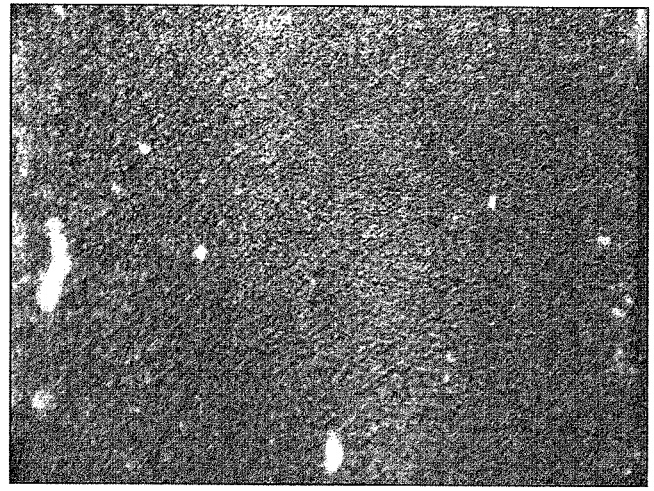
FIG. 54A is an illustration of light reflected by a laser induced channel edge, in accordance with an embodiment of the present invention.
Figure 54B:
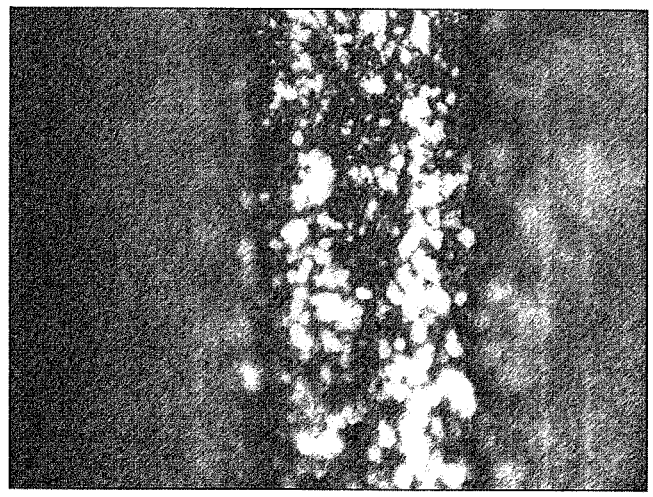
FIG. 54B is an illustration of light reflected by a scribed edge.

With respect to FIGS. 54A and 54B, an edge of a substrate that has been ground has a significantly greater amount of deformations (e.g., chips, breaks, etc.) than a laser induced channel edge. As illustrated in FIG. 54A there is minimal light reflection of a laser induced channel edge, wherein a ground edge reflects light due to the amount of deformations in the surface, as illustrated in FIG. 54B. One example of a prior art ground edge for a rearview mirror is to have approximately 230 deformations per 1.75 $mm^2$. The laser induced channel edge can have less than approximately 220 deformations per 1.75 $mm^2$, less than approximately 200 deformations per 1.75 $mm^2$, less than approximately 150 deformations per 1.75 $mm^2$, less than approximately 100 deformations per 1.75 $mm^2$, less than approximately 50 deformations per 1.75 $mm^2$, ranging between and including 50 chips and 220 deformations per 1.75 $mm^2$, ranging from and including 50 deformations and 200 deformations per 1.75 $mm^2$, ranging from and including 50 deformations and 150 deformations per 1.75 $mm^2$, ranging from and including 50 deformations and 100 chips per 1.75 $mm^2$, or a combination thereof. It should be appreciated by those skilled in the art that edge roughness can be related to laser parameters.

Figure 43:
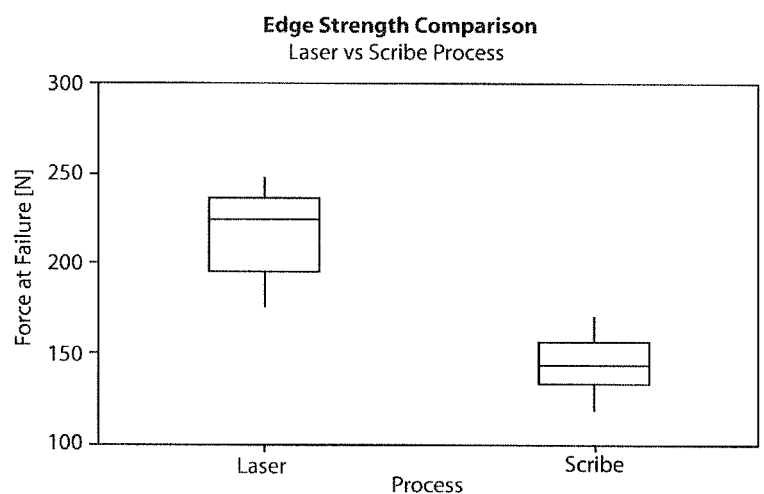
FIG. 43 is a chart illustrating an example of a failure force comparison for a laser induced channel edge and a scribed edge.

One example of illustrating the enhanced edge characteristics of a substantially transparent substrate that includes an edge formed by one or more laser induced channels is comparing the laser induced channel edge to a scribed or cleaved edge using a four-point bend test apparatus based on American Society for Testing and Materials (ASTM) specification C 158-02. The samples were subject to bending perpendicular to their longest dimension, and compressed at a rate of approximately 5 mm/min until failure. As illustrated in FIG. 43, the maximum force before failure for the scribed edge is about 172N whereas the laser induced channel edge typically failed between approximately 175N and approximately 248N. Thus, a device having a substantially transparent substrate that includes at least one laser induced channel edge can have a failure force of greater than approximately 175N, greater than approximately 185N, ranging from and including approximately 175N to approximately 300N, ranging from and including approximately 175N to approximately 250N, ranging from and including approximately 185N to approximately 235N, or a combination thereof.

Figure 24:
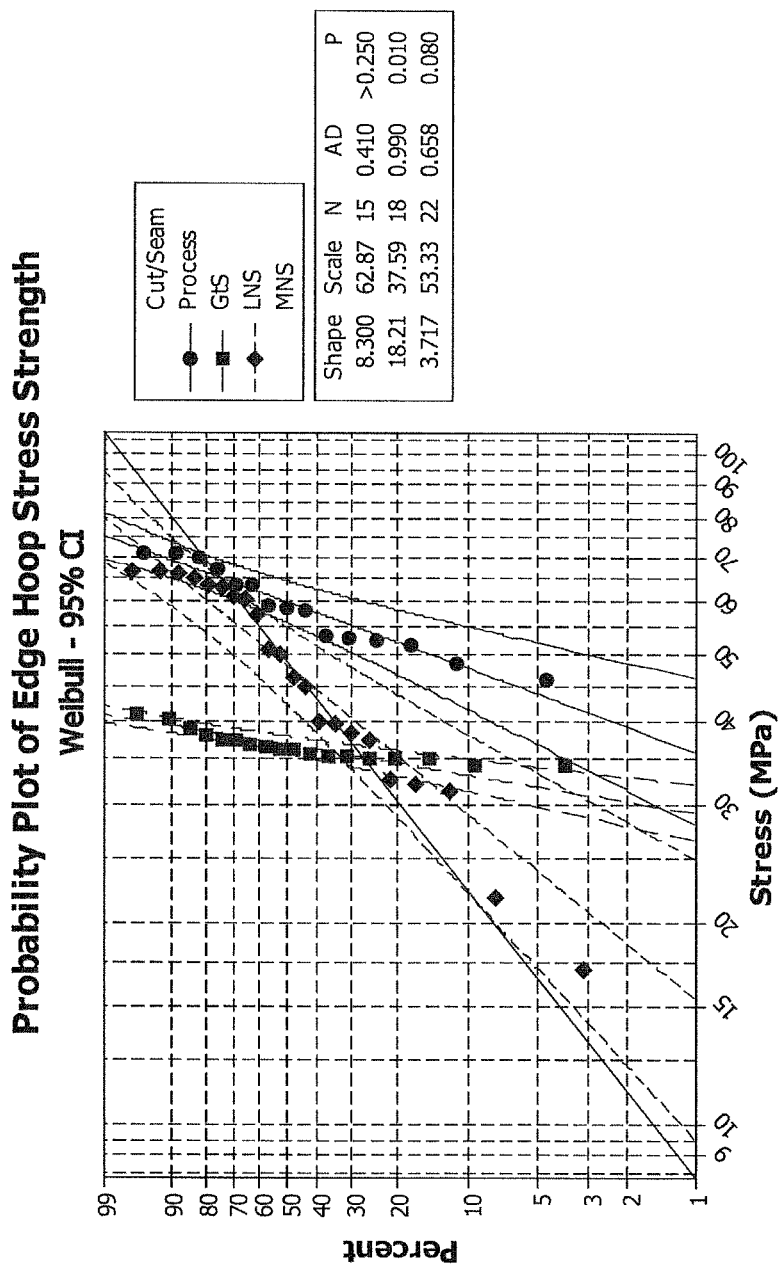
FIG. 24 is a chart illustrating probability of edge hoop stress strength.

A substrate having at least one laser induced channel edge can have a more consistent hoop stress strength when evaluating a plurality of samples, as compared to substrates having other types of edges (e.g., ground edge, mechanical cut edge without seaming, etc.). Thus, when a sample of substrates having at least one laser induced channel edge are subject to a test to determine edge hoop stress strength, the laser induced channel substrates typically fail around the same value (e.g., ranging from and including approximately 32 MPa to 42 MPa). As illustrated in FIG. 24, the slope of the line representative of the data relating to parts with a laser induced channel edge is about 18.2.

Substrates that do not have a laser induced channel edge, such as grind to size substrates and mechanically cut substrates that are not seamed, are less consistent with their failure stress. As illustrated in FIG. 24, when a sample of grind to size substrates are subject to a test to determine edge hoop stress strength, the grind to size substrates typically fail between about 45 MPa and 75 MPa or have a slope of about 8.3. When a sample of mechanical cut substrates that are not seamed are subject to a test to determine edge hoop stress strength, the mechanically cut substrates that are not seamed typically fail between about 17 MPa and 68 MPa, or have a slope of about 3.7. According to at least one embodiment, a substrate having at least one laser induced channel edge can have a hoop stress probability slop of greater than approximately 8.5, greater than approximately 10, greater than approximately 15, approximately 18.21, or a combination thereof.

Such exemplary hoop stress characteristics can be an enhanced edge characteristic. Any apparatus, part, or substrate described herein that has at least one laser induced channel edge can such hoop stress characteristics, according to at least one embodiment According to at least one embodiment, the separated pieces of material (e.g., substrate) can have reduced or minimum kerf, such that there is essentially no divergence in the kerf area. By way of explanation and not limitation, the kerf zone, approximately 4 micrometers wide, follows the laser induced channel path through the thickness (e.g., a desired depth) of the substrate with limited or no detectable divergence. This can result in parts with very precise finished dimensions, both in terms of size and edge geometry, such that parts can be produced with no additional processing steps required. According to at least one embodiment, shapes having laser induced channel edges that were separated from a larger piece of substrate can fit together precisely. Further, shapes with adjoining laser induced channel edges can be coated with an adhesive (e.g., glue), such that diffused laser induced channel edges can bond together and become essentially non-light scattering and appear as a single fused piece.

According to at least one embodiment, essentially zero kerf can be an enhanced edge characteristic. Any apparatus, part, or substrate described herein that has at least one laser induced channel edge can have essentially zero kerf, according to at least one embodiment.

Figure 49:
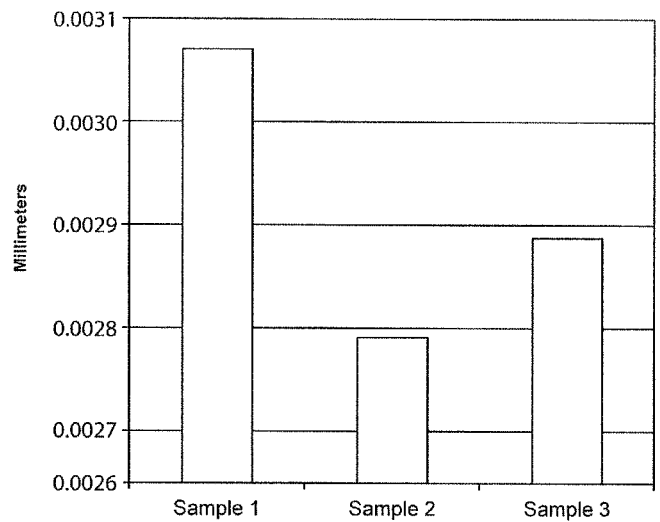
FIG. 49 is a chart illustrating a size difference of a part and an inverse having a laser induced channel edge, in accordance with an embodiment of the present invention.

For purposes of explanation and not limitation, the essentially zero kerf of a substrates being separated from a portion (e.g., interior portion) of a substrate (e.g., lite, inverse of part, etc.), wherein the part has at least one laser induced channel edge can be demonstrated by measuring the part and the inverse and comparing the differences in dimensions. One such measurement test can be to measure about 160 points on a Coordinate Measuring Machine (CMM) to evaluate a 2D profile shape to a CAD model, take measurements on the substrate and the inverse shape that was created when the substrate was removed, and compare the measurements to each other to determine the amount of stock loss created by the laser induced channel process. With respect to FIG. 49, the difference is size of three samples were less than approximately 0.0031 mm. According to at least one embodiment, essentially zero kerf can be less than approximately 0.005 mm, less than approximately 0.004 mm, less than approximately 0.0035 mm, or less than approximately 0.0031 mm. The parts having at least one laser induced channel edge described herein can have essentially zero kerf, according to at least one embodiment.

Figure 50:
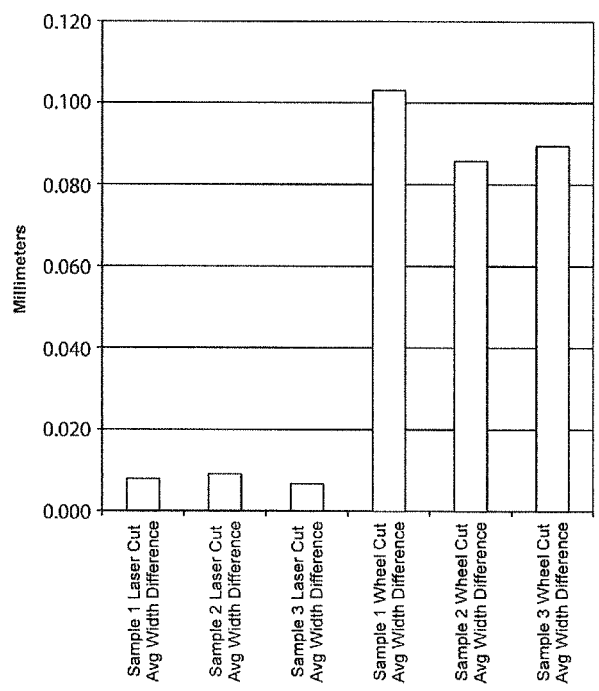
FIG. 50 is a chart illustrating a comparison of a width difference with wheel cut edges and laser induced channel edges, in accordance with an embodiment of the present invention.

Essentially zero kerf of a substrate having a laser induced channel edge can also be demonstrated by taking width measurements on an approximately 25 mm wide substrate strip with a CMM, wherein the substrates are measured at two steps of processing, were cut using two different methods, and compared. First, using CMM with vision capabilities, the "cut" lines can be checked before the substrates are separated. Next, the parts can be measured with a CMM using a cylindrical touch probe after the parts were separated from each other. A width measurement can be taken about every 1 mm over a length of approximately 100 mm. The measurements for each cutting process, before and after separation, can be compared to each other to determine the differences. With respect to FIG. 50, the width distance of parts cut using a prior art wheel technique have a difference of 0.086 mm or greater. According to at least one embodiment, essentially zero kerf can be width difference of less than 0.086 mm, less than approximately 0.080 mm, less than approximately 0.060 mm, less than approximately 0.040 mm, less than approximately 0.020, or less than approximately 0.010 mm.

Figure 51:
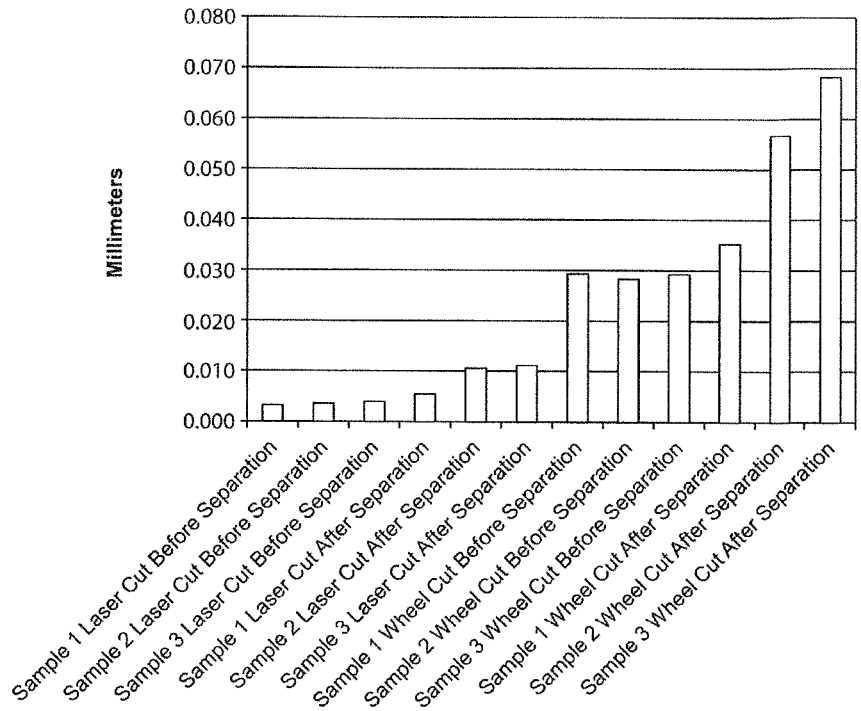
FIG. 51 is a chart illustrating a comparison of edges before and after separation formed by wheel cut and laser induced channels, in accordance with an embodiment of the present invention.

According to at least one embodiment, a laser induced channel edge can be straighter than an edge cut with a prior art technique. One example is to measure points about every 1 mm on a substrate cut line over a distance of about 100 mm with a CMM. The parts can be measured at two steps of processing and cut using two different methods. First, using CMM with vision capabilities before the parts are separated. Next, the parts can be measured with a CMM using a cylindrical touch probe after the parts are separated from each other. The measurements for each cutting process, before and after separation, can then be compared to each other to determine the differences. To generate the straightness value for each cut edge the deviation of each measure point from the measured line can be calculated, and the difference between the approximate maxim and approximate minimum deviation can be the straightness value. Such a measurement test can be completed as described the American Society of Mechanical Engineers (ASME) standards for straightness measurements. In regards to FIG. 51, an approximately 25 mm wide substrate strip cut by a wheel has straightness of 0.028 mm or greater prior to separation and 0.035 mm or greater after separation. A 25 mm wide substrate strip can have a straightness of the laser induced channel edge prior to separation of less than approximately 0.025 mm, less than approximately 0.020 mm, less than approximately 0.010 mm, or less than approximately 0.004 mm. An approximately 25 mm wide substrate strip can have a straightness of the laser induced channel edge after separation of less than approximately 0.033 mm, less than approximately 0.030 mm, less than approximately 0.025 mm, less than approximately 0.020 mm, less than approximately 0.015 mm, or less than approximately 0.012 mm. Any apparatus, part, or substrate having at least one laser induced channel edge described herein can have a straightness within the above values, according to at least one embodiment. Such straightness can be an enhanced edge characteristic, according to at least one embodiment.

Figure 52:
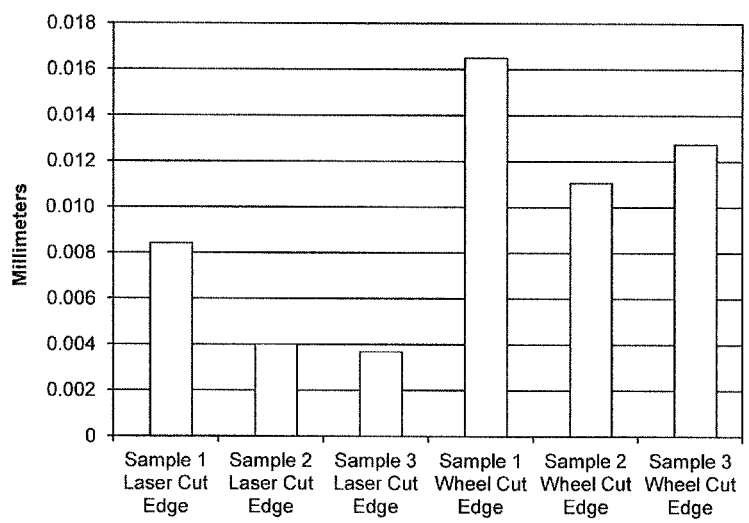
FIG. 52 is a chart illustrating comparison of wheel cut edges and laser induced channel edges, in accordance with an embodiment of the present invention.

Another example of measuring straightness of an edge is to measure points about every 50 microns on an edge over the thickness of the substrate with the exclusion of 0.1 mm from each surface with a CMM. The edge straightness can be measured at three locations on each side of the substrate. The substrates can be cut using different methods, and the measurements for each cutting process can then be compared to determine the differences. To determine the straightness value for each cut edge, the deviation of each measure point from the measured line can be calculated. The difference between the approximate maximum and approximate minimum deviation can be the straightness value. Such a measurement test can be completed as described the ASME standards for straightness measurements. With respect to FIG. 52, an approximately 25 mm wide substrate strip cut by a wheel has a straightness of 0.011 or greater. An approximately 25 mm wide substrate strip having a laser induced channel edge can have a straightness of less than approximately 0.010, less than approximately 0.008 mm, less than approximately 0.006 mm, or less than approximately 0.004 min. Any apparatus, part, or substrate having at least one laser induced channel edge described herein can have a straightness within the above values, according to at least one embodiment. Such straightness can be an enhanced edge characteristic, according to at least one embodiment.

Figure 53:
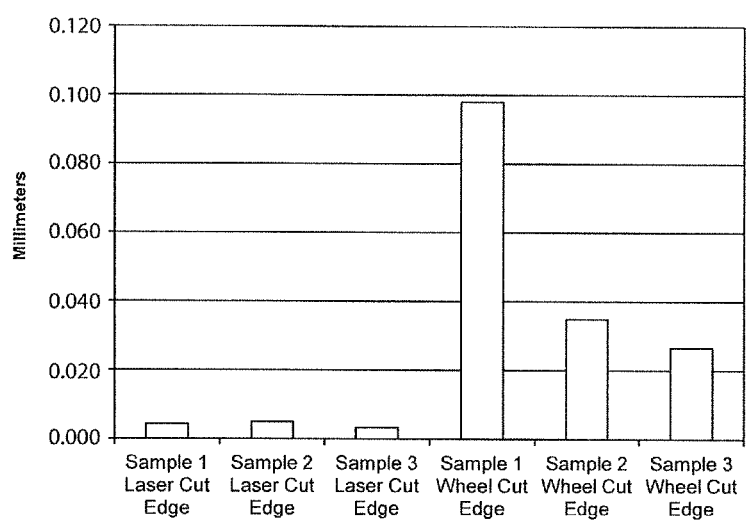
FIG. 53 is a chart illustrating a comparison of wheel cut edges and laser induced channel edges, in accordance with an embodiment of the present invention.

Another example of measuring perpendicularity of an edge is to measure points about every 50 microns on a substrate cut edge over the thickness of the substrate with the exclusion of 0.1 mm from each surface with a CMM. The edge perpendicularity can be measured at three locations on each side of the substrate. The substrates can be cut using different methods, and the measurements for each cutting process can then be compared to determine the differences. The perpendicularity value can be the minimum diameter cylinder which is perpendicular to the glass surface and contains all the measured points. In regards to FIG. 53, an approximately 25 mm wide glass strip cut by a wheel has a perpendicularity of 0.027 mm or greater. An approximately 25 mm wide glass strip having a laser induced channel edge can have a perpendicularity of less than approximately 0.025 mm, less than approximately 0.020 mm, less than approximately 0.015 mm, less than approximately 0.010 mm, or less than approximately 0.006 mm. Any apparatus, part, or substrate having at least one laser induced channel edge described herein can have a perpendicularity within the above values, according to at least one embodiment. Such perpendicularity can be an enhanced edge characteristic, according to at least one embodiment.

According to at least one embodiment, the laser induced channel edge can have a reduced damage area when compared to a prior art scribed edge. A damage area can be the area on one or more surfaces of the substrate adjacent to the edge and extending inwards of the substrate away from the edge, according to one or more embodiments. The damage area can be lateral cracks that ravel from a scribe horizontally back to a surface of the substrate. For example, with respect to FIG. 19, the damage area of a scribed cut into a surface of a substrate can be 0.1 mm or greater from where the wheel contacted the substrate to an area of bulk material that is not damaged. A substrate having a laser induced edge can have a damage area of less than approximately 0.09 mm, a damaged area of less than approximately 0.07 mm, a damage area of less than approximately 0.05 mm, a damage area of less than approximately 0.03 mm, a damage area of less than approximately 0.02 mm, less than approximately 0.01 mm, a damage area ranging from and including approximately 0.01 mm to approximately 0.09 mm, a damage area ranging from and including approximately 0.01 mm to approximately 0.07 mm, a damage area ranging from and including approximately 0.01 mm to approximately 0.05 mm, or a combination thereof.

Any apparatus, part, or substrate having at least one laser induced channel edge described herein can have a reduced damage area within the above values, according to at least one embodiment. Such reduced damage area can be an enhanced edge characteristic, according to at least one embodiment.

According to at least one embodiment, when a plurality of laser induced channels are proximate one another and define a complete shape in a substrate so that the shape can be separated from an interior portion of the substrate, the laser induced channel edge has a start/stop area. The start/stop area can be the portion on the substrate where the laser induced channels are first formed in the substrate to start the laser induced channel edge and where the laser induced channels are to stop being formed so as to define the shape within the substrate. The start/stop area has difference characteristics than the remaining portion of the laser induced channel area. Typically, the start/stop area is less than approximately 2 mm, less than approximately 1 mm, ranging from and including approximately 5 microns and 2 mm, ranging from and including approximately 10 microns and approximately 1 mm, or a combination thereof. The start/stop area can have additional laser induced channels (e.g., a higher density per area of laser induced channels—overlap), which can have a color change (e.g., frosted edge), or less laser induced channels (e.g., a lower density per area of laser induced channels—gap) than the other portion of the laser induced channel edge, which can have reduced change in color (e.g., less frosted). The spacing of the laser induced channels in the start/stop area can be greater or less than the spacing of the laser induced channels in the remaining area of the laser induced channel edge. This can be related to the pulses of a laser, the motion device for moving the laser and/or substrate, or a combination thereof.

Any apparatus, part, or substrate having at least one laser induced channel edge described herein can have a start/stop area within the above values, according to at least one embodiment. Such a start/stop area can be an enhanced edge characteristic, according to at least one embodiment.

Other examples of parts, assemblies, systems, apparatuses etc, that can have one or more laser induced channel and/or laser induced channel edge include, but are not limited to, windows (e.g., automotive, architectural, aerospace, etc.), lens covers, display covers, displays, microscope slides, cover glass (e.g., mobile phone), DNA slides, eye glasses (e.g., corrective lenses), flat focusing lenses, hard drive disk, media, an electro-optic device, an interior electrochromic mirror, an exterior electrochromic mirror, an aircraft electrochromic window, an architectural electrochromic window, a mobile phone component, a bar code, a stain glass window, a light emitting diode, a data storage device, a sandwich assembly comprising a plurality of substantially transparent substrates, safety glasses, eye glasses, organic light emitting diodes, watch, a spring, a two-piece spotter mirror, a curved mirror, a flat-to-curved mirror, an aspheric mirror, an interposer, and a household device (e.g., refrigerator, stove, microwave, washer, dryer, etc.).

Figure 2:
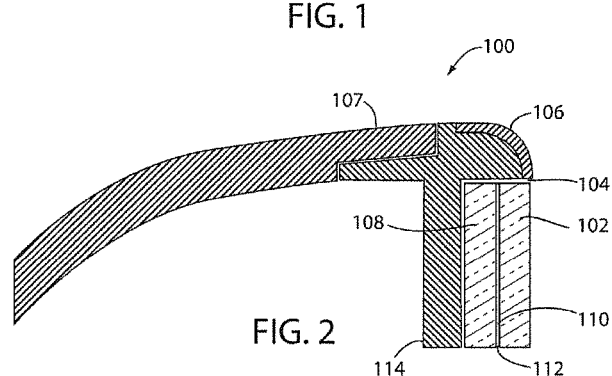
FIG. 2 is a cross-sectional of a rearview mirror assembly, in accordance with an embodiment of the present invention.
Figure 3:
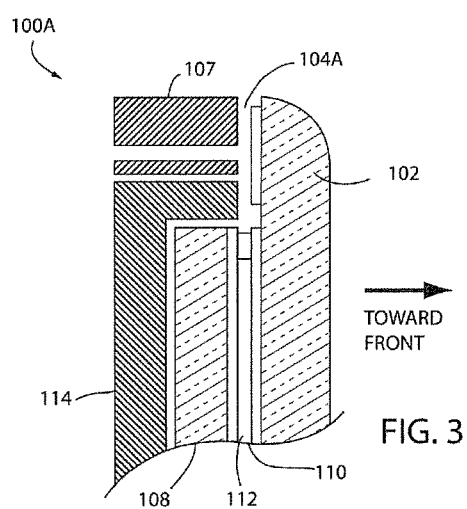
FIG. 3 is a cross-sectional view of a rearview mirror assembly, in accordance with an embodiment of the present invention.

One example of a part is a rearview mirror assembly (e.g., prismatic or electro-optic) for a vehicle. In regards to FIGS. 1-3, various embodiments of a rearview mirror assembly are generally shown at 100, 100A which includes at least one substrate 102 (e.g., glass, plastic, etc.), wherein the substrate 102 is typically cut from a larger piece of the same material. A gap 104, 104A can be defined by the substrate and a bezel 106 or a housing 107. The rearview mirror assembly 100, 100A can also include a second substrate 108 that in conjunction with the first substrate 102 defines a chamber 110 that is filled with an electro-optic medium 112. The second substrate 108 can be connected to a carrier plate 114. A tight consistent gap 104, 104A between the glass 102 and a bezel 106 or a housing 107 can be readily achieved and maintained when one or more substrates has at least one laser induced channel edge.

The process to form the laser induced channels in the substantially clear substrate can be completed in various ways. Non-limiting examples of processes include cutting a plurality of lites, dual glass sag bending, stopper for plug, coating the substantially transparent substrate without washing, array processing, using a vision system, a cut and finish process, the like, or a combination thereof.

In regards to cutting a plurality of lites, the lites can be cut from the bottom lite up or cut a plurality of lites substantially simultaneously. Cutting a plurality of lites can reduce a manufacturing footprint as compared to having multiple machines. When cutting a plurality of lites substantially simultaneously, spacers (e.g., spacer beads) can be used between lites (e.g., sheets) to reduce or prevent damage of one piece of the substantially transparent material from another piece of substantially transparent material.

According to at least one embodiment, single mirror shapes are laid up on 11.8 in. by 20 in. lites of material, from which a final shape (e.g. mirror shape) can be cut out of once processing is completed. The bottom can be cut out along the epoxy after filling with electro-optic fluid. The foregoing is a variant of array processing, wherein a single large sheet with multiple mirror shapes on 11.8 in. by 20 in. full lites undergo top/bottom processing. The singles can then be glued. In full array processing, processing occurs sheet-to-sheet prior to the shape being cut out.

In regards to dual glass sag bending, substantially exact width cuts are made while the glass is paired, with a substantial match. Additionally or alternatively, bent lite can be processed or cut using the laser induced channel process.

As to substrate (e.g., glass) stopper for plug, a substrate hole is cut into the substrate and the hole or stopper is saved and put back into the hole (e.g. with adhesive) to seal the hole once the hole has been filled with the substance (e.g. electrochromic liquid crystal fluid, etc.).

With respect to coating the substantially transparent substrate without washing, the laser induced channel process is a clean process such that glass is in the condition for immediate processing or coating without an intermediate cleaning step.

In regards to array processing, a sandwich apparatus (e.g., an electro-optic mirror element) can be laid up and elements are filled in an array. The elements can be cut out after processing is completed. The hole process can be used to create contacts (e.g., similar to ground element process). The holes can be filled with conductive material. The hole can be made and filled or the holes themselves can be filled with conductive nanoparticles. Alternatively, the elements can include a wrap around conductor that contacts the silver or other suitable conductor on the edge of the part and then wraps to the back.

One use of the laser induced channel process relates to a vision system that takes into account the size of the carrier plate, bezel, or housing, and substantially precisely cuts the substrate (e.g., glass) to fit the carrier plate, bezel, or housing. The laser induced channel process benefits from a one step cut/finish as compared to the cut and grind process employed by other techniques for producing a desirable glass edge. Further, the laser induced channel process requires no cutting oil, making it a clean and dry process.

Figure 4A:
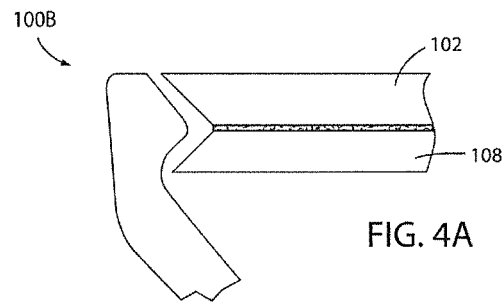
FIGS. 4A-D are a cross-sectional views of a rearview mirror assembly, in accordance with an embodiments of the present invention.

The laser induced channel process can produce angled cuts. One example is to lay down wire/bead. As illustrated in FIG. 4A, one example is a rearview mirror assembly 100B, wherein the angled cut can be used to create a "V" between the top plate 102 and the bottom plate 108. The "V" can be used to align the housing or a metal rim, can create a perception that there is little or no gap between the substrate and the house, can increase a surface area of the edge, which can be used for an edge seal that can be used to reduce a size of a chrome ring on an electro-optic mirror, reduce a perceived seal width (e.g., the size of the seal that is covered by a reflective coating (e.g., chrome)), the like, or a combination thereof. Tapered glass edges can be bonded to the spacer to form the seal. The surface at an inlet and an outlet can be ablated to cut a shape at an approximately 90 degree edge.

Figure 4B:
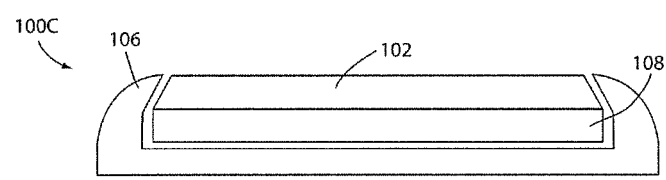
Figure 4C:
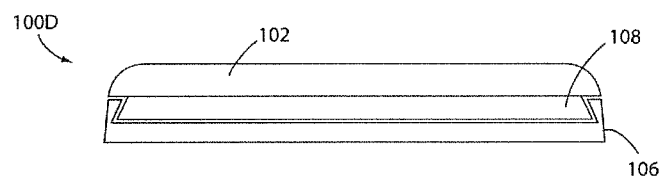

As shown in FIG. 4B, another example is the angled cut can help orientate the carrier 114 to the bottom plate 108 or bezel 106 to the top plate 102 and/or bottom plate 108. Alternatively, with respect to FIG. 4C, a rearview mirror assembly 100D can be configured so that the carrier 114 can snap onto second substrate or bottom plate 108.

Additional or alternative angled cuts include a slight angle cut so the substrate or hole plug can be easily removed from the cullet or hole, respectively. Another example is where different angled and perpendicular laser induced channels are made, such as, but not limited to, going back and forth from perpendicular laser induced channels to angled laser induced channels in a scallop like manner to expose contacts on plates opposite than the plates being cut.

According to at least one embodiment, when making a product with ground or rounded edge (e.g., ground edge rearview mirror having a radius of greater than approximately 2.5 mm), an approximately 45 degree laser induced channel can result in less glass being removed during the grinding process. The amount of grinding can be further reduced by forming laser induced channels at approximately 22.5 degrees and approximately 67.5 degrees. It should be appreciated by those skilled in the art that laser induced channels can be formed at other suitable angles, such as, but not limited to, greater than approximately 15 degrees. Additionally or alternatively, multiple partial depth cuts to provide a radiused shape, as described in greater detail herein.

Figure 36:
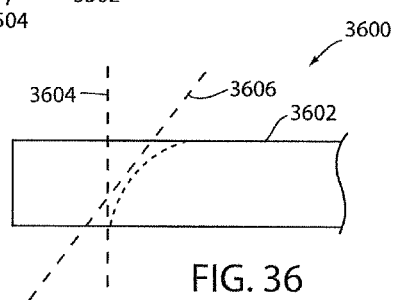
FIG. 36 is diagram of illustrating laser induced channel and grinding of a substrate, in accordance with an embodiment of the present invention.

With respect to FIG. 36, an assembly 3600 having a rounded edge can use laser induced channels can be used to cut a substrate 3602 to reduce post-grinding. Laser induced channels can be formed vertically 3604 followed by one or more angled cut 3606. A plurality of cuts or series of laser induced channels may be used to shape the substrate to reduce subsequent grinding or shaping steps.

As described elsewhere herein, bent glass can be cut such that one or more laser induced channels form a 2-D projection of 3-D shape.

A picture frame shape mirror or electro-optic mirror can be made with a hollow center or off center area. The hollow center or off center area can be filled with another mirror, electro-optic device, LCD, other display or feature with reduced or no gap between pieces. The hole area could be used for a switch, a switch array, a plug or connector, a microphone, a speaker, an antenna, a transmitter, a vent such as a heat vent, a sensor, a sensor array, the like, or a combination thereof.

Figure 4D:
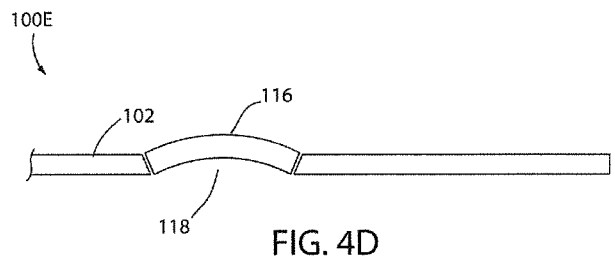
Figure 7:
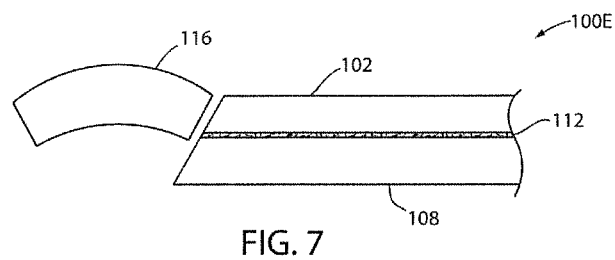
FIG. 7 is a cross-sectional view of a rearview assembly, in accordance with an embodiment of the present invention.

According to an embodiment illustrated in FIGS. 4D and 7, a rearview mirror assembly 100E can have a first surface mirror 116 with a back angled cut "V," and can be placed within an aperture 118 defined by another substrate 102 of the rearview mirror assembly having a front angle cut "V." Thus, the angled laser induced channel edges can be behind the first surface mirror 116, and may not be visible by a user of the mirror. The other substrate 102 can be substantially transparent or a second surface mirror element. One example for such a design can be, but is not limited to, an outside rearview mirror (e.g., electro-optic or non-electro-optic) having an integrated spotter mirror.

With respect to FIG. 9, a laser induced channel edge can be shaped as to define at least one notch 120, according to at least one embodiment. Typically, the notch 120 defined by the laser induced channel edge can be smaller than achievable with traditional techniques. In regards to FIGS. 1, 2, and 9, an example of such an embodiment is an electro-optic rearview mirror assembly, wherein at least one of the substrates 102, 108 has one or more notches configured for electrically conductive clips to attach or be at least partially received in the notch.

The notch 120 can have various shapes, such as, but not limited to, inside angles of approximately 90 degrees or less that can be cut into the substrate with reduced or minimal radius at the inside corner, the substrate can be cut in a saw tooth shape to have extended contacts, the substrate edge can have a tab shape portion that can fit into a connector or attach to another connecting mechanism, a notch can be taken out of the glass or glass edge by having laser induced channels meet at an approximately 90 degree angle, a back glass edge could be made thinner this way by removing a section of the glass around substantially the whole perimeter edge, a notch in the edge of the substrate can be made for contact to a conductor (e.g., silver epoxy) or conductive coating on the second or third surface, the notch 120 can be straight or angled in from the glass edge compound, the like, or a combination thereof. Examples of a reduced or minimal inside radius are, but not limited to, a radius of less than approximately 25 mm, less than approximately 20 mm, less than approximately 15 mm, less than approximately 10 mm, less than approximately 5 mm, approximately zero, or a combination thereof.

Figure 5A:
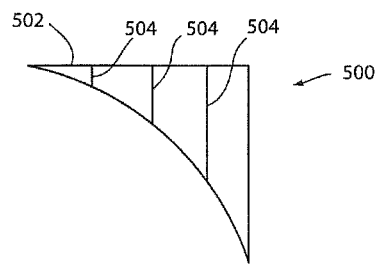
FIG. 5A is an illustration of a substrate having various laser induced channels having different depths, in accordance with an embodiment of the present invention.
Figure 5B:
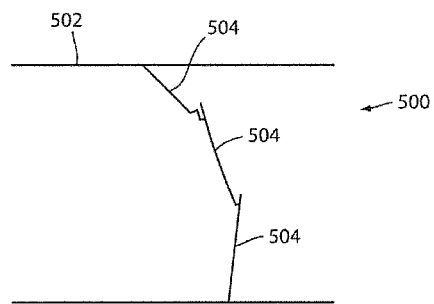
FIG. 5B is an illustration of a substrate having various laser induced channels, in accordance with an embodiment of the present invention.

With respect to FIGS. 5A and 5B, an assembly 500 can include a substrate 502 wherein the length of compound laser induced channels 504 in a substrate 502 along an angle in addition to their start and stop points can be varied to form a complex edge shape, according to at least one embodiment. By way of explanation and not limitation, angled laser induced channels can be used to form an edge that defines a shape having an extreme inside radii, a shape having no radii at all, a shape for button notches, button holes, sensors, connectors, microphone, speaker, antennae, transmitter, vents, or the like.

Figure 31:
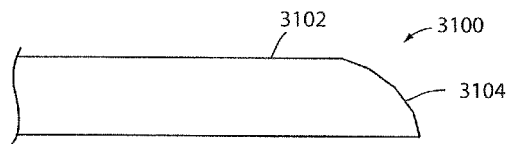
FIG. 31 is side view of a substrate, in accordance with an embodiment of the present invention.

In regards to FIG. 31, an assembly 3100 can include a substrate 3102 having a laser induced channel edge 3104 that is cut in a plurality of segments (e.g., four segments). The laser induced channel edge 3104 can have enhanced tangency when compared to a scribed edge, can reduce the amount of post-cutting grinding when compared to a scribed edge, the like, or a combination thereof.

Figure 21:
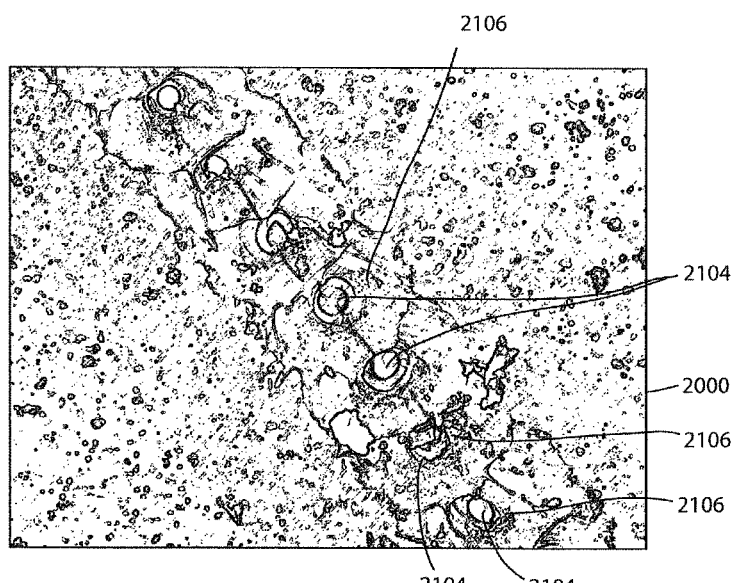
FIG. 21 is an illustration of a top surface of the substrate having a plurality of laser induced channels of FIG. 20 at a higher magnification, in accordance with an embodiment of the present invention.

The material change that accompanies the laser induced channel process can range from and include approximately 1 um to approximately 5 um in diameter and the process can create a very small amount of waste material or debris. An example of a material change is the halo around the laser induced channel, as illustrated in FIG. 21. The accurate and repeatable cutting profile enables substrate designs that would be difficult to create using typical substrate (i.e., glass) scribing and breakout. The laser induced channel process can allow for in-situ breakout and very tight fitting glass on glass construction, such as, but not limited to, two or more pieces of glass cut to fit together substantially accurately.

Figure 6A:
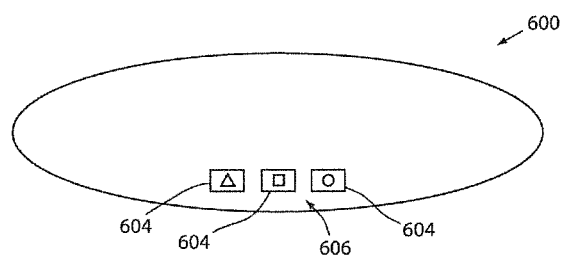
FIGS. 6A-6E are front views of assemblies, in accordance with embodiments of the present invention.
Figure 6B:
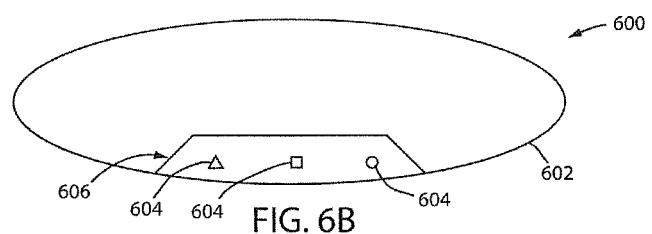
Figure 6C:
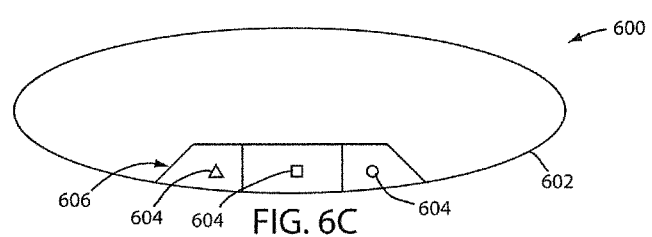
Figure 6D:
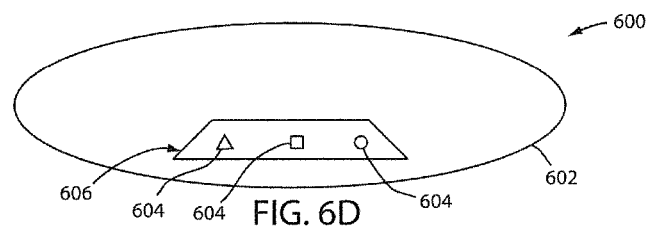
Figure 6E:
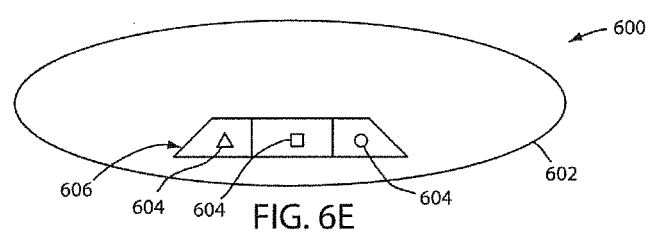
Figure 6F:
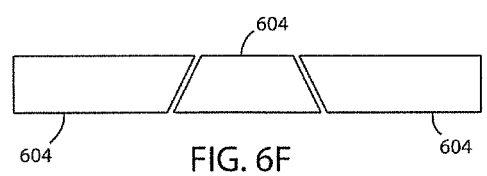
FIG. 6F is a front view of a button assembly, in accordance with an embodiment of the present invention.

For example, when manufacturing a sandwich application, such as, but not limited to, an electrochromic element, as described herein, the process may include the assembly of the electrochromic element with an area on the first substrate that overhangs the second substrate. In the overhang area, buttons could be created in a subsequent process where an adhesive pad can be added to the back of the first substrate, and then the laser induced channel process can be used in that area to create glass buttons. Breakout can be achieved by thermal processing or by mechanical processing. Alternatively, the shape can be at an edge of the substrate, such that when removed the substrate is notched in the area of the shape. An accessory substantially formed in the shape of the notch, or smaller, can be inserted into the notch area. The accessory can be, but is not limited to, one or more switches, one or more sensors, one or more microphones, one or more speakers, one or more connectors, one or more antennas, one or more transmitters, one or more vents, one or more receivers, one or more light sources, the like, or a combination thereof. According to at least one embodiment, a button pad or series of pads can be proximate in the first substrate using the laser induced channel process. In regards to FIGS. 6A-6E and 11, an assembly 600 can include at least one substrate 602 and one or more buttons 604. The one or more buttons 604 can be in a button area generally indicated at reference identifier 606. The button area 606 may be at least partially defined by the edge of the substrate 602 (FIGS. 6B, 6C, and 6D) or may be spaced away from the edge of the substrate 602 (FIGS. 6A, 6D, and 6E). The button patterns may be created in-situ as described, or they may be cut out independently and reassembled in a subsequent step. To prevent the button area from being proud of the first surface, the button pads may be created with an angled beam so that the second surface of the button is larger than the first surface (FIG. 6F), according to at least one embodiment. The buttons may also be cut out in a vertical pattern or with a reverse angle cut from that shown in FIG. 6F. It should be appreciated by those skilled in the art that the buttons 602 can include materials in addition to or alternatively to glass, such as, but not limited to, plastic, metal, ceramic, elastomer, the like, or a combination thereof.

In one example, the laser induced process is used to create laser induced channels substantially perpendicular to the surface of a piece of approximately 1.6 min thick ITO float glass to define an inside portion and an outside portion, as described herein. Other examples are, but not limited to, approximately 2.2 mm thick substrate, approximately 2.9 mm thick substrate, EAGLE glass, GORILLA glass, etc. The glass is laminated to a piece of 3M 4492 foam with double sided adhesive, and the outside or inside portion of the glass is heated or cooled, or a combination thereof, to allow the inner and outer portions to separate. When the glass is allowed to cool to room temperature, the inside portion may be depressed with light pressure to deflect approximately 0.1 to 0.2 mm. Increased pressure increases the deflection. Since the separation can be substantially perpendicular to the surface of the glass, the outer portion may also be depressed to expose the edges of the inner portion. Alternatively, the same inner and outer portions may be created such that the dimensions of the inner portion may be designed and produced smaller than the opening in the outer portions to a larger extent than if they had been produced simultaneously as described herein. Producing the inner and outer portions separately has the advantage of varying the coatings on the two different portions. No masking or coating removal would be necessary. If desired, it may be beneficial to fill at least some of the gap between the two pieces with an elastomeric material to prevent debris from collecting between the inner and outer portions.

Figure 6J:
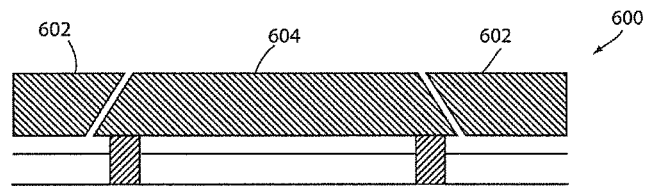
FIG. 6J is a cross-sectional view of a rearview assembly, in accordance with an embodiment of the present invention.

Once a button or buttons are created, there are various methods or systems for detecting that a button is depressed. The depression of the button may be detected individually or may be detected as a group. If the adhesive is foam or other compressible material, the deflection of the buttons may be detected by a change in capacitance or from a change in resistance caused by compression of material positioned behind the button. If detection is based upon capacitance, then a capacitance change between the two conductive pads can be detected when the button is depressed. As exemplary illustrated in FIG. 6J, a plurality of buttons 604 can be made from one strip or piece of substrate 602, wherein the location of the force applied to the button area may be calculated as a function of the ratio of signals from two or more sensors located at various points behind the button. Any detection, button, or switch system described herein may be optical, capacitive, resistive, inductive, the like, or a combination thereof.

As the button is depressed, the edge of the substrate can be exposed. According to at least one embodiment, detection of the button deflection can be when a deflection of less than about 0.3 mm. One exemplary design can have a deflection of less than 0.2 mm. One example of an advantage of the laser induced channel process is that the process does not produce razor sharp edges. There can be a slight rounding of the first and second surface so that the laser induced channel edge can be exposed slightly. It may be desirable to fill at least the first surface gap between the button and the substrate with elastomeric material that will protect the edges while still allowing for button deflection. Additionally or alternatively, the button can include a material that can be proud of the a laser induced channel edge.

According to at least one embodiment, one or more buttons 604 and/or button area 606 can be back lit or edge lit with at least one light source to aid night viewing, signal when the button is engaged or activated, the like, or a combination thereof.

Figure 6K:
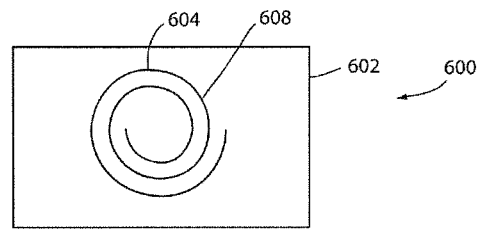
FIG. 6K is an illustration of a spiral pattern may be generated by a laser induced channel process, in accordance with an embodiment of the present invention.
Figure 6L:
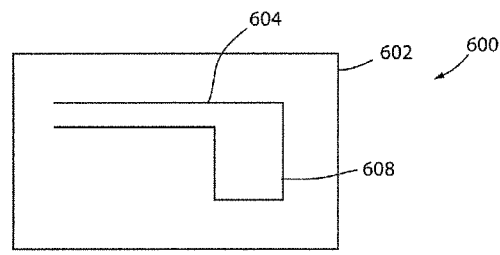
FIG. 6L is an illustration of a spring configured to create a thin area in a substrate that allows deflection or depression of a portion of the substrate with respect to the rest of the substrate, in accordance with an embodiment of the present invention.

In regards to FIGS. 6K and 6L, a additional or alternative method or process of creating a button 604 in a substrate 602, or apparatus thereof, is to make a spring 608 out of the substrate, according to at least one embodiment. For example, using the laser induced channel process, a spiral pattern may be generated (FIG. 6K). Alternatively, the spring 608 could be made in other shapes or patterns that create a thin area in the substrate that allows deflection or depression of a portion of the substrate with respect to the rest of the substrate (FIG. 6L). For a spiral configuration, the substrate properties, substrate thickness, and spacing within the spiral can determine the spring constant. In a brittle glass-like material the travel of the spring can be limited to avoid high material stress or fracture. Although FIGS. 6K and 6L depict laser damage channels that stop abruptly, to reduce unintended fracturing, the laser induced channel can terminate with a small circle or other closed feature at each unterminated end. The corners shown in FIG. 6L can be rounded to reduce unintended fractures that may occur if tire corners are approximately 90 degrees. Additionally or alternatively, the laser induced channel areas can be etched.

According to at least one embodiment, structures and/or shapes may also be configured to interlock with one another. As described herein, since the laser induced channel edges have reduced edge damage or loss of material, laser induced channels edges can accurately align or interlock with one another. When assembling tight fitting non-interlocking components, insertion of the inner portion into the outer portion may be assisted by heating the outer portion or cooling the inner portion, cooling the outer portion and heating the inner portion, or heating or cooling one of the inner and outer portion. For interlocking pieces, areas of inner and outer portions may be heated and cooled to assist in assembly, although room temperature assembly can be used for interlocking pieces.

The assembled pieces can be adhered together, such as, but not limited to, applying an adhesive (e.g., glue) that can wick into a cavity defined by the adjacent pieces, applying a laminate on at least a portion of the substrate and another material, such as, but not limited to, glass, plastic, metal foil or film, circuit board, or flexible circuit board, the like, or a combination thereof.

Similar structures to those described herein may also be generated using other processes such as glass scribing, drilling, grinding, waterjet cutting, molding, and other methods known in the art. For tight fitting components it can be desirable to use the same materials or at least materials with similar coefficients of thermal expansion for designs where the two pieces will interfere if one expands or contracts more than the other.

According to at least one embodiment, substrates with laser induced channels can be configured to interface one another. In such an embodiment, a laser induced channel saw tooth edge can be formed in one substrate and configured to substantially mesh with another laser induced channel saw tooth edge to create an interface between materials (e.g., finger joint, dove tail, box joint, etc.). For example, the edge of the substrate can mesh with a metal rim or plastic housing where the non-glass material had a saw tooth pattern that is approximately perpendicular to the glass saw tooth.

It should be appreciated by those skilled in the art that the embodiments described herein can include icons, backlighting, indicia, buttons or switches (e.g., proximity, touch, etc.), jig saw pieces for button indicia, the like, or a combination there.

One or more laser induced channels in a substrate can be at least partially porous alone or in combination with another, according to at least one embodiment. The laser induced channel can continue (e.g., continuously continue) in the substrate if the laser induced channel is porous, non-porous, or a combination thereof. Thus, at least a portion of a laser induced channel can be porous, but a laser induced channel does not have to be porous, such that the laser induced channel can be a change in physical and/or chemical properties of the substrate, according to at least one embodiment.

A fracture in the substrate can connect two or more laser induced channels, according to at least one embodiment. For example, a penetrating dye can be applied to one side of the substrate having series of laser induced channels, wherein the penetrating dye penetrated the laser induced channels (after approximately 1 hour for an approximately 1.6 mm thick piece of glass with channels about 4 um apart). Another example is where a vacuum was applied to the substrate having series of laser induced channels, and helium gas was applied to the other side of the line (approximately 1.6 mm thick glass, 4 µm spaced apart channels) and a helium leak check was performed, wherein helium was detected on the sealed evacuated side of the substrate. Thus, gas and liquid media can diffuse thru the laser induced channel substrate if the channels traverse thru the substrate either by a laser induced channel extending through the substrate and being porous and/or a fracture connecting a plurality of laser induced channels each of which are at least partially porous. For example, when a fracture connects two or more laser induced channel, each of the laser induced channels can be at least partially porous, such that a first laser induced channel is porous from an entry surface of the substrate to a depth in the substrate, a second laser induced channel is porous from a depth in the substrate to a surface of the substrate opposite the entry surface, and a porous fracture connects (e.g., gaseous and/or fluidly connects) the porous portion of the first laser induced channel with the porous portion of the second laser induced channel. If the channels are created so that they terminate in the substrate, the diffusion stops where the laser induced channel stops or terminates.

The diffusion rate can be increased or decreased by increasing or decreasing the number of laser induced channels in an area, respectively. Additionally or alternatively, the laser induced channels can be made smaller with shorter wave lengths of light or large with longer wavelengths of light. Yet another addition or alternative to enhancing diffusion rates, is that the laser induced channels can be enlarged with acid or alkali etching, such as, but not limited to, with hydrogen fluoride (HF), ammonium bifloride, sodium hydroxide (NaOH), potassium hydroxide (KOH), the like, or a combination thereof.

According to at least one embodiment, heat can be applied to an outside shape substrate to expand it after laser induced channels have been formed to remove inside shape, cool an inside shape of the substrate to shrink the shape (e.g., substrate) to remove it, vice versa, or a combination thereof. Heat and/or cool to alter a size of the inside shape relative to the outside shape or vice versa. Additionally or alternatively, parts can be assembled in reverse order after heating the outside shape, cooling the inside shape, vice versa, or a combination thereof. Heat can be applied to the substrate in different ways, such as, but not limited to, directed hot gas or liquid, a flame, a hot plate or coil, a focused light source (e.g., infra-red (IR) lam, near IR lamp, or laser), the like, or a combination thereof. The substrate can be cooled in different ways, such as, but not limited to, by directed cold gas or liquid, a cold plate or coil, the like, or a combination thereof.

Typically, the laser induced channel edge is not influenced to any significant degree by the substrate that it is acting upon and the effected zone is very narrow (e.g., approximately 4 micrometers or less). This is in contrast to traditional scribe and break processes that are affected by varying glass material properties and internal stresses. The laser induced channel process produces edges that follow the intended path very precisely, as described herein. Traditional methods can produce cuts that deviate significantly from the intended path.

Precise shapes that do not require subsequent dimensional finishing can be produced. Both internal holes or features of any shape, and external bodies of any shape, can be produced without the need for additional processing. The walls of the laser induced channel edge can have reduced deviation from the path of the channels. If the laser induced channels are directed normal to the glass face then the walls of the laser induced channel can be substantially perpendicular to the substrate face, as described herein. If the laser induced channels are directed at an angle to the glass face, then the laser induced channel edges can be at the complimentary angle to the substrate face, producing a substrate with a draft on the edges.

According to at least one embodiment, products that have a substrate with a laser induced channel edge can have tight tolerances between the laser induced channel edge and another edge. One reason for this is that the path of forming the laser induced channels follows the intended path very precisely, as described herein. Therefore, the level of precision to which parts may be produced can be dependent on the mechanism employed to produce the desired path. In the case of a computer numerical control (CNC) machine this precision can be extremely high, depending on requirements.

A laser induced channel edge can have reduced or minimal damage, such as, but not limited to, micro-cracking, as described in herein. Thus, the laser induced channel edge can have a stronger edge and less prone to breakage when compared to prior art edges. Scattering profile of light reflected from or transmitted by the surface may be a signature of the surface process, laser power, hole spacing, filament length, wavelength of laser light, the like, or a combination thereof.

According to at least one embodiment, the laser induced channel edge can be a frosted edge without additional processing. Thus, the laser induced channel process inherently produces a frosted (e.g., light scattering) surface finish. For products requiring a frosted edge appearance, no additional processing, such as grinding, is typically required. As discussed herein, edge roughness can be related to laser parameters.

The layer of material producing the frosted appearance can be thin and may not penetrate more than a few micrometers into the substrate. The layer of material producing the frosted appearance can be removed and the underlying substrate being relatively uninduced, such that the surface can be polished, or overcoat the surface with a paint or varnish.

The depth of the laser induced channel effect can be controllable, such that it need not penetrate the complete thickness of the substrate. A decorative frosted pattern can be produced. The decorative frosted pattern can be coated to produce a satin metallic appearance, polished, coated with a paint or varnish to produce a specular reflective surface, the like, or a combination thereof.

According to at least one embodiment, laser induced channels can be used to form holes in a flat, curved, or shaped substrate, such that a hole can be formed by placing multiple laser induced channels proximate one another to form an inner shape, such as a circle, oval, square, rectangle, slot, etc. that is surrounded by a perimeter of laser induced channels and then removing the inner shape. Holes can also be created by the damage created by a laser induced channel or multiple laser induced channels proximate one another, such that the induced area alone is permeable to a gas or liquid, as described herein. Flow through this induced area can be enhanced by etching the filamented area with an etchant such as HF, Ammonium BiFluoride, KOH, or NaOH.

Holes or shapes in hard substrates, such as, but not limited to, glass, quartz, ceramic, sapphire, diamond, silicon, and the like, can have great utility but are seldom used because the hole or shape creating process in these hard materials is slow and expensive to do. The laser induced channel process allows holes or shapes to be made in these hard materials quickly, easily, and inexpensively.

The laser induced channel process can produce patterns and shapes with enhanced accuracy and without damage to the shape that is removed or the perimeter boarder or substrate surrounding the shape. The removed shape can be placed back into the "hole" it was removed from with a precise fit or the same "hole" pattern can be cut from another substrate that might have different properties such as color, refractive index, transmission, reflection, light scattering, thickness, conductivity, porosity, material composition, thermal conductivity, or surface contour and placed into the hole. The "hole" could be filled with multiple shapes cut from the same substrate or multiple shapes from different substrate materials.

For purposes of explanation and not limitation, if a plurality of laser induced channels that are about 1 micron in diameter and spaced approximately 3 microns to approximately 5 microns apart (or other spacing as described herein) is placed in about 1.6 mm thick soda lime glass substrate it has been shown that a penetration dye applied to one side of the substrate will penetrate though the filamented area to the other side of the substrate. It has also been shown that helium will penetrate the laser induced channel area. A plurality of laser induced channels can be used to cleave a substrate. If use of the diffusion properties of laser induced channels is the desired effect it can be beneficial to reduce, if at all, any weakness in the substrate to the point it will break in use. According to at least one embodiment, if the laser induced channel area or cluster is separated by areas of un-filamented substrate the substrate will remain strong and not break in use. The size of the laser induced channel area or cluster, the pattern of laser induced channels within a cluster, the separation between the clusters of laser induced channels, the pattern or location of the laser induced channel clusters relative to one another on the substrate, the like, or a combination thereof can influence the strength of the resulting porous laser induced channel substrate. Thus, a laser induced channel substrate can be strong and for instance support a substantial pressure drop from one side of the substrate to the other. Additionally or alternatively, the substrate can be purposely weakened over substantially the whole substrate or in one or more areas of the substrate to control where the substrate breaks and/or when the substrate breaks (e.g., pressure value, force value, thermal gradient, etc.).

The porous nature of the laser induced channel area can result in a substantial increase in surface area of the substrate. An increase in substrate surface area can increase the number of reactive sites resulting in increased reactivity, increased chemical kinetics, increased catalytic activity, increased electrochemical activity, an increase in ion and charge storage sites, the like, or a combination thereof. This can be very useful in catalytic devices such as fuel cell, charge storage devices, for example, such as batteries, capacitors, and chemical sensors. Additionally or alternatively, an increase in surface area can result in an increase in adsorption, absorption, desorption, the like, or a combination thereof. The increased surface area and small pour size can enhance chromatographic separation properties of solutions or mixtures of gasses or liquids penetrating though the filament created substrate pores. Since these fine pores can be inside of the substrate and not on the surface of the substrate they can be protected from damage.

According to at least one embodiment, the laser induced channels or laser induced channel clusters can be made in 3D substrate materials such as a sphere or tube. A laser induced channel tube with a liquid or gas flowing through the tube would be useful in extraction of ions, or the separation of ionic species, osmosis, adsorption, or desorption related compositional changes to the gas or liquid, the like, or a combination thereof. Laser induced channel areas through a ceramic or electrically insulating substrate can provide controlled ion diffusion and be used as a non-flammable, stable, high temperature resistant separator in batteries such as, but not limited to, Li-ion batteries.

In addition to the increase in surface area produced, in the laser induced channel process the plasma created at the surface of or inside the substrate during formation of the laser induced channels can induce through the momentary creation of high temperatures and pressures and the subsequent rapid cooling the formation of unique structures, and compositions. These modified structures can also be used to enhance the properties described herein of the porous laser induced channel zones. The laser induced internal surface chemistry changes of the porous laser induced channel zone including, but not limited to, annealing, tempering, implantation, p-n junction formation, phase or layer separation, chemical reactions, chemical composition changes, alloy formation, the like or a combination thereof. These changes can be enhanced by forming the laser induced channels in a magnetic or electric field.

According to at least one embodiment, the laser induced channels or laser induced channel clusters can penetrate substantially completely through the substrate, penetrate partially through the substrate, be internal to the substrate, or a combination thereof. The laser induced channels could be made at or near perpendicular to the substrate surface of at an angle to the substrate surface. A laser induced channel area near the surface of a substrate can be used to selective change the wetting properties of the substrate, improve adhesion through an increase in surface anchoring sites, the like, or a combination thereof.

According to at least one embodiment, an array of laser induced channels can be configured to create optical effects. One or more laser induced channels can be placed in a transparent substrate to direct light, scatter light, reflect light, color light, absorb light, the like, or a combination thereof. The laser induced channels can be penetrated with a dye, pigment, selective light absorber such as an UV or IR absorber or carbon black to change the color of or absorb light. The laser induced channels can be filled with metal nanoparticles that reflect light or absorb light. The laser induced channels can be substantially perpendicular to the substrate surface, at angles to the substrate surface, at the surfaces of a substrate, or internal to a substrate. As described herein, one or more laser induced channels can be porous, such that the laser induced channels, if filled with a light absorber or reflector, such as, but not limited to, dye or carbon black, could directionally absorb or transmit light. The laser induced channels can be used to change the angular sensitivity to light illuminating the substrate from different incident angles. For example, an array of laser induced channels orientated perpendicular to a substrate may not attenuate or alter light illuminating the substrate head on (perpendicular) but may scatter light that is illuminating the substrate from an angle. If the laser induced channels are filled with a dye, UV or IR absorber, carbon black, or metal nanoparticles, the like, or a combination thereof, the angular transmission or absorption of light can be altered by a laser induced channel array. If the nanoparticles fillip the laser induced channels have conductivity the laser induced channel array can be used as a directionally sensitive antenna which can absorb or transmit electromagnetic radiation. Laser induced channels penetrating the substrate that are filled with conductive particles can also be used as an electrical contact or feed thru. The laser induced channels can also be used to alter an absorption of heat and/or strength of the substrate to influence how the substrate may bend during thermal substrate bending and/or shaping. Substrate areas at a greater temperature can bend easier and/or bent into a smaller radius than areas at a lower temperature. Weaker areas can selectively bend more in that area or along that line relative to the surrounding stronger areas.

An array of laser induced channels can also be placed in the substrate in a way that will create a design, sign, picture, pattern, or artwork. This array of laser induced channels can be durable and used for data storage. The laser induced channels could be short and layered in a substrate to increase data storage capacity. For purposes of explanation and not limitation, this data storage can be in the form of a bar code. The laser induced channels can be made to penetrate the whole substrate, be confined within the substrate, be internal to the substrate, be at one or more surfaces of a substrate, the like, or a combination thereof. The laser induced channels can be placed substantially perpendicular to the substrate surface and/or at angles to the substrate surface to create a 2D or 3D effect. The 3D structures could be formed internal to the substrate and then could be extracted by removing unwanted portions of the substrate. The laser induced channels can be penetrated by a dye, absorber, and/or reflector, as described herein. The angle dependent visibility of the image can be controlled by selection of the proper laser induced channel angle or combination of laser induced channel angles. To enhance the visual effect the substrate can be illuminated such as with a top light, side light, edge light, the like, or a combination thereof. The laser induced channel effect can be combined with other decorative effects such as inkjet printing, screen printing, offset printing, sandblasting, etching, the like, or a combination thereof, to enhance the visual effect. The laser induced channels can be used to create regularly repeating structures and used as a Bragg grading, holographic image or a micro lens structure that can uniquely interact with light incident on the substrate.

Hole structures that are created by removing a portion of the substrate are useful for many functions. Holes created in substrates of electronic devices, such as a sandwich application (e.g., an electrochromic element or an LCD) can be used to fill the device with material (e.g., electrochromic or liquid crystal material). The hole portion of the substrate that is removed can be used to "plug" the hole that is created by inserting the removed portion of the substrate back into the hole opening and gluing the hole in place with a thin layer of a UV cure, thermo-set, hot melt adhesive, the like, or a combination thereof. The hole can also be filled with an electrically conductive member such as a spring clip, metal connector, metal pin, wire, a soft metallic material such as, but not limited to, indium metal or solder, an electrically conductive adhesive such as, but not limited to, a silver filler epoxy, urethane, silicone or acrylic resin, a conductive polymer, the like, or a combination thereof, to provide one or more electrical contacts to the interior or edge of the electronic device.

By way of explanation and not limitation, the one or more holes or openings can also be used as a port opening for a switch, a microphone, a speaker, an antennae, a transmitter, a vent, a sensor such as a light sensor or camera, a gas sensor or a pressure sensor, a receiver, a light source for applications such as a turn signal or blind spot monitor located in the one or more holes or behind the one or more holes. The one or more holes can be placed perpendicular to the substrate or at an angle to the substrate. An electrical switch or button can be placed in the one or more holes or behind the holes. Examples of switches that can be used include, but are not limited to, capacitive, resistive, membrane, domed metal, the like, or a combination thereof. The substrate portion that is removed from the hole can be repositioned back into the hole to act as the pressure, capacitive, or resistive sensitive switch button face. The hole can be tapered with a draft that will enable the hole to be more easily removed from the substrate and more easily inserted back into the substrate it was fashioned from. Again, the hole can be filled with a tapered hole made from another material or another substrate. As described herein, the substrate pieces can be easier to separate if the laser induced channel area, inner part of the substrate, and/or the outer part of the substrate is heated, cooled, wetted with water (e.g., water can saturate the laser induced channel area enabling easier separation), the like, or a combination thereof. Water can also be supplied to the laser induced channel area as steam or by a flame ($CO_2$ and $H_2O$ generation for combustion of methane or in the case of combustion of hydrogen and oxygen just H2O). Liquid water can also be delivered to and be vaporized by the flame to increase the amount of water vapor that is generated. The heat produced by the flame can also be used to thermally propagate a break along the laser induced channel line and help separate the substrate into pieces. The top and bottom of the hole and sides of the hole could be reverse tapered such that the holed is "loose" in the substrate but is mechanically constrained and held in the substrate. A hole or holes can be used as pass through holes for decorative or functional members. For example, a metal trim piece may be added to the perimeter of the glass and held in place with screws that pass through the holes in the glass. Small screws may be added to the perimeter of a mirror or window to anchor it in place and to add a decorative effect. The holes in a laminated/multi-laminated structure could be through just one substrate, more than one substrate or all the substrates. In an electronic device such as an electro-optic element or LCD the hole(s) can be placed through one or both substrates in the active/coloring area, the seal area or the contact area. A hole or holes may also be used to anchor more than one substrate together and/or can be used as a pressure sealing mechanism such as with perimeters holes with fasteners in the holes compressing a perimeter sealing gasket or O ring. A single hole or multiple holes located on the interior of multiple substrate assembly can also be sealed with the hole or holes positioned on the inside of an O ring or gasket.

A hole or slot that is generated in a substrate can be filled with material from a different substrate such as by dropping a short radius convex or aspheric spotter mirror section into a hole or slot created in a flat or long radius convex mirror or fitting glass shapes of the same or different colors together in a decorative stained glass window, lamp shade or panel. A substrate can also be cut into a puzzle shaped pieces that can be disassembled and re-assembled. The pieces can come from the same substrate or different substrates if desired. For purposes of explanation and not limitation, such holes can be a notch, a slot, a semi-circle, etc., cut out of the edge of a substrate.

As exemplary illustrated in FIGS. 10A and 10B, assemblies 1000 can have substrates 1002 that have one or more holes 1004 that can be formed by a plurality of laser induced channels. In such an embodiment, the laser induced channels can be spaced in a pattern to provide a fill port. Holes can be used for a fluid inlet and/or pull air out. Saturate holes with silver or metal nanoparticle or organometallic solution to form a conductive filament path. One or more electrodes can be put on opposite surfaces to fluid and get conductivity through the laser damage channels to the fluid. Larger holes can be for fluid while having smaller (micro-hole) for air. A hole or slot through the second substrate of the glass can be used as a electrical via to make contact with one of the electrodes. The hole may be used in conjunction with a spring clip to make contact to the electrode directly or the hole may be filled with a conductive material such as an ink or conductive epoxy.

According to at least one embodiment, perpendicular lensing and/or galvo assemblies can be used for making small holes by forming a plurality of laser induced channels in a substrate. Holes in the mirror glass may be added as pass-through holes for decorative or functional members. For example, a metal trim piece may be added to the perimeter of the glass and held in place with screws that pass through holes in the glass. Alternatively, small screws may be added to the perimeter of the mirror to hold it in place and to add a decorative effect.

Assemblies with small rivels-mounting via screws can be utilized with holes are formed using laser induced channels. For example, a hole can be put into the electro-optic element before or after lamination for a photosensor, switch, screw, camera, indicator light, microphone, devices, apparatus, parts, or systems described herein, the like, or a combination thereof. Hole can be formed at an angle to create angled openings for a light source (e.g., BSM, turn signal, etc.). Typically, it is desirable to place microphones in an area with enhanced displacement of air pressure. Thus, it has been difficult to mount microphones on a mirror assembly since the microphone cannot be placed on a first surface of the mirror element. By forming one or more laser induced channels or a hole in a substrate, in front of a microphone and sealing an edge for a non-dimmable area, the microphone can be placed in an area where the element receives air pressure differential. Moisture can be blocked by using a hydrophobic coating on a surface of the substrate. Additionally or alternatively, front and/or back of surfaces of the substrate can be coated, as described herein.

Indicia in center of the glass or controlled scattering can be achieved by varying the angle density and depth of the laser induced channels, according to at least one embodiment.

As described herein, and in regards to FIG. 7, a second glass piece (e.g., spotter mirror) can be inserted into a void defined by an angled contour cut. This can be done along the perimeter on the glass or in the center of the glass. Laser induced channel edges can be angled on a two piece spotter so it can have an approximately tight fit into a substrate (e.g., approximately 1 mm or less elastomer or adhesive can be used to attach).

With respect to FIGS. 30A-30C, one embodiment of a product including at least one substrate having at least one laser induced channel edge can be a spotter rearview mirror assembly 3000. The spotter assembly 3000, when an electro-optic assembly, can include a first substrate 3002, a second substrate 3004, and an auxiliary substrate 3006 of which at least one of the substrates 3002, 3004, 3006 can have at least one laser induced channel edge. Typically, the first substrate 3002 has at least one laser induced channel edge 3008 to define an area for the auxiliary substrate 3006, and the auxiliary substrate 3006 has a least one laser induced channel edge 3010 to reduce a gap 3012 between the first substrate 3002 and the auxiliary substrate 3006.

In regards to FIG. 8, an assembly 800 can include a flat substrate 802 and a bent substrate 804. In such an embodiment, laser induced channels can be used for a precision cut circle in curved substrate and then be inserted into a hole in a flat substrate. Glue, frit, weld, seam, the like, or a combination thereof can be used to connect the separate pieces of substrates.

Figure 38:
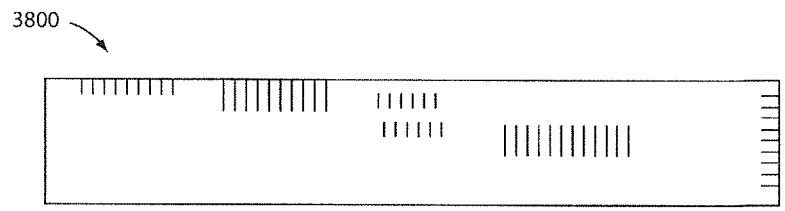
FIG. 38 is an illustration of a substrate with a frosted appearance at and/or below a surface, in accordance with an embodiment of the present invention.

As has been described elsewhere herein, the laser induced channel process for cutting glass benefits from its ability to generate damage channels in the glass that, after venting, can yield a cut glass edge having tight dimensional tolerance. This can be used to generate precise, right angle surfaces when desired. The ability to control the depth in the substrate at which laser induced channel is initiated through beam focus and the ability to control the length of the laser induced channel within the glass through pulse power control can be used to generate damage channels of controlled length at or below the substrate surface for aesthetic purposes. This can be used to generate a frosted appearance at the substrate 3800 surface or below the surface (FIG. 38). The same process can be applied to a substrate edge to modify the appearance of the edge (FIG. 38). The degree of modification can be controlled through the relative spatial density of the laser induced channels, the relative lengths of the laser induced channels, the like, or a combination thereof.

Figure 39A:
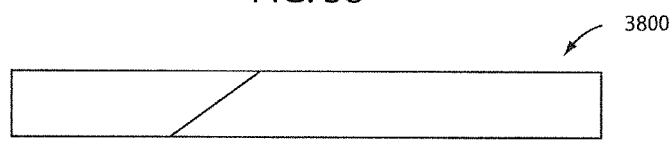
FIG. 39A is an illustration of an angled laser induced channel, in accordance with an embodiment of the present invention.
Figure 39B:
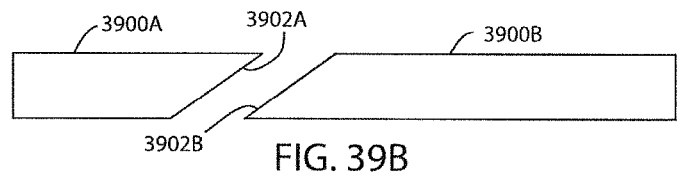
FIG. 39B is an illustration of a substrate with angled edges, in accordance with an embodiment of the present invention.

In the glass industry, glass is most commonly cut normal to its surface via mechanical scribing and mechanical venting. If a contoured edge is desired the cut edge is further modified by seaming or grinding to obtain the desired profile. As discussed elsewhere herein, the ability of laser damage channels to be generated at non-normal angle to the glass surface is a significant advantage of the laser induced channel process. An angled laser induced channel 3902 can be formed in a substrate 3900 (FIG. 39A). Once separated, the angled damage channel yields to pieces of substrate 3900A, 3900B with angled edges 3902A, 3902B (FIG. 39B).

Figure 40A:
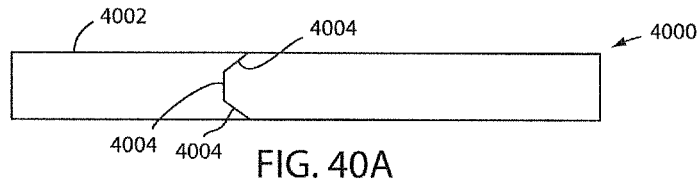
FIG. 40A is an illustration of a plurality of partial cuts in a substrate, in accordance with an embodiment of the present invention.
Figure 40B:
FIG. 40B is an illustration of an edge profile after venting, in accordance with an embodiment of the present invention.
Figure 40C:
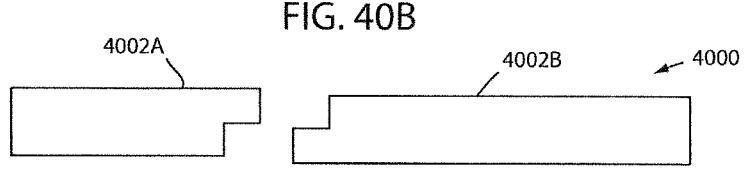
FIG. 40C is an illustration of an edge, in accordance with an embodiment of the present invention.

In regards to FIGS. 40A-40C, the ability to control the start and finish points of the plurality of laser induced channels 4004 can be used to make multiple partial cuts through the substrate 4002 that can yield complex edge profiles in an assembly 4000. The ability to generate a non-square or complex edge can either remove the need for further modification or greatly reduce the amount of seaming or grinding required to produce the intended profile. This also makes the surface easier to polish. Even for the case of a straight cut edge with a simple edge seam, the precision and flatness of the laser induced channel edge greatly reduces the amount of material that must be removed in the seaming process.

As described herein, the laser induced channels generated by the laser can also be used to chemically alter the glass surface. The resulting porosity generated by the damage channels can be filled with a solution such as a dye to modify the surface color and/or appearance. Alternatively, the porosity may be filled with a chemical precursor that can be reacted or decomposed to generate a material in the laser damage channels such as, for example, silver metal, which may be used for aesthetic or conductivity properties.

According to at least one embodiment, a series of laser induced channels or laser induced channel area can start below the substrate surface and can be put at a transition zone between flat and curved or curved and aspheric. The laser induced channel substrate can bend as if the substrate is thinner along the laser induced channel line. Because of scattering, the laser induced channel area can heat differently. This can create areas of different bending properties. The laser induced channel process does not apply pressure to the substrate to create a series of laser induced channels or laser induced channel area so the substrate need not be supported to withstand a high force to separate it successfully.

As described herein, the edge strength of the substrate can be affected by the damage on the edge of the glass. Decreasing the depth of the laser damage channel or creating rounded surfaces compared to sharp surfaces increased the edge strength of the substrate. It is noted that during the laser induced channel process, entry and exit point of the laser create a slightly rounded interface between the substrate edge and the substrate surface. The rounded interface provides an edge that does not need a seaming process to take off the sharp corners created in the scribe and vent method of glass processing. It is also noted that the dimensions of the edge damage are small, significantly smaller than the damage noted with scribed and vented glass. In one example, glass cut with the laser induced channel process that is unseamed was approximately 50% stronger than glass cut with the laser induced channel process and the seamed.

Figure 16:
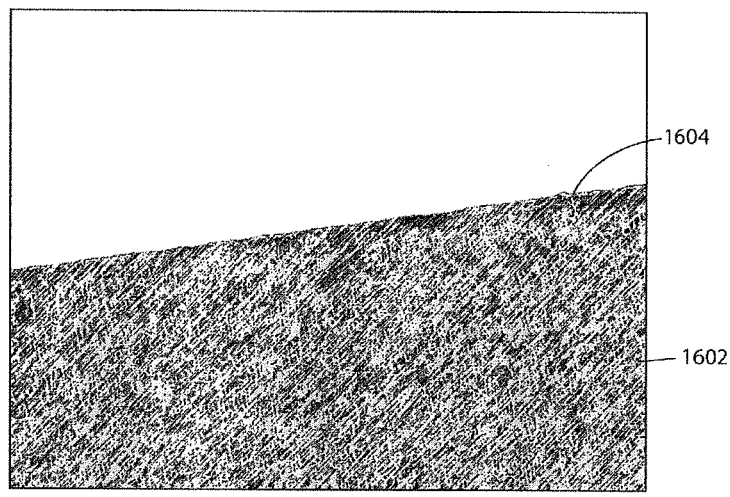
FIG. 16 is an illustration of a substrate having a laser induced channel edge, in accordance with an embodiment of the present invention.
Figure 17:
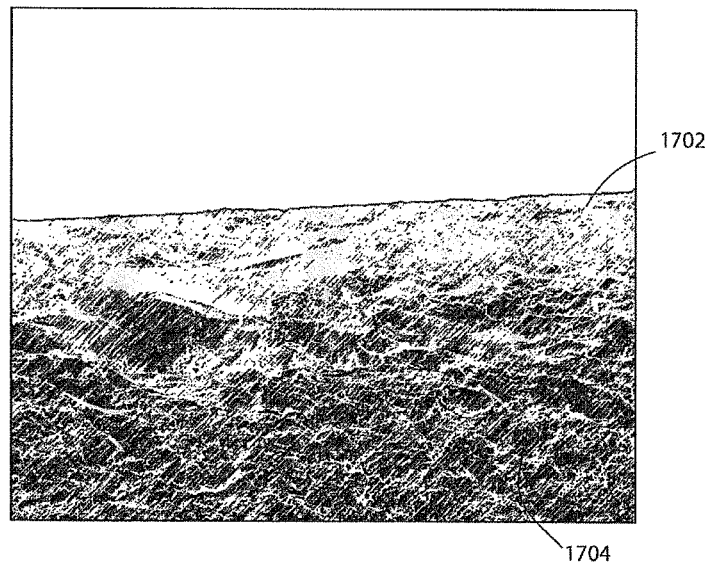
FIG. 17 is an illustration of a substrate having an edge prepared by a combination of abrasive treatments.

With respect to FIG. 16, a substrate 1602 can have a laser induced channel edge 1604. The laser induced channel edge 1604 has reduced induced area, as compared to a prior art scribed edge on a substrate that has first abrasive area 1702 closest to the edge and a second abrasive area 1704 distant from the edge where the substrate is induced due to the cutting process.

Figure 18:
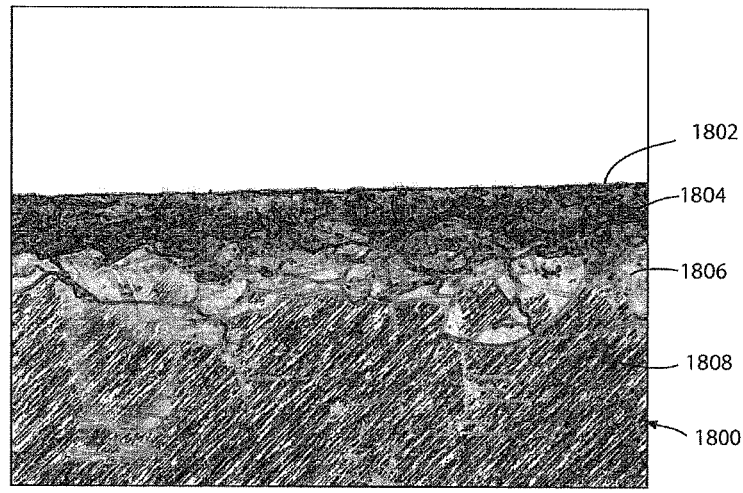
FIG. 18 is an illustration of a substrate having an edge prepared by a scribe and cleave method.

FIG. 18 illustrates a substrate 1800 with an edge 1802 cut using a prior art technique. The substrate 1800 has a crush zone 1804, microfractures 1806 that are distant from the edge 1802, and bulk glass 1806. The excessive damage (i.e., crush zone 1804 and microfractures 1806) are a result of the prior art cutting technique and not present in a substrate that has a laser induced channel edge.

Figure 19:
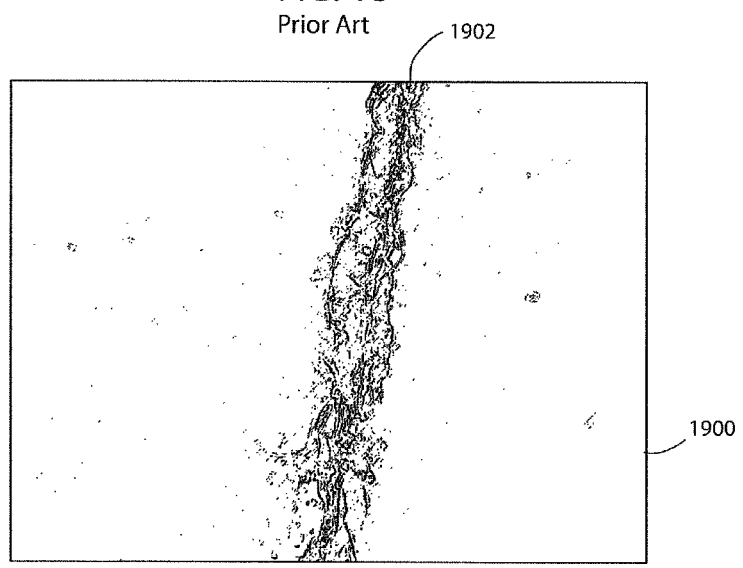
FIG. 19 is an illustration of a scribed cut in a glass surface before cleaving.
Figure 20:
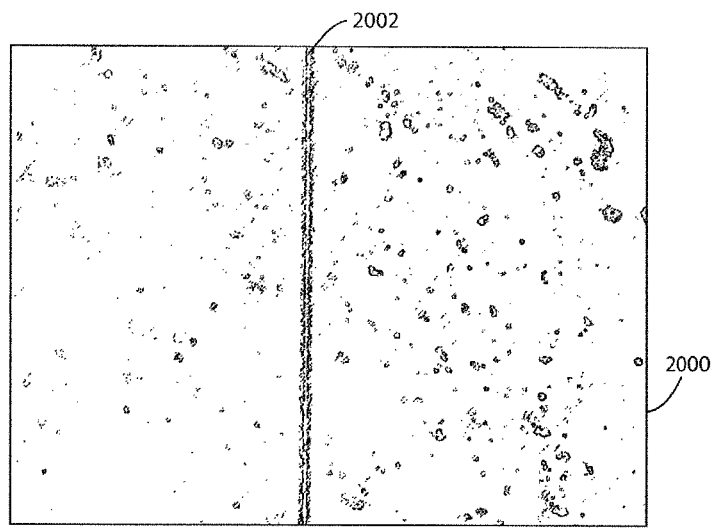
FIG. 20 is an illustration of a substrate having a plurality of laser induced channels, in accordance with an embodiment of the present invention.
Figure 22:
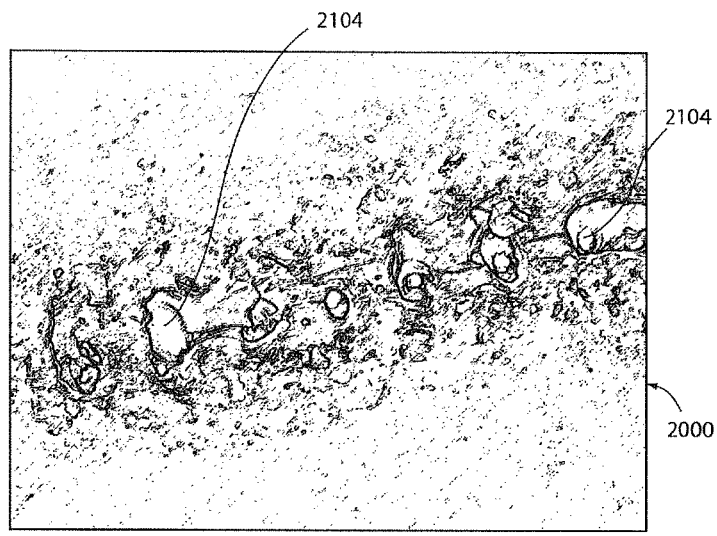
FIG. 22 is an illustration of a bottom surface of the substrate of FIG. 20, in accordance with an embodiment of the present invention.
Figure 23:
FIG. 23 is an illustration of the substrate having a laser induced channel edge of FIG. 16 at a higher magnification.

FIG. 19 is an illustration of a substrate 1900 having a scribed line 1902 using a prior art technique. Again the prior art technique causing more damage than a laser induced channel technique. This is illustrated in FIG. 20 where the substrate 2000 has a laser induced channel line 2002. FIG. 21 is a top view (surface where the laser enters the substrate) of the substrate of FIG. 20 at a higher magnification. Each laser induced channel 2104 can have a halo 2106. FIG. 22 is a bottom view (surface opposite where the laser enters the substrate) of the substrate of FIG. 20 at a higher magnification. According to at least one embodiment, the laser induced channels are approximately equally spaced. The approximate equal spacing of the laser induced channels can be around substantially all of a perimeter of a laser induced channel edge except for the start/stop area, as described herein. A portion of the laser induced channels 2104 extend to the surface. FIG. 23 illustrates a substrate having a laser induced channel edge similar to that of FIG. 16 but at a higher magnification.

The laser induced channel process can create tube-like channels through the substrate. The laser induced channels create a perforated line in the substrate from which an element (e.g., electro-optic element or other sandwich application) can be broken out. The surface of the laser induced channel substrate can have a perforation line approximately 4 microns wide (FIG. 20). A similar cut prepared by scribing the glass is at least 25 micron in width (FIG. 19). The narrower cut minimizes the need for significant edge treatment.

The laser induced channel process can form one or more laser induced channels in a substrate. When a plurality of laser induced channels are formed in a substrate, the laser induced channel process can form a line of spaced laser induced channels or an array of spaced laser induced channels.

The laser induced channel process can create an edge consisting of microtubes approximately 0.5 micron in diameter (FIG. 23). These microtubes can be spaced at a pitch of approximately 2.5 microns. The laser induced channels can be visible at the broken edge near the top and bottom surfaces of the substrate. Beginning approximately 10 microns to approximately 100 microns beneath each surface or approximately the surface to approximately 100 microns beneath each surface, microfractures can create a "frosted" edge at the center of the shape.

FIG. 18 shows the image of an untreated glass edge created by traditional means of scoring and breaking along the score line. There is substantive damage along the cleaved edge which goes below the score depth and penetrated perpendicular to the cut edge. This damage can weaken the strength of the glass resulting in poorer performance or the need for additional processing. The more damaged the glass due to the scribing process the more post processing is needed to make the edge uniform. As cutting wheels wear or degrade more pressure is needed to make a score line and thus, potentially, more damage to the glass. This creates, therefore, a continuously varying process needed to make good parts. The laser induced channel method and/or process described herein reduces or minimizes this continuously degrading cutting process and lead to more stable operations.

The scale of the roughness of the edge after separating the substrate using the laser induced channel process is less than the roughness of a post processed edge using traditional abrasive treatments. The characteristics of a surface influence the degree or magnitude of scattered light, its spectral response and angle effects. Typically, larger features lead to larger amounts of scattered light. Therefore, a traditionally treated glass edge will appear "whiter" due to the large features. In the case of the surface created with the laser filamentation process, the smaller features lead to a lower reflectance or "softer" appearance. This can be advantageous in a number of applications where specular reflectance is not desired and where a texture appearance is needed. Furthermore, the uniformity of the feature size can also affect the appearance. A tighter distribution may lead to larger variations as a function of wavelength while a larger distribution of feature sizes will lead to more uniform scattering as a function of wavelength. Typically, shorter wavelengths are scattered more than longer wavelengths and a tight distribution may therefore have a more "blue" appearance. As the distribution of surface features gets broader then there will be more equivalence in the wavelengths of the scattered light and the perceived color of the scattered light will vary away from a pure blue.

The smaller features also lead to a lower variation of scattering with angle relative to the surface and a light source. This can result in a more uniform appearance as the part is moved relative to the viewer and the light sources. For larger features, the scattering is highly angle dependent leading to altered appearances as a function of viewing position. The surface can then lead to a more uniform appearance as a function of viewing angle.

One example of product that has a substrate with at least one laser induced channel edge is an electro-optic mirror. According to an embodiment illustrated in FIGS. 26A-C, a mirror assembly 2600 can include a top plate or substrate (e.g., first substrate) 2602 and a bottom plate or substrate (e.g., second substrate) 2604, wherein the first substrate 2602 and second substrate 2604 define a cavity 2606 that includes an electro-optic medium 2608. The electro-optic medium 2608 in the mirror assembly 2600 can be further contained in the cavity 2606 by a seal 2610 that extends substantially around a perimeter of at least one of the first and second substrates 2602, 2604. The first substrate 2602 can include a spectrally reflective band (e.g., chrome) 2611 that extends substantially around the perimeter of the first substrate 2602.

At least one of the first and second substrates 2602, 2604 can have at least one laser induced channel edge. For purposes of explanation and not limitation, the first substrate 2602, can have a laser induced channel edge, as described herein for a ground edge (e.g., laser induced channel cut to reduce the amount of material removed during grinding), and/or the second substrate 2604 can have a laser induced channel edge, as described herein.

The mirror assembly 2600 can also include an element to mounting member attachment or carrier plate 2612 configured to operably connect to at least one of the first and second substrates 2602, 2604. One example of a connection between the carrier plate 2612 and the second substrate 2604 is an adhesive 2615. The mirror assembly 2600 can also include a housing 2614 operably connected to the carrier plate 2612. The mirror assembly 2600 can include at least one button generally indicated at reference identifier 2616, that can includes a switch 2618, indicia 2620, and circuitry 2622.

According to at least one embodiment, a product that has a substrate with at least one laser induced channel edge is an electro-optic mirror. According to an embodiment illustrated in FIGS. 27A-C, a mirror assembly 2700 can include a top plate or substrate (e.g., first substrate) 2702 and a bottom plate or substrate (e.g., second substrate) 2704, wherein the first substrate 2702 and second substrate 2704 define a cavity 2706 that includes an electro-optic medium 2708. The electro-optic medium 2608 in the mirror assembly 2700 can be further contained in the cavity 2706 by a seal 2710 that extends substantially around a perimeter of at least one of the first and second substrates 2702, 2704. The first substrate 2702 can include a spectrally reflective band (e.g., chrome) 2711 that extends substantially around the perimeter of the first substrate 2702.

At least one of the first and second substrates 2702, 2704 can have at least one laser induced channel edge. For purposes of explanation and not limitation, the first substrate 2702 can have a laser induced channel edge, as described herein for a ground edge (e.g., laser induced channel cut to reduce the amount of material removed during grinding), and/or the second substrate 2704 can have a laser induced channel edge, as described herein. Another example of the first substrate 2702 having a laser induced channel edge is hole or slot 2724 defined by the first substrate 2702.

The mirror assembly 2700 can also include an element to mounting member attachment or carrier plate 2712 configured to operably connect to at least one of the first and second substrates 2702, 2704. One example of a connection between the carrier plate 2712 and the second substrate 2704 is an adhesive 2715. The mirror assembly 2700 can also include a housing 2714 operably connected to the carrier plate 2712. The mirror assembly 2700 can include at least one button generally indicated at reference identifier 2716, that can includes a switch 2718, indicia 2720, circuitry 2722, an isolator 2726, and adhesive 2728.

According to an embodiment illustrated in FIGS. 28A-C, a mirror assembly 2800 can include a top plate or substrate (e.g., first substrate) 2802, and a bottom plate or substrate (e.g., second substrate) 2804, wherein the first substrate 2802 and second substrate 2804 define a cavity 2806 that includes an electro-optic medium 2808. The electro-optic medium 2808 in the mirror assembly 2800 can be further contained in the cavity 2806 by a seal 2810 that extends substantially around a perimeter of at least one of the first and second substrates 2802, 2804. The first substrate 2802 can include a spectrally reflective band (e.g., chrome) 2811 that extends substantially around the perimeter of the first substrate 2802.

At least one of the first and second substrates 2802, 2804 can have at least one laser induced channel edge. For purposes of explanation and not limitation, the first substrate 2802 can have a laser induced channel edge, as described herein for a ground edge (e.g., laser induced channel cut to reduce the amount of material removed during grinding), and/or the second substrate 2804 can have a laser induced channel edge, as described herein. Another example of the first substrate 2802 having a laser induced channel edge is hole or slot 2824 defined by the first substrate 2802. The first substrate 2802 can have a plurality of laser induced edges to define a plurality of holes 2824.

The mirror assembly 2800 can also include an element to mounting member attachment or carrier plate 2812 configured to operably connect to at least one of the first and second substrates 2802, 2804. One example of a connection between the carrier plate 2812 and the second substrate 2804 is an adhesive 2815. The mirror assembly 2800 can also include a housing 2814 operably connected to the carrier plate 2812. The mirror assembly 2800 can include at least one button generally indicated at reference identifier 2816, that can includes a switch 2818, indicia 2820, circuitry 2822, an isolator 2826, and adhesive 2828. The buttons 2816 can be separated such that a the first substrate 2802, defines holes 2824 for each switch 2818 and a portion of the first substrate 2802 is between proximate switches 2818.

According to an embodiment illustrated in FIGS. 37A-C, a mirror assembly 3700 can include a top plate or substrate (e.g., first substrate) 3702 and a bottom plate or substrate (e.g., second substrate) 3704, wherein the first substrate 3702 and second substrate 3704 define a cavity 3706 that includes an electro-optic medium 3708. The electro-optic medium 3708 in the mirror assembly 3700 can be further contained in the cavity 3706 by a seal 3710 that extends substantially around a perimeter of at least one of the first and second substrates 3702, 3704. The first substrate 3702 can include a spectrally reflective band (e.g., chrome) 3711 that extends substantially around the perimeter of the first substrate 3702.

At least one of the first and second substrates 3702, 3704 can have at least one laser induced channel edge. For purposes of explanation and not limitation, the first substrate 3702 can have a laser induced channel edge, as described herein for a ground edge (e.g., laser induced channel cut to reduce the amount of material removed during grinding), and/or the second substrate 3704 can have a laser induced channel edge, as described herein.

The mirror assembly 3700 can also include an element to mounting member attachment or carrier plate 3712 configured to operably connect to at least one of the first and second substrates 3702, 3704. One example of a connection between the carrier plate 3712 and the second substrate 3704 is an adhesive 3715. The mirror assembly 3700 can also include a housing 3714 operably connected to the carrier plate 3712. The mirror assembly 3700 can include at least one button generally indicated at reference identifier 3716, that can includes a switch 3718, indicia 3720, and circuitry 3722.

Figure 32:
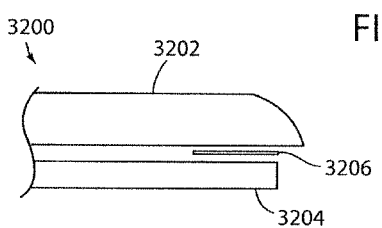
FIG. 32 is an exploded view of a rearview assembly, in accordance with an embodiment of the present invention.
Figure 33:
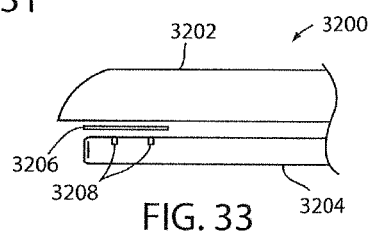
FIG. 33 is an exploded view of a rearview assembly, in accordance with an embodiment of the present invention.

According to at least one embodiment, as illustrated in FIGS. 29A and 29B, a product including at least one substrate having at least one laser induced channel edge can be a rearview mirror assembly 2900. A first substrate 2902 can include a hole or slot 2904 defined by a laser induced channel edge 2906 in the first substrate 2902. The hole or slot 2904 can be used for, but not limited to, one or more buttons, one or more microphones, one or more light sensors, one or more light sources, the like, or a combination thereof. However, it should be appreciated by those skilled in the art that similar holes or slots can be formed in substrates of other suitable products or assemblies. In regards to FIGS. 32 and 33, an assembly 3200 having at least one substrate with at least one laser induced channel edge can be a sandwich application, such as, but not limited to an electro-optic mirror. The assembly 3200 can have a first substrate 3202 that can have a laser damage channel edge, a second substrate 3204 that has a laser induced channel edge, or a combination thereof. Typically, a sandwich assembly 3200 has a seal 3206 (e.g., epoxy) between the two substrates 3202, 3204. As illustrated in FIG. 33, one substrate (e.g., the second substrate 3204) can define one or more rough areas or channels 3308 formed my laser induced channels. The seal can be at least partially contained in these areas, such that the seal can have a reduced perceived width as compared to a prior art seal, as described herein. The seal material can wick into the channels increasing bond strength and allowing for a reduced width.

By way of explanation and not limitation, a reduced perceived width of the seal in an electro-optic mirror can be where the first substrate has an angled laser induced channel edge (FIG. 4B), such that the second surface has more surface area than the first surface and a housing can cover a portion of the seal, such that a width a reflective coating (e.g., chrome) that covers the remaining portion of the seal has a width smaller than the width of the seal. Additionally or alternatively, a repeatable accurately cut edge, such as the laser induced channel edge, allows for the seal to be placed closer to the edge (e.g., since the seal placement does not have to consider higher tolerances or differences in edge location). Depending upon the angle of the laser induced channel edge and/or the accuracy, of the laser induced channel edge, the perceived seal width can be less than approximately 0.60 mm, less than approximately 0.55 mm, less than approximately 0.50 mm, less than approximately 0.40 mm, less than approximately 0.30 mm, less than approximately 0.28 mm, ranging from and including approximately 0.28 mm to approximately 0.60 mm, ranging from and including approximately 0.28 mm to approximately 0.55 mm, ranging from and including 0.28 mm to approximately 0.50 mm, ranging from and including 0.28 mm, to approximately 0.40 mm, ranging from and including approximately 0.28 mm to approximately 0.30 mm, or a combination thereof.

Figure 34:
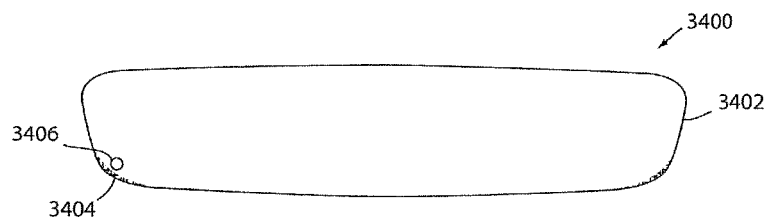
FIG. 34 is a front view of a rearview assembly, in accordance with an embodiment of the present invention.

With respect to FIG. 34, an assembly 3400 having a substrate 3402 with at least one laser induced channel area 3404 that is configured to diffuse light emitted by a light source 3406. One such example is a rearview mirror (e.g., electro-optic and non-electro-optic), wherein the light source 3406 can be used to emit light to warn a vehicle occupant (e.g., blind spot alert). In such an embodiment, laser induced channels can be formed in the substrate 3402 to make the surface rough rather than form holes (e.g., diffuse light).

Figure 35:
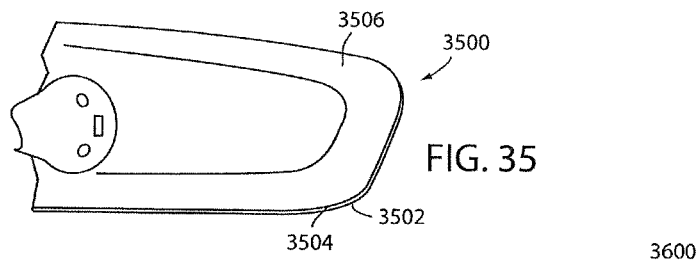
FIG. 35 is a rear view of a rearview assembly, in accordance with an embodiment of the present invention.

In regards to FIG. 35, an assembly 3500 having a substrate 3502 with at least one induced channel edge 3504 can be a rearview mirror (e.g., electro-optic or non-electro-optic). In such an embodiment, the laser induced channel edge 3504 can be processed after being operably connected to a housing 3506, such that edge 3504 of the substrate 3502 is substantially flush with the housing 3506. Alternatively, the laser induced channel edge 3504 does not need to be modified after assembly, such that the laser induced channel edge 3504 is precisely cut and the edge 3504 is substantially flush with the housing 3506.

By way of explanation and not limitation, in the fabrication of liquid cell based devices such as LCD or electro-optic devices, the control of cell spacing can be important. The formation of mechanically and chemically durable seals for these cells can also be important. One common approach to sealing a cell while maintaining cell spacing control is to formulate a highly durable adhesive, such as an epoxy, and to load it with spacer beads with monodisperse size equal to the intended cell spacing. Some glass cells have been fabricated through the use of a glass frit based adhesive to form the seal around the edge of the cell. These glass frit materials are thermally cured to form a glass material; generally at a lower melting point than typical soda-lime glass. A disadvantage of this approach is that it can be difficult to formulate a glass frit material with a coefficient of thermal expansion close enough to the glass used for the cell to minimize the coefficient of thermal expansion mismatch generated stress during curing and cooling. An alternative approach is to use a glass gasket to hold proper cell spacing and form the edge seal. This can require the processing of a very thin sheet of glass (e.g., on the order of approximately 0.2 mm for many electrochromic cells). A thin sheet of glass, of the thickness of the intended cell spacing, can be cut in the shape of the seal at the edge of the electrochromic cell. This can be produced through a use of the laser induced channel process.

Figure 41A:
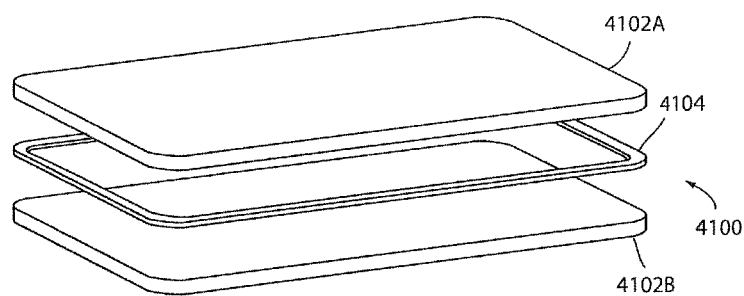
FIGS. 41A and 41B are illustrations of two glass lites forming a cell that are spaced apart and joined at a glass gasket, in accordance with an embodiment of the present invention.
Figure 41B:
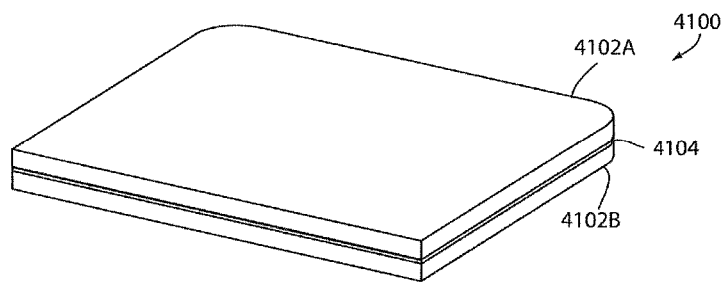

In regards to FIGS. 41A and 41B, two lites of substrate 4102A, 4102B form a cell 4100, wherein the substrates 4102A. 4102B can be spaced apart and joined by the gasket 4104 (e.g., glass gasket). The components might then be fused together thermally. The fusing process might involve the addition of a small quantity of chemicals, such as, but not limited to, a fluxing agent, to the interfaces between the gasket 4104 and the substrates 4102A, 4102B to reduce the fusing temperature. Alternatively, a laser might be used to selectively fuse the gasket 4104 to the substrates 4102A, 4102B. Yet another alternative is an adhesive, such as, but not limited to, an epoxy that can be used to join the substrates 4102A, 4102B to the gasket 4104. The gasket 4104 may form a complete seal around the entire periphery of the cell 4104 or one or more gaps might be left in the gasket 4104 to enable filling of the cell, etc.

Figure 42A:
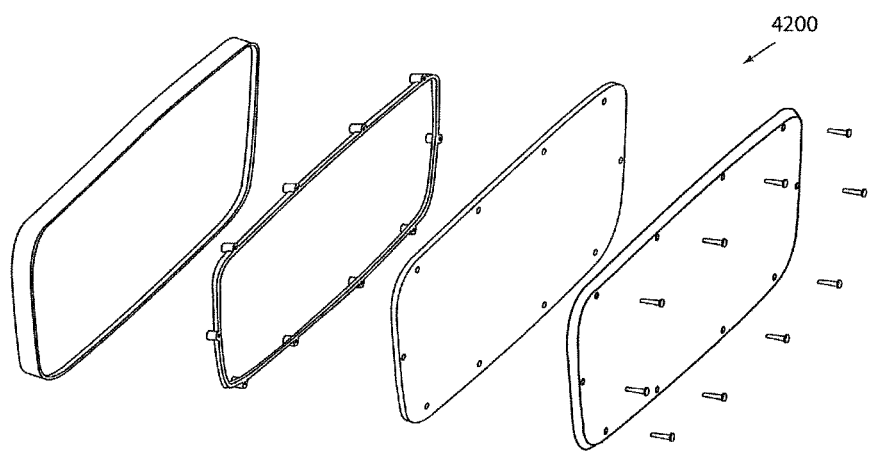
FIG. 42A is an exploded perspective view of an assembly having a bezel with attachment features substantially through an element, in accordance with an embodiment of the present invention.
Figure 42B:
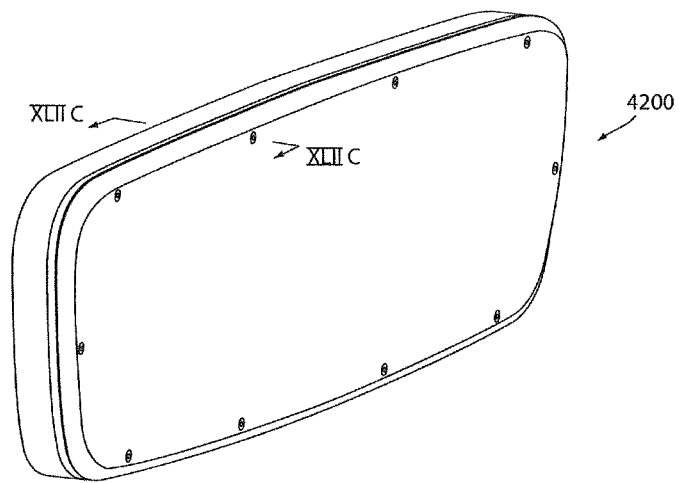
FIG. 42B is a perspective view of the assembly of FIG. 42A.
Figure 42C:
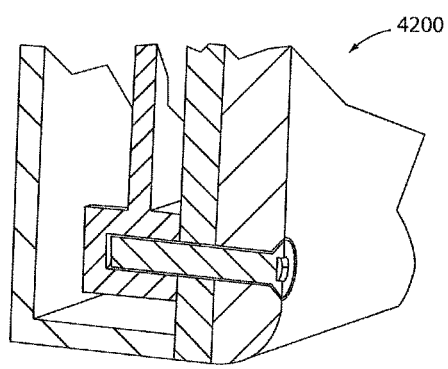
FIG. 42C is a cross-sectional view of the assembly of FIG. 42A across line A-A of FIG. 42B.

Other examples of using holes that are formed by laser induced channels are illustrated in FIGS. 42A-42C, wherein rearview assemblies 4200 include such holes. In such an embodiment, one or more holes that are defined by laser induced channel edges can be configured to have an attachment device (e.g., screw, rivet, etc. extend through the substantially transparent substrate at connect to another component, such as a carrier plate and/or a housing. In an embodiment where the attachment device extending through the substantially transparent substrate directly connects to only the carrier plate, the carrier plate can operably connect to the housing.

According to at least one embodiment, the laser induced channel area can be overcoated with a conductive coating so the charge density of the electrode can increase, and charged species can diffuse into the holes to increase storage capacity of the charged species. Thus, slower to color/clear in this area for diffusion limited electro-optic devices.

Indicia can be formed by a plurality of laser induced channels into substrate, according to at least one embodiment. For example, the indicia "EC-ON," etc. can be formed. The controlled internal damage to the substrate can also be adapted to create indicia within the substrate. Words or images may be created by controlling the focusing of the laser beam at different locations and depths within the substrate. Indicia (channels in indicia pattern) can color or clear slower than other portions of the electro-optic element.

Figure 15:
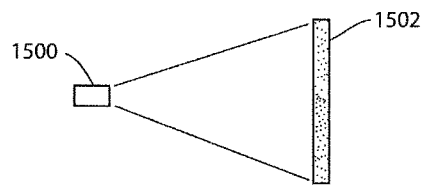
FIG. 15 is an illustration of light projecting to a substrate, in accordance with an embodiment of the present invention.

In regards to FIG. 15, a diffuser for projection display can be below a transflector surface. An example is described in U.S. Pat. No. 7,821,696, entitled "ELECTROCHROMIC REARVIEW MIRROR ASSEMBLY INCORPORATING A DISPLAY/SIGNAL LIGHT," which is hereby incorporated herein by reference in its entirety. The projected light from a light source 1500 can interact with a translucent, diffusing media 1502 formed of at least one laser induced channel to create an image (FIG. 15). This is comparable to a movie screen in a theater where the projected image is viewable because the screen scatters the light back to the audience. In other similar applications the image is projected from behind onto a movie screen toward the audience. This concept was applied and modified to work in a mirror. Instead of a diffuser or sandblasting of the glass to create a translucent diffuser, laser induced channels can be formed within the substrate. Microscopic damage within the glass leads to scattering of the light and thus a translucent material. This improved method for creating the diffusion of light can be tuned or adjusted by changing the magnitude and population of the damage scattering centers.

Figure 12:
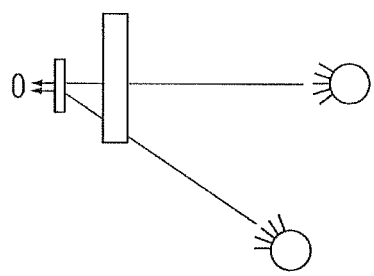
FIG. 12 is an illustration of light passing through a substrate, in accordance with an embodiment of the present invention.
Figure 13:
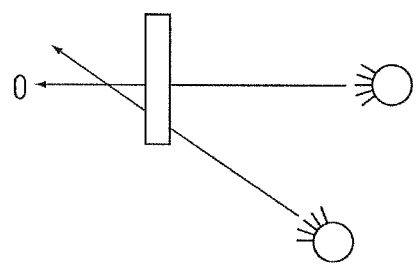
FIG. 13 is an illustration of light passing through a substrate, in accordance with an embodiment of the present invention.
Figure 14:
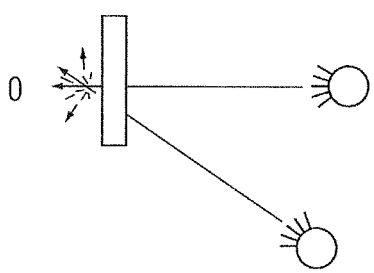
FIG. 14 is an illustration of light passing through a substrate, in accordance with an embodiment of the present invention.

According to at least one embodiment, a diffuser for a photocell can be in a substrate (e.g., second or third substrate). For example, glare sensor for switchable mirrors, such as electrochromic mirrors, optimally detects glare conditions from directly behind the vehicle and out to the sides. In some instances the detection of the glare is assisted by a secondary optic (FIG. 12). The secondary optic collects light from off angles and directs it toward the glare sensor. Without a secondary optic, a side glare source not being detected by the sensor (FIG. 13). This secondary optic component may be replaced by a scattering structure created within the glass itself (FIG. 14). The laser induced channels within the substrate which in turn scatters light. A headlights of a vehicle position to either side of the vehicle with the mirror will be able to detect the glare condition. Light can be scattered by the laser induced channels to expand the field of view of a photosensor mounted behind the glass.

The coloring and clearing of an electrochromic element can be dependent on the charge transfer between the electrodes (e.g., transparent and reflective in a mirror element) and the electrochromic species in the gel. The charge transfer can happen at the surfaces and the charge altered species diffuse into the bulk of the gel where they remain until they encounter a complementary species, experience the reverse charge transfer, and revert back to the clear state. In the case where the entire electrode surfaces are continuous and uninterrupted the darkening and clearing is relatively uniform. This is because the effective potential at any given location is similar (within limits) and the diffusion pathway for the species to reach a counter charge molecule are equivalent.

In U.S. Pat. No. 8,169,684, entitled "VEHICULAR REAR VIEW MIRROR ELEMENTS AND ASSEMBLIES INCORPORATING THESE ELEMENTS," and U.S. Patent Application Publication Nos. 2013/0170013, entitled "AUTOMOTIVE REARVIEW MIRROR WITH CAPACITIVE SWITCHES" and 2012/0229882, entitled "REARVIEW ASSEMBLY FOR A VEHICLE", all of which are hereby incorporated herein by reference in their entirety, teaches examples of how interruptions in the electrodes affects the uniformity of darkening and the rate of clearing for glare sensor "eyeholes." Different length scales can result in delays relative to the unaltered electrode surface. In the case of the eyeholes we taught ways to minimize the differences in darkening and clearing in the two areas to maximize the effectiveness of the glare sensor operation behind the eyehole.

In this different embodiment, a controlled lag can be created in the area of the indicia relative to the main reflector to create a temporary indicia for indicating that the "EC ON" function is engaged. By controlling the relative size and spacing of the features in the coatings via the laser process the size and delay of the darkening can be controlled, thus achieving a range of options as needed for different customers or applications.

Alternatively, a microscopically altered surface texture in the areas of the indicia with the laser induced channels can be formed. The coatings could be applied after the texturing takes place. The texturing would result in a localized increase in the surface area which in turn would lead to an increase in charge species and thus a faster change in reflectance. This can be done to the substrate either to the transparent electrode on the second surface or on the reflector electrode on the third surface or both. Depending on which substrate or substrates are textured we can either alter the color of the indicia or the rate of darkening in the area. If only one of the two surfaces is textured then there can be an altered ratio of charged or darkened species. This may not be noticeable in a well darkened state but during the clearing process there would result in a lag of one species behind the other, again resulting in a mismatch of colors in the area of the indicia.

If the feature size of the texture is small then it may not be noticeable or be minimally noticeable in the clear state. Some experimentation and optimization would be needed to attain different ratios of colors, lag times and feature size.

Laser induced channel processing of glass or ceramic substrates enables the high speed fabrication of multilayer interposers. Fabrication of high density interposers out of glass substrates can be desirable because glass has high electrical resistivity, low dielectric loss, a smooth surface finish, is available in ultrathin large sheets, has good thermal conductivity, has a coefficient of thermal expansion similar to silicon, has high strength, high modulus, good dimensional stability, good chemical resistance, good humidity resistance and is low in cost. Glass however is difficult to fabricate. Glass cannot quickly and easily be drilled or machined. It is also difficult to quickly and easily cut a glass multilayer interposer array into small intricate shapes. With the laser induced channel process it is possible to drill holes in glass at high speed. The pitch or distance between holes drilled by the laser induced channel process can be as small as approximately 5 micron which allows for high density interconnects. The holes can be made directly by the laser induced channel process alone or a combination of filamentation and etching using a fluoride base etching solution like HF or ammonium bifluoride or an alkaline etching solution like KOH or NaOH. The laser induced channel area has an etch rate much higher than virgin glass. The etching process can be accelerated by heat, flow or ultrasonic activity. Laser induced channels can also be used to quickly create channels in the glass or along the surface of a glass substrate to provide a path for a cooling solution or an optical channel or path for guided light transmission. These channels could be produced by laser induced channel process alone or a combination of laser induced channel process followed by chemical etching. For optical communication optical transmission channels could be filled with air, a gas or a high or low index material or multiple materials with different refractive indexes. With the laser induced channel process it is also possible to quickly and efficiently separate a single, double or multilayer substrate array into intricate shapes. The laser induced process could be configured such that it would cut through all layers of a multilayer interposer or be configured to cut selective layers of the multilayer interposer. In this way offsets could be formed between the interposer layers to enable contact to separate interposer layer surfaces or aid in mechanically fastening or fixturing the interposer. This also allows the mixing of channel layers to facilitate thermal transfer, optical and electrical signals.

Figure 45:
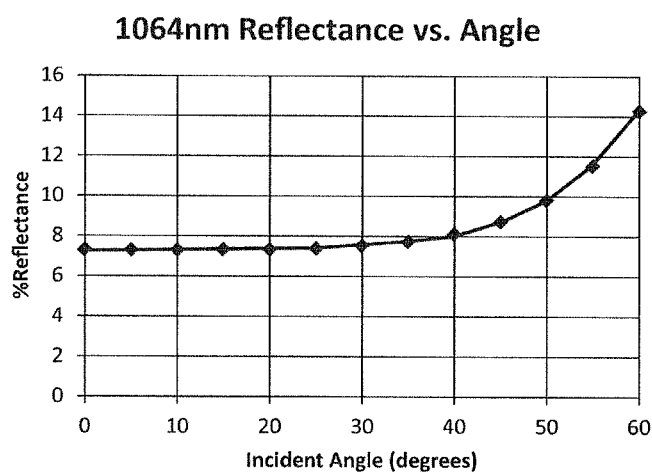
FIG. 45 is a chart illustrating reflectance with respect to incident angle of a substrate having a laser induced channel, in accordance with an embodiment of the present invention.

In the process of laser induced channel cutting of glass or glass-like substrates, the depth of the damage channel created by the laser is essentially limited by the absorption of the material and the power of the laser. Part of the energy loss is due to reflection of a fraction of the energy from the surface of the substrate. The reflective loss will general become more significant as the incident angle of the beam is increased from normal to the substrate (FIG. 45). This increased reflectance loss with angle limits the ability to make cuts at angle in the substrate. Beyond a small angle, which is limited by the surface reflectance and beam power, the damage channels will not form or will be very short.

Figure 46:
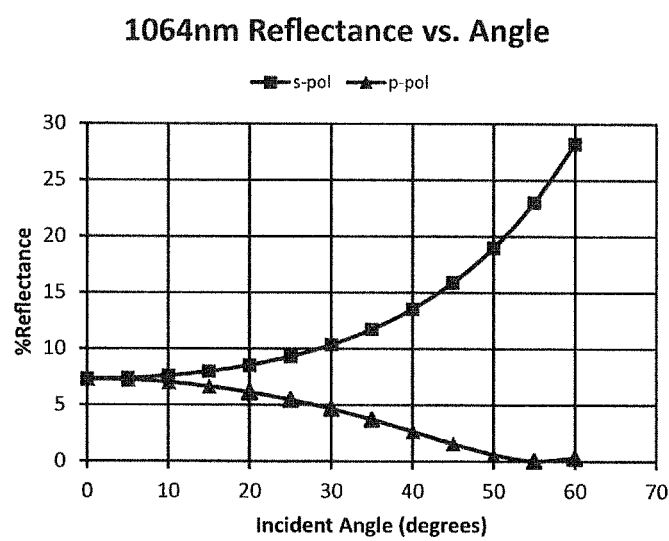
FIG. 46 is a chart illustrating reflectance with respect to incident angle of a substrate having a laser induced channel, in accordance with an embodiment of the present invention

A complication of the reflectance change with angle is that polarized light behaves differently. At normal incidence the behavior of s- and p-polarized light is identical. As angle deviates from normal incidence, the reflectance of s-polarized light increases with angle and the reflectance of p-polarized light decreases with angle (FIG. 46). This introduces interesting effects to the filamentation process since the output of most lasers is polarized. FIGS. 47A-47D illustrate light being focused by a lens in a conical pattern. Depending on what radial angle of the lens the light originates from, its relative polarization bias, p or s, relative to the substrate, changes when the incoming beam is linearly polarized. Changing the incident angle of the beam relative to the substrate further complicates this biasing. For making angled cuts it would be preferable to angle the optic relative to the substrate surface such that the highest angular deviations from normal correspond to p-polarization thereby minimizing the increase in reflection due to angle. This approach is straightforward for linear cuts. For circular cuts it may be preferable to angle the substrate relative to the optics and rotate the substrate so that the p-polarization bias is maintained throughout the cut.

Another approach to minimizing this effect and thereby increasing the angle at which cuts can be made is to antireflect the surface at the laser wavelength. This will reduce or substantially eliminate the reflective losses and increase the angle range for which cutting is possible. This also substantially reduces the polarization impact described above. To one skilled in the art it will be readily apparent that antireflection can be obtained by several routes. One route is the application of an optical coating to the surface such as a single quarter wave of intermediate index. More complicated designs such a V-coats or multilayer coatings can also be used. It is also possible to antireflect the interface with the substrate by providing and index matched medium, such as a fluid, between the beam optics and the substrate surface. The medium, which replaces air, should have low absorbance at the laser wavelength. This may involve the use of an additional cover beyond the final optical component, as not to disturb the design focus, or a different final optic. By using a medium such as a fluid between the laser optic and the substrate that is index matched to the substrate the reflectance and angular effects are essentially negated (FIG. 48).

An example of a laser induced channel can be a filamentation, according to at least one embodiment. Examples of laser systems are described in U.S. Pat. No. 6,552,301, entitled "BURST ULTRAFAST LASER MACHINING METHOD," WO 2009/103313, entitled "GENERATION OF BURST OF LASER PULSES," and WO 2012/006736, entitled "METHOD OF MATERIAL PROCESSING BY LASER FILAMENTATION," which are hereby incorporated herein by reference in their entirety.

In describing the order of elements or components in one or more embodiments, including vehicular rearview assembly embodiments, the following convention can be generally followed herein. The order in which the surfaces of sequentially positioned structural elements of the assembly (such as a substantially transparent substrates) can be viewed is the order in which these surfaces are referred to as the first surface, the second surface, the third surface, and other surfaces if present referred to in ascending order. The term "behind" can refer to a position, in space, following something else and suggests that one element or thing is at the back of another as viewed from the front of the rearview assembly, and/or the term "in front of" can refer to a forward place or position, with respect to a particular element as viewed from the front of the assembly, according to one or more embodiments. Examples are described in U.S. Pat. Nos. 6,700,692, 7,372,611, and 8,169,684, and U.S. patent application Ser. Nos. 12/496,620, 12/774,721, 13/395,069 and Ser. No. 13/470,147, all of which are hereby incorporated herein by reference in their entirety.

According to at least one embodiment, the electrochromic medium can comprises at least one solvent, at least one anodic material, and at least one cathodic material.

Typically, both of the anodic and cathodic materials are electroactive and at least one of them is electrochromic. The term "electroactive" can be a material that undergoes a modification in its oxidation state upon exposure to a particular electrical potential difference, and/or the term "electrochromic" can be a material that exhibits a change in its extinction coefficient at one or more wavelengths upon exposure to a particular electrical potential difference, according to one or more embodiments.

The electrochromic medium can be one of the following categories:

(I) Single-layer, single-phase—The electrochromic medium may comprise a single-layer of material which may include small non-homogenous regions, and include solution-phase devices where a material may be contained in solution in an ionically conducting electrolyte which remains in solution in the electrolyte when electrochemically oxidized or reduced. Solution-phase electroactive materials may be contained in the continuous solution-phase of a gel medium in accordance with the teachings of U.S. Pat. No. 5,928,572 entitled "Electrochromic Layer And Devices Comprising Same," and International Patent Application Serial No. PCT/US98/05570 entitled "Electrochromic Polymeric Solid Films, Manufacturing Electrochromic Devices Using Such Solid Films, And Processes For Making Such Solid Films And Devices," both of which are hereby incorporated herein by reference in their entirety.

More than one anodic and cathodic material can be combined to give a pre-selected color as described in U.S. Pat. No. 5,998,617 entitled "Electrochromic Compounds," U.S. Pat. No. 6,020,987 entitled "Electrochromic Medium Capable Of Producing A Pre-selected Color," U.S. Pat. No. 6,037,471 entitled "Electrochromic Compounds," and U.S. Pat. No. 6,141,137 entitled "Electrochromic Media For Producing A Pre-selected Color," all of which are hereby incorporated herein by reference in their entirety including all references incorporated and/or cited therein.

The anodic and cathodic materials may also be combined or linked by a bridging unit as described in U.S. Pat. No. 6,241,916 entitled "Electrochromic System" and/or U.S. Patent Publication No. 2002/0015214 A1 entitled "Electrochromic Device," which are hereby incorporated herein by reference in their entirety including all references incorporated and/or cited therein. The electrochromic materials may also include near-infrared (NIR) absorbing compounds as described in U.S. Pat. No. 6,193,912 entitled "Near Infrared-Absorbing Electrochromic Compounds And Devices Comprising Same," which is hereby incorporated herein by reference in its entirety including all references incorporated and/or cited therein.

It is also possible to link anodic materials or cathodic materials by similar methods. The concepts described in these patents can further be combined to yield a variety of electroactive materials that are linked or coupled, including linking of a redox buffer, such as linking of a color-stabilizing moiety, to an anodic and/or cathodic material.

The anodic and cathodic electrochromic materials can also include coupled materials as described in U.S. Pat. No. 6,249,369 entitled "Coupled Electrochromic Compounds With Photostable Dication Oxidation States," which is hereby incorporated herein by reference in its entirety including all references incorporated and/or cited therein.

The concentration of the electrochromic materials can be selected as taught in U.S. Pat. No. 6,137,620 entitled "Electrochromic Media With Concentration Enhanced Stability, Process For The Preparation Thereof and Use In Electrochromic Devices," which is hereby incorporated herein by reference in its entirety including all references incorporated and/or cited therein.

Additionally, a single-layer, single-phase medium may include a medium where the anodic and cathodic materials are incorporated into a polymer matrix as is described in International Patent Application Serial No. PCT/EP98/03862 entitled "Electrochromic Polymer System," and International Patent Application Serial No. PCT/US98/05570 entitled "Electrochromic Polymeric Solid Films, Manufacturing Electrochromic Devices Using Such Solid Films, And Processes For Making Such Solid Films And Devices," which is hereby incorporated herein by reference in its entirety including all references incorporated and/or cited therein.

(II) Multi-layer—The electrochromic medium may also be prepared in layers and include a material attached directly to an electrically conducting electrode or confined in close proximity thereto which remains attached or confined when electrochemically oxidized or reduced.

(III) Multi-phase—The electrochromic medium may further be prepared using multiple phases where one or more materials in the medium undergoes a change in phase during the operation of the device, for example a material contained in solution in the ionically conducting electrolyte forms a layer on the electrically conducting electrode when electrochemically oxidized or reduced.

The present invention may be used with a mounting system such as that described in U.S. Pat. Nos. 8,201,800; 8,210,695; U.S. patent application Ser. Nos. 13/600,496; 13/527,375; 13/431,657; 13/402,701; 12/187,019, and U.S. Provisional Patent Application Nos. 61/709,716; 61/707,676; and 61/704,869, which are hereby incorporated herein by reference in their entirety. Further, the present invention may be used with a rearview packaging assembly such as that described in U.S. Pat. No. 8,264,761; U.S. patent application Ser. Nos. 13/567,363; 13/405,697; 13/402,701; and Ser. No. 13/171,950, and U.S. Provisional Patent Application Nos. 61/707,625; and 61/590,259, which are hereby incorporated herein by reference in their entirety. Additionally, it is contemplated that the present invention can include a bezel such as that described in U.S. Pat. Nos. 8,201,800; 8,210,695; and U.S. patent application Ser. No. 13/271,745, which is hereby incorporated herein by reference in its entirety.

According to at least one embodiment, an apparatus includes a substantially transparent substrate having at least one laser induced channel edge, wherein a roughness of the at least one laser induced channel edge across a thickness is an Rq value of less than approximately 1.6 after being formed without post edge formation processing.

According to at least one embodiment, an apparatus includes a substantially transparent substrate having a first surface, a second surface, and edge extending around at least a portion of a perimeter of the substantially transparent substrate, the improvement including the edge being a laser induced channel edge, wherein a roughness of the laser induced channel edge across a thickness is an Rq value of less than approximately 1.6 after being formed without a post edge formation processing.

According to at least one embodiment, a method of forming a substantially transparent substrate for use in an apparatus, the method comprising the steps of: forming a plurality of laser induced channels in the substrate, and separating the substrate along the plurality of laser induced channels, wherein a roughness of the laser induced channel edge across a thickness has an Rq value of less than approximately 1.6 after being formed without a post edge formation process.

According to at least one embodiment, a process for preparing a substantially transparent substrate for use in an apparatus, the process comprising the steps of: forming a plurality of laser induced channels in the substrate, and separating the substrate along the plurality of laser induced channels, wherein a roughness of the laser induced channel edge across a thickness has an Rq value of less than approximately 1.6 after being formed without a post edge formation process.

According to at least one embodiment, an apparatus includes a substantially transparent substrate having at least one laser induced channel edge, the substantially transparent substrate including a first portion extending along a path, a second portion extending along the path a third portion extending along the path, wherein the second portion is between the first portion and the third portion, and wherein a roughness of the at least one laser induced channel edge is substantially equal in two of the first portion, the second portion, and the third portion.

According to at least one embodiment, an apparatus includes a substantially transparent substrate having a first surface, a second surface, and edge extending around at least a portion of a perimeter of the substantially transparent substrate, the edge comprising a first portion extending along a path, a second portion extending along the path, and a third portion extending along the path, wherein the second portion is between the first portion and the third portion, the improvement including the edge being a laser induced channel edge, wherein a roughness of the at least one laser induced channel edge is substantially equal in two of the first portion, the second portion, and the third portion.

According to at least one embodiment, a method of forming a substantially transparent substrate for use in an apparatus, the a substantially transparent substrate having a first surface, a second surface, and edge extending around at least a portion of a perimeter of the substantially transparent substrate, the edge comprising a first portion extending along a path, a second portion extending along the path, and a third portion extending along the path, wherein the second portion is between the first portion and the third portion, the method comprising the steps of: forming a plurality of laser induced channels in the substrate, and separating the substrate along the plurality of laser induced channels, wherein a roughness of the at least one laser induced channel edge is substantially equal in two of the first portion, the second portion, and the third portion.

According to at least one embodiment, a process for preparing a substantially transparent substrate for use in an apparatus, the a substantially transparent substrate having a first surface, a second surface, and edge extending around at least a portion of a perimeter of the substantially transparent substrate, the edge comprising a first portion extending along a path, a second portion extending along the path, and a third portion extending along the path, wherein the second portion is between the first portion and the third portion, the process comprising the steps of: forming a plurality of laser induced channels in the substrate, and separating the substrate along the plurality of laser induced channels, wherein a roughness of the at least one laser induced channel edge is substantially equal in two of the first portion, the second portion, and the third portion.

According to at least one embodiment, an apparatus includes a substantially transparent substrate having at least one laser induced channel edge, wherein the at least one laser induced channel edge has less than approximately 230 deformations per 1.75 mm$^2$.

According to at least one embodiment, an apparatus includes a substantially-transparent substrate having at least one edge extending around at least a portion of a perimeter of the substantially transparent substrate, the improvement including: the edge being a laser induced channel edge, wherein the at least one laser induced channel edge has less than approximately 230 deformations per 1.75 mm$^2$.

According to at least one embodiment, a method of forming a substantia transparent substrate for use in an apparatus, the a substantially transparent substrate having at least one edge extending around at least a portion of a perimeter of the substantially transparent substrate, the method comprising the steps of: forming a plurality of laser induced channels in the substrate, and separating the substrate along the plurality of laser induced channels, wherein the at least one edge is a laser induced channel edge has less than approximately 230 deformations per 1.75 mm$^2$.

According to at least one embodiment, a process for preparing a substantially transparent substrate for use in an apparatus, the a substantially transparent substrate having a first surface, a second surface, and edge extending around at least a portion of a perimeter of the substantially transparent substrate, the process comprising the steps of: forming a plurality of laser induced channels in the substrate, and separating the substrate along the plurality of laser induced channels, wherein the at least one laser induced channel edge has less than approximately 230 deformations per 1.75 mm$^2$.

According to at least one embodiment, an apparatus comprising: a substantially transparent substrate including at least one laser induced channel edge, wherein the at least one laser induced channel edge has a hoop stress strength, such that the laser induced channel edge fails ranging from and including approximately 32 MPa to approximately 42 MPa.

According to at least one embodiment, an apparatus includes a substantially transparent substrate having at least one edge extending around at least a portion of a perimeter of the substantially transparent substrate, the improvement including: wherein the substantially transparent substrate having at least one edge this is a laser induced channel edge has a hoop stress strength, such that the laser induced channel edge fails ranging from and including approximately 32 MPa to approximately 42 MPa.

According to at least one embodiment, a method of forming a substantially transparent substrate for use in an apparatus, the a substantially transparent substrate having at least one edge extending around at least a portion of a perimeter of the substantially transparent substrate, the method comprising the steps of: forming a plurality of laser induced channels in the substrate, and separating the substrate along the plurality of laser induced channels, wherein the substantially transparent substrate having at least one edge that is a laser induced channel edge has a hoop stress strength, such that the laser induced channel edge fails ranging from and including approximately 32 MPa to approximately 42 MPa.

According to at least one embodiment, a process for preparing a substantially transparent substrate for use in an apparatus, the a substantially transparent substrate having at least one edge extending around at least a portion of a perimeter of the substantially transparent substrate, the process comprising the steps of: forming a plurality of laser induced channels in the substrate, and separating the substrate along the plurality of laser induced channels, wherein the substantially transparent substrate has at least one edge that is a laser induced channel edge has a hoop stress strength, such that the laser induced channel edge fails ranging from and including approximately 32 MPa to approximately 42 MPa.

According to at least one embodiment, an apparatus includes a substantially transparent substrate comprising at least one laser induced channel edge, wherein the at least one laser induced channel edge has essentially zero kerf.

According to at least one embodiment, an apparatus includes a substantially transparent substrate having at least one edge extending around at least a portion of a perimeter of the substantially transparent substrate, the improvement including wherein the at least one edge is a laser induced channel edge that has essentially zero kerf.

According to at least one embodiment, a method of forming a substantially transparent substrate for use in an apparatus, the a substantially transparent substrate having at least one edge extending around at least a portion of a perimeter of the substantially transparent substrate, the method comprising the steps of: forming a plurality of laser induced channels in the substrate, and separating the substrate along the plurality of laser induced channels, wherein the at least one edge is a laser induced channel edge That has essentially zero kerf.

According to at least one embodiment, a process for preparing a substantially transparent substrate for use in an apparatus, the a substantially transparent substrate having at least one edge extending around at least a portion of a perimeter of the substantially transparent substrate, the process comprising the steps of: forming a plurality of laser induced channels in the substrate, and separating the substrate along the plurality of laser induced channels, wherein the at least one edge is a laser induced channel edge that has essentially zero kerf.

According to at least one embodiment, an apparatus includes a substantially transparent substrate having at least one laser induced channel edge, wherein the at least one laser induced channel edge has a straightness along a cut line prior to separation of less than approximately 0.025 mm.

According to at least one embodiment, an apparatus including a substantially transparent substrate having at least one edge extending around at least a portion of a perimeter of the substantially transparent substrate, the improvement including wherein the at least one edge is a laser induced channel edge that has a straightness along a cut line prior to separation of less than approximately 0.025 mm.

According to at least one embodiment, a method of forming a substantially transparent substrate for use in an apparatus, the substantially transparent substrate having at least one edge extending around at least a portion of a perimeter of the substantially transparent substrate, the method comprising the steps of forming a plurality of laser induced channels in the substrate, and separating the substrate along the plurality of laser induced channels, wherein the at least one edge is a laser induced channel edge that has a straightness along a cut line prior to separation of less than approximately 0.025 mm.

According to at least one embodiment, a process for preparing a substantially transparent substrate for use in an apparatus, the a substantially transparent substrate having at least one edge extending around at least a portion of a perimeter of the substantially transparent substrate, the process comprising the steps of: forming a plurality of laser induced channels in the substrate, and separating the substrate along the plurality of laser induced channels, wherein the at least one edge is a laser induced channel edge that has a straightness along a cut line prior to separation of less than approximately 0.025 mm.

According to at least one embodiment, an apparatus including a substantially transparent substrate having at least one laser induced channel edge, wherein the at least one laser induced channel edge has a straightness along a cut line after separation of less than approximately 0.033 mm.

According to at least one embodiment, an apparatus including a substantially transparent substrate having at least one edge extending around at least a portion of a perimeter of the substantially transparent substrate, the improvement including wherein the at least one edge is a laser induced channel edge that has a straightness along a cut line after separation of less than approximately 0.033 mm.

According to at least one embodiment, a method of forming a substantially transparent substrate for use in an apparatus, the a substantially transparent substrate having at least one edge extending around at least a portion of a perimeter of the substantially transparent substrate, the method comprising the steps of: forming a plurality of laser induced channels in the substrate, and separating the substrate along the plurality of laser induced channels, wherein the at least one edge is a laser induced channel edge that has a straightness along a cut line after separation of less than approximately 0.033 mm.

According to at least one embodiment, a process for preparing a substantially transparent substrate for use in an apparatus, the a substantially transparent substrate having at least one edge extending around at least a portion of a perimeter of the substantially transparent substrate, the process comprising the steps of: forming a plurality of laser induced channels in the substrate, and separating the substrate along the plurality of laser induced channels, wherein the at least one edge is a laser induced channel edge that has a straightness along a cut line after separation of less than approximately 0.033 mm.

According to at least one embodiment, an apparatus includes a substantially transparent substrate having at least one laser induced channel edge, wherein the at least one laser induced channel edge has a straightness along a thickness of the at least one laser induced channel edge of less than approximately 0.010 mm.

According to at least one embodiment, an apparatus includes a substantially transparent substrate having at least one edge extending around at least a portion of a perimeter of the substantially transparent substrate, the improvement including: wherein the at least one edge is a laser induced channel edge that has a straightness along a thickness of the at least one laser induced channel edge of less than approximately 0.010 mm.

According to at least one embodiment, a method of forming a substantially, transparent substrate for use in an apparatus, the a substantially transparent substrate having at least one edge extending around at least a portion of a perimeter of the substantially transparent substrate, the method comprising the steps of: forming a plurality of laser induced channels in the substrate, and separating the substrate along the plurality of laser induced channels, wherein the at least one edge is a laser induced channel edge that has a straightness along a thickness of the at least one laser induced channel edge of less than approximately 0.010 mm.

According to at least one embodiment, a process for preparing a substantially transparent substrate for use in an apparatus, the a substantially transparent substrate having at least one edge extending around at least a portion of a perimeter of the substantially transparent substrate, the process comprising the steps of: forming a plurality of laser induced channels in the substrate, and separating the substrate along the plurality of laser induced channels, wherein the at least one edge is laser induced channel edge that has a straightness along a thickness of the at least one laser induced channel edge of less than approximately 0.010 mm.

According to at least one embodiment, an apparatus includes a substantially transparent substrate having at least one laser induced channel edge, wherein the at least one laser induced channel edge has a perpendicularity along a thickness of the at least one laser induced channel edge of less than approximately 0.025 mm.

According to at least one embodiment, an apparatus includes a substantially transparent substrate having at least one edge extending around at least a portion of a perimeter of the substantially transparent substrate, the improvement including wherein the at least one edge is a laser induced channel edge that has a perpendicularity along a thickness of the at least one laser induced channel edge of less than approximately 0.025 mm.

According to at least one embodiment, a method of forming a substantially transparent substrate for use in an apparatus, the a substantially transparent substrate having at least one edge extending around at least a portion of a perimeter of the substantially transparent substrate, the method comprising the steps of: forming a plurality of laser induced channels in the substrate, and separating the substrate along the plurality of laser induced channels, wherein the at least one edge is a laser induced channel edge that has a perpendicularity along a thickness of the at least one laser induced channel edge of less than approximately 0.025 mm.

According to at least one embodiment, a process for preparing a substantially transparent substrate for use in an apparatus, the a substantially transparent substrate having at least one edge extending around at least a portion of a perimeter of the substantially transparent substrate, the process comprising the steps of: forming a plurality of laser induced channels in the substrate, and separating the substrate along the plurality of laser induced channels, wherein the at least one edge is a laser induced channel edge that has a perpendicularity along a thickness of the at least one laser induced channel edge of less than approximately 0.025 mm.

According to at least one embodiment, an apparatus includes a substantially transparent substrate including at least one laser induced channel edge, wherein the at least one laser induced channel edge has a damage area extending from the laser induced channel edge inwards of less than approximately 0.09 mm.

According to at least one embodiment, an apparatus includes a substantially transparent substrate having at least one edge extending around at least a portion of a perimeter of the substantially transparent substrate, the improvement including wherein the at least one edge is a laser induced channel edge that has a damage area extending from the laser induced channel edge inwards of less than approximately 0.09 mm.

According to at least one embodiment, a method of forming a substantially transparent substrate for use in an apparatus, the a substantially transparent substrate having at least one edge extending around at least a portion of a perimeter of the substantially transparent substrate, the method comprising the steps of: forming a plurality of laser induced channels in the substrate, and separating the substrate along the plurality of laser induced channels, wherein the at least one edge is a laser induced channel edge that has a damage area extending from the laser induced channel edge inwards of less than approximately 0.09 mm.

According to at least one embodiment, a process for preparing a substantially transparent substrate for use in an apparatus, the a substantially transparent substrate having at least one edge extending around at least a portion of a perimeter of the substantially transparent substrate, the process comprising the steps of: forming a plurality of laser induced channels in the substrate, and separating the substrate along the plurality of laser induced channels, wherein the at least one edge is a laser induced channel edge that has a damage area extending from the laser induced channel edge inwards of less than approximately 0.09 mm.

According to at least one embodiment, an apparatus includes a substantially transparent substrate having a laser induced channel edge extending around a perimeter of the substantially transparent substrate, wherein the laser induced channel edge has a start/stop area that differs from a remaining portion of the laser induced channel edge.

According to at least one embodiment, an apparatus includes a substantially transparent substrate having at least one edge extending around a perimeter of the substantially transparent substrate, the improvement includes, wherein said at least one edge is a laser induced channel edge that has a perpendicularity along a thickness of the at least one laser induced channel edge has a start/stop area that differs from a remaining portion of the laser induced channel edge.

According to at least one embodiment, a method of forming a substantially transparent substrate for use in an apparatus, the a substantially transparent substrate having at least one edge extending around at least a portion of a perimeter of the substantially transparent substrate, the method comprising the steps of: forming a plurality of laser induced channels in the substrate, and separating the substrate along the plurality of laser induced channels, wherein the at least one edge is a laser induced channel edge that has a perpendicularity along a thickness of the at least one laser induced channel edge has a start/stop area that differs from a remaining portion of the laser induced channel edge.

According to at least one embodiment, a process for preparing a substantially transparent substrate for use in an apparatus, the a substantially transparent substrate having at least one edge extending around at least a portion of a perimeter of the substantially transparent substrate, the process comprising the steps of: forming a plurality of laser induced channels in the substrate, and separating the substrate along the plurality of laser induced channels, wherein the at least one edge is a laser induced channel edge that has a perpendicularity along a thickness of the at least one laser induced channel edge has a start/stop area that differs from a remaining portion of the laser induced channel edge.

According to at least one embodiment, an apparatus includes a substantially transparent substrate including a first surface, a second surface, and a plurality of laser induced channels extending from the first surface towards the second surface, wherein at least a portion of the laser induced channels are adjacent to one another, such that at least a portion of the laser induced channels form one of a line of laser induced channels and an array of laser induced channels.

According to at least one embodiment, an apparatus includes a substantially transparent substrate having a first surface and a second surface, the improvement including, wherein a plurality of laser induced channels extending from the first surface towards the second surface, wherein at least a portion of the laser induced channels are adjacent to one another, such that at least a portion of the laser induced channels form one of a line of laser induced channels and an array of laser induced channels.

According to at least one embodiment, a method of forming a substantially transparent substrate for use in an apparatus, the a substantially transparent substrate having a first surface and a second surface, the method comprising the steps of: forming a plurality of laser induced channels in the substrate, wherein the plurality of laser induced channels extend from the first surface towards the second surface, wherein at least a portion of the laser induced channels are adjacent to one another, such that at least a portion of the laser induced channels form one of a line of laser induced channels and an array of laser induced channels.

According to at least one embodiment, a process for preparing a substantially transparent substrate for use in an apparatus, the a substantially transparent substrate having a first surface and a second surface, the process comprising the steps of: forming a plurality of laser induced channels in the substrate, wherein the plurality of laser induced channels extending from the first surface towards the second surface, wherein at least a portion of the laser induced channels are adjacent to one another, such that at least a portion of the laser induced channels form one of a line of laser induced channels and an array of laser induced channels.

According to at least one embodiment, an electrochromic rearview assembly includes a first substrate, a second substrate, wherein the first substrate and the second substrate define a cavity, and an electro-optic medium at least partially the cavity, wherein at least one of the first and second substrates being a substantially transparent substrate comprising at least one laser induced channel edge, wherein the at least one laser induced channel edge comprises a plurality of laser induced channels continuously extending from an entry surface of at least one of the first substrate and the second substrate to a depth thereof.

According to at least one embodiment, an electro-optic assembly includes a first substrate, a second substrate, wherein the first substrate and the second substrate define a cavity, and an electro-optic medium at least partially the cavity, wherein at least one of the first and second substrates being a substantially transparent substrate comprising at least one laser induced channel edge, wherein the at least one laser induced channel edge comprises a plurality of laser induced channels continuously extending from an entry surface of at least one of the first substrate and the second substrate to a depth thereof, wherein at least a portion of the plurality of laser induced channels are substantially equally spaced.

According to at least one embodiment, an apparatus includes a substantially transparent substrate comprising at least one laser induced channel edge, wherein the at least one laser induced channel edge comprises a plurality of laser induced channels continuously extending from an entry surface of at least one of the first substrate and the second substrate to a depth thereof, wherein at least a portion of the plurality of laser induced channels are substantially equally spaced, wherein a roughness of the at least one laser induced channel edge across a thickness is an Rq value of less than approximately 1.6 after being formed without post edge formation processing.

The apparatus, method, or process of any embodiment described herein, wherein the at least one laser induced channel edge comprises a plurality of laser induced channels.

The apparatus, method, or process of any embodiment described herein, wherein a roughness of the at least one laser induced channel edge across a thickness is an Rq value of less than approximately 1.6.

The apparatus, method, or process of any embodiment described herein, wherein a roughness of the at least one laser induced channel edge across a thickness is an Rq value of less than approximately 1.5.

The apparatus, method, or process of any embodiment described herein, wherein a roughness of the at least one laser induced channel edge across a thickness is an Rq value of less than approximately 1.3.

The apparatus, method, or process of any embodiment described herein, wherein a roughness of the at least one laser induced channel edge across a thickness is an Rq value of less than approximately 1.2.

The apparatus, method, or process of any embodiment described herein, wherein a roughness of the at least one laser induced channel edge across a thickness is an Rq value ranging from and including approximately 1.0 to approximately 1.5.

The apparatus, method, or process of any embodiment described herein, wherein a roughness of the at least one laser induced channel edge across a thickness is an Rq value ranging from and including approximately 1.1 to approximately 1.4.

The apparatus, method, or process of any embodiment described herein, wherein the first portion has a roughness across the path having an Rq value of less than approximately 1.0.

The apparatus, method, or process of any embodiment described herein, wherein the first portion has a roughness across the path having an Rq value of less than approximately 0.9.

The apparatus, method, or process of any embodiment described herein, wherein the first portion has a roughness across the path having an Rq value of less than approximately 0.7.

The apparatus, method, or process of any embodiment described herein, wherein the first portion has a roughness across the path having an Rq value of less than approximately 0.5.

The apparatus, method, or process of any embodiment described herein, wherein the first portion has a roughness across the path having an Rq value ranging from and including approximately 0.6 and approximately 0.9.

The apparatus, method, or process of any embodiment described herein, wherein the second portion has a roughness across the path having an Rq value of less than approximately 1.6.

The apparatus, method, or process of any embodiment described herein, wherein the second portion has a roughness across the path having an Rq value of less than approximately 1.5.

The apparatus, method, or process of any embodiment described herein, wherein the second portion has a roughness across the path having an Rq value of less than approximately 1.4.

The apparatus, method, or process of any embodiment described herein, wherein the second portion has a roughness across the path having an Rq value ranging from and including approximately 1.0 to approximately 1.6.

The apparatus, method, or process of any embodiment described herein, wherein the second portion has a roughness across the path having an Rq value ranging from and including approximately 1.1 to approximately 1.5.

The apparatus, method, or process of any embodiment described herein, wherein the second portion has a roughness across the path having an Rq value ranging from and including approximately 1.2 to approximately 1.4.

The apparatus, method, or process of any embodiment described herein, wherein the third portion has a roughness across the path having an Rq value of less than approximately 1.5.

The apparatus, method, or process of any embodiment described herein, wherein the third portion has a roughness across the path having an Rq value of less than approximately 1.0.

The apparatus, method, or process of any embodiment described herein, wherein the third portion has a roughness across the path having an Rq value of less than approximately 0.9.

The apparatus, method, or process of any embodiment described herein, wherein the third portion has a roughness across the path having an Rq value ranging from and including approximately 0.6 to approximately 1.5.

The apparatus, method, or process of any embodiment described herein, wherein the third portion has a roughness across the path having an Rq value ranging from and including approximately 0.7 to approximately 1.1.

The apparatus, method, or process of any embodiment described herein, wherein the third portion has a roughness across the path having Rq value ranging from and including approximately 0.8 to approximately 1.0.

The apparatus, method, or process of any embodiment described herein, wherein the path is substantially perpendicular to the plurality of laser induced channels.

The apparatus, method, or process of any embodiment described herein, wherein the at least one laser induced channel edge has less than approximately 230 deformations per 1.75 mm².

The apparatus, method, or process of any embodiment described herein, wherein the at least one laser induced channel edge has less than approximately 200 deformations per 1.75 mm².

The apparatus, method, or process of any embodiment described herein, wherein the at least one laser induced channel edge has less than approximately 150 deformations per 1.75 mm².

The apparatus, method, or process of any embodiment described herein, wherein the at least one laser induced channel edge has less than approximately 100 deformations per 1.75 mm².

The apparatus, method, or process of any embodiment described herein, wherein the at least one laser induced channel edge has less than approximately 50 deformations per 1.75 mm².

The apparatus, method, or process of any embodiment described herein, wherein the at least one laser induced channel edge ranging from and including approximately 50 deformations to approximately 220 deformations per 1.75 mm².

The apparatus, method, or process of any embodiment described herein, wherein the at least one laser induced channel edge ranging from and including approximately 50 deformations to approximately 200 deformations per 1.75 mm².

The apparatus, method, or process of any embodiment described herein, wherein the at least one laser induced channel edge ranging from and including approximately 50 deformations to approximately 150 deformations per 1.75 mm².

The apparatus, method, or process of any embodiment described herein, wherein the at least one laser induced channel edge ranging from and including approximately 50 deformations to approximately 100 deformations per 1.75 mm².

The apparatus, method, or process of any embodiment described herein, wherein the laser induced channel edge is formed without post edge formation processing.

The apparatus, method, or process of any embodiment described herein, wherein a plurality of apparatus each having at least one laser induced channel edge have a hoop stress probability slop of greater than approximately 8.5.

The apparatus, method, or process of any embodiment described herein, wherein a plurality of apparatus each having at least one laser induced channel edge have a hoop stress probability slop of greater than approximately 10.

The apparatus, method, or process of any embodiment described herein, wherein a plurality of apparatus each having at least one laser induced channel edge have a hoop stress probability slop of greater than approximately 15.

The apparatus, method, or process of any embodiment described herein, wherein a plurality of apparatus each having at least one laser induced channel edge have a hoop stress probability slop of approximately 18.21.

The apparatus, method, or process of any embodiment described herein, wherein essentially zero kerf is a kerf of less than approximately 0.005 mm.

The apparatus, method, or process of any embodiment described herein, wherein essentially zero kerf is a kerf of less than approximately 0.004 mm.

The apparatus, method, or process of any embodiment described herein, wherein essentially zero kerf is a kerf of less than approximately 0.004 mm.

The apparatus, method, or process of any embodiment described herein, wherein essentially zero kerf is a kerf of less than approximately 0.0035 mm.

The apparatus, method, or process of any embodiment described herein, wherein essentially zero kerf is a kerf of less than approximately 0.0031 mm.

The apparatus, method, or process of any embodiment described herein, wherein essentially zero kerf is a width difference of less than approximately 0.086 mm.

The apparatus, method, or process of any embodiment described herein, wherein essentially zero kerf is a width difference of less than approximately 0.080 mm.

The apparatus, method, or process of any embodiment described herein, wherein essentially zero kerf is a width difference of less than approximately 0.060 mm.

The apparatus, method, or process of any embodiment described herein, wherein essentially zero kerf is a width difference of less than approximately 0.040 mm.

The apparatus, method, or process of any embodiment described herein, wherein essentially zero kerf is a width difference of less than approximately 0.020 mm.

The apparatus, method, or process of any embodiment described herein, wherein essentially zero kerf is a width difference of less than approximately 0.010 mm.

The apparatus, method, or process of any embodiment described herein, wherein the at least one laser induced channel edge has a straightness before separation of less than approximately 0.025 mm.

The apparatus, method, or process of any embodiment described herein, wherein the at least one laser induced channel edge has a straightness before separation of less than approximately 0.020 mm.

The apparatus, method, or process of any embodiment described herein, wherein the at least one laser induced channel edge has a straightness before separation of less than approximately 0.010 mm.

The apparatus, method, or process of any embodiment described herein, wherein the at least one laser induced channel edge has a straightness before separation of less than approximately 0.004 mm.

The apparatus, method, or process of any embodiment described herein, wherein the at least one laser induced channel edge has a straightness before separation of less than approximately 0.020 mm.

The apparatus, method, or process of any embodiment described herein, wherein the at least one laser induced channel edge has a straightness after separation of less than approximately 0.033 mm.

The apparatus, method, or process of any embodiment described herein, wherein the at least one laser induced channel edge has a straightness after separation of less than approximately 0.030 mm.

The apparatus, method, or process of any embodiment described herein, wherein the at least one laser induced channel edge has a straightness after separation of less than approximately 0.025 mm.

The apparatus, method, or process of any embodiment described herein, wherein the at least one laser induced channel edge has a straightness after separation of less than approximately 0.020 mm.

The apparatus, method, or process of any embodiment described herein, wherein the at least one laser induced channel edge has a straightness after separation of less than approximately 0.015 mm.

The apparatus, method, or process of any embodiment described herein, wherein the at least one laser induced channel edge has a straightness after separation of less than approximately 0.012 mm.

The apparatus, method, or process of any embodiment described herein, wherein the at least one laser induced channel edge along a thickness of the at least one laser induced channel edge has a straightness of less than approximately 0.010 mm.

The apparatus, method, or process of any embodiment described herein, wherein the at least one laser induced channel edge along a thickness of the at least one laser induced channel edge has a straightness of less than approximately 0.008 mm.

The apparatus, method, or process of any embodiment described herein, wherein the at least one laser induced channel edge along a thickness of the at least one laser induced channel edge has a straightness of less than approximately 0.006 mm.

The apparatus, method, or process of any embodiment described herein, wherein the at least one laser induced channel edge along a thickness of the at least one laser induced channel edge has a straightness of less than approximately 0.004 mm.

The apparatus, method, or process of any embodiment described herein, wherein the straightness is a deviation of each measure point from a measured lined and a difference between an approximate minimum and approximate minimum deviation.

The apparatus, method, or process of any embodiment described herein, wherein a perpendicularity along a thickness of the at least one laser induced channel edge of less than approximately 0.025 mm.

The apparatus, method, or process of any embodiment described herein, wherein a perpendicularity along a thickness of the at least one laser induced channel edge of less than approximately 0.020 mm.

The apparatus, method, or process of any embodiment described herein, wherein a perpendicularity along a thickness of the at least one laser induced channel edge of less than approximately 0.015 mm.

The apparatus, method, or process of any embodiment described herein, wherein a perpendicularity along a thickness of the at least one laser induced channel edge of less than approximately 0.010 mm.

The apparatus, method, or process of any embodiment described herein, wherein a perpendicularity along a thickness of the at least one laser induced channel edge of less than approximately 0.006 mm.

The apparatus, method, or process of any embodiment described herein, wherein the perpendicularity is a substantially minimum diameter cylinder that is substantially perpendicular to the substantially transparent substrate.

The apparatus, method, or process of any embodiment described herein, wherein the at least one laser induced channel edge has a damage area extending from the laser induced channel edge inwards of less than approximately 0.09 mm.

The apparatus, method, or process of any embodiment described herein, wherein the at least one laser induced channel edge has a damage area extending from the laser induced channel edge inwards of less than approximately 0.07 mm.

The apparatus, method, or process of any embodiment described herein, wherein the at least one laser induced channel edge has a damage area extending from the laser induced channel edge inwards of less than approximately 0.05 mm.

The apparatus, method, or process of any embodiment described herein, wherein the at least one laser induced channel edge has a damage area extending from the laser induced channel edge inwards of less than approximately 0.03 mm.

The apparatus, method, or process of any embodiment described herein, wherein the at least one laser induced channel edge has a damage area extending from the laser induced channel edge inwards of less than approximately 0.01 mm.

The apparatus, method, or process of any embodiment described herein, wherein the at least one laser induced channel edge has a damage area extending from the laser induced channel edge inwards ranging from and including approximately 0.01 mm to approximately 0.09 mm.

The apparatus, method, or process of any embodiment described herein, wherein the at least one laser induced channel edge has a damage area extending from the laser induced channel edge inwards ranging from and including approximately 0.01 mm to approximately 0.07 mm.

The apparatus, method, or process of any embodiment described herein, wherein the at least one laser induced channel edge has a damage area extending from the laser induced channel edge inwards ranging from and including approximately 0.01 mm to approximately 0.05 mm.

The apparatus, method, or process of any embodiment described herein, wherein the start/stop area is less than approximately 2 mm.

The apparatus, method, or process of any embodiment described herein, wherein the start/stop area is less than approximately 1 mm.

The apparatus, method, or process of any embodiment described herein, wherein the start/stop area ranges from and includes approximately 5 microns to 2 mm.

The apparatus, method, or process of any embodiment described herein, wherein the start/stop area ranges from and includes approximately 10 microns to 1 mm.

The apparatus, method, or process of any embodiment described herein, wherein the start/stop area comprises more laser induced channels than the remaining portion of the laser induced channel edge.

The apparatus, method, or process of any embodiment described herein, wherein the start/stop area comprises less laser induced channels than the remaining portion of the laser induced channel edge.

The apparatus, method, or process of any embodiment described herein, further comprising at least one of forming laser induced channel edges in a plurality of lites, dual glass sag bending, bent lite, forming a stopper for a plug, coating the substantially transparent substrate without washing, array processing, vision system, and cut and finish.

The apparatus, method, or process of any embodiment described herein, wherein the at least one laser induced channel edge defines a hole in the substantially transparent substrate.

The apparatus, method, or process of any embodiment described herein, wherein a portion of the substantially transparent substrate that forms the hole is re-inserted into the substantially transparent substrate.

The apparatus, method, or process of any embodiment described herein, wherein the hole is at least partially filled with a conductive material.

The apparatus, method, or process of any embodiment described herein, wherein the apparatus is an electrochromic mirror comprising a first substantially transparent substrate and a second substantially transparent substrate, wherein the first substantially transparent substrate has an angled laser induced channel edge.

The apparatus, method, or process of any embodiment described herein, wherein electrochromic mirror has a reduced perceived seal width.

The apparatus, method, or process of any embodiment described herein, wherein the at least one laser induced channel edge is angled.

The apparatus, method, or process of any embodiment described herein, wherein the laser induced channels are substantially equally spaced.

The apparatus, method, or process of any embodiment described herein, wherein the laser induced channels have a diameter of approximately 1 micron.

The apparatus, method, or process of any embodiment described herein, wherein the laser induced channels are spaced approximately 3 microns.

The apparatus, method, or process of any embodiment described herein, wherein the laser induced channels are spaced approximately 5 microns.

The apparatus, method, or process of any embodiment described herein, wherein the laser induced channels are spaced approximately 10 microns.

The apparatus, method, or process of any embodiment described herein, wherein the laser induced channel is continuous.

The apparatus, method, or process of any embodiment described herein, wherein a plurality of laser induce channels extend from an entry surface to an approximately equal depth.

The apparatus, method, or process of any embodiment described herein, wherein a plurality of laser induced channels extend from an entry surface to different depths.

The apparatus, method, or process of any embodiment described herein, wherein the laser induced channel edge defines a notch.

The apparatus, method, or process of any embodiment described herein, wherein the laser induced channel edge defines an area for at least one of a button, a sensor, a connector, a microphone, a speaker, a camera, an antennae, a transmitter, a receiver, a vent, a switch, and a light source.

The apparatus, method, or process of any embodiment described herein, wherein the laser induced channel edge has frosted appearance.

The apparatus, method, or process of any embodiment described herein, wherein an entry surface of the substantially transparent substrate having a laser induced channel has a halo surrounding the laser induced channel.

The apparatus, method, or process of any embodiment described herein, further comprising separating a substrate having a laser induce channel line by at least one of heating and cooling at least one of a first portion and a second portion.

The apparatus, method, or process of any embodiment described herein, wherein the substantially transparent substrate is porous from a first surface to a second surface based upon one or more the laser induce channels.

The apparatus, method, or process of any embodiment described herein, wherein the substantially transparent substrate is porous from a first surface to a second surface based upon at least two the laser induce channels connected by a fracture.

The apparatus, method, or process of any embodiment described herein, wherein the hole defined by a laser induced channel edge is one of a circle, oval, square, rectangle, a notch, a semi-circle, and slot.

The apparatus, method, or process of any embodiment described herein, wherein the apparatus is an electro-optic mirror comprising a first substrate having a laser induced channel edge that defines an area configured to at least partially encompass a microphone.

The apparatus, method, or process of any embodiment described herein, wherein the apparatus has the laser induced channel edge with an inside radius of less than approximately 25 mm.

The apparatus, method, or process of any embodiment described herein, wherein the apparatus has the laser induced channel edge with an inside radius of less than approximately 20 mm.

The apparatus, method, or process of any embodiment described herein, wherein the apparatus has the laser induced channel edge with an inside radius of less than approximately 15 mm.

The apparatus, method, or process of any embodiment described herein, wherein the apparatus has the laser induced channel edge with an inside radius of less than approximately 10 mm.

The apparatus, method, or process of any embodiment described herein, wherein the apparatus has the laser induced channel edge with an inside radius of less than approximately 5 mm.

The apparatus, method, or process of any embodiment described herein, wherein the apparatus has the laser induced channel edge with an inside radius of approximately, zero.

The apparatus, method, or process of any embodiment described herein, wherein transparency of the substantially transparent substrate is based upon the wavelength of light from a laser used to form the laser induced channels.

The apparatus, method, or process of any embodiment described herein, wherein the apparatus is an electro-optic assembly having a first substantially transparent substrate and a second substantially transparent substrate, and at least one of the first substantially transparent substrate and the second substantially transparent substrate comprise a laser induced channel edge.

The apparatus, method, or process of any embodiment described herein, wherein the substantially transparent substrate is one of soda-lime float glass, alkaline earth boro-aluminosilacate glass, alkali-aluminosilcate glass, chemically strengthened glass, insulated glass, tempered glass, sapphire, silicon, silicon carbide, compound semiconductor, optical crystals, liquid crystal substrate, diamond, tempered glass, quartz, and ceramic.

The apparatus, method, or process of any embodiment described herein, wherein the apparatus is one of an electro-optic device, an interior electrochromic mirror, an exterior electrochromic mirror, an aircraft electrochromic window, an architectural electrochromic window, a lens cover, a display cover, a display, a microscope slide, cover glass, a mobile phone component, a DNA slide, a bar code, a stain glass window, a light emitting diode, a data storage device, a sandwich assembly comprising a plurality of substantially transparent substrates, safety glasses, eye glasses, organic light emitting diodes, watch, a spring, a two-piece spotter mirror, a curved mirror, a flat-to-curved mirror, an aspheric mirror, an interposer, and a household device.

It should be appreciated by those skilled in the art that the above headers are for example only, and that any of the embodiments described herein can be combined with one another. It should further be appreciated by those skilled in the art that the examples as to electrochromic devices herein are for purposes of explanation and not limitation, such that the device can be any device having a substrate that is subject to laser induced channels.

Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

What is claimed is:

1. An apparatus, comprising:
a transparent substrate comprising oppositely facing surfaces; and
a laser-induced channel edge extending between the oppositely facing surfaces of the transparent substrate, the laser-induced channel edge comprising a plurality of laser-induced channels spaced discretely along the substrate and extending at least partially between the oppositely facing surfaces;
wherein each of the plurality of laser-induced channels forms an oblique angle with at least one of the oppositely facing surfaces;
wherein the plurality of laser-induced channels at least partially define a separation surface extending between the oppositely facing surfaces, the separation surface having at least one of (i) a roughness with an associated Rq value of less than 1.6 after being formed without post-formation processing or (ii) a straightness of less than 0.025 millimeters upon separation; and
wherein the laser-induced channel edge comprises a radius that is less than 25 millimeters.

2. The apparatus of claim 1, wherein each of the plurality of laser-induced channels continuously extends from one of the oppositely facing surfaces toward the other of the oppositely facing surfaces at the oblique angle.

3. The apparatus of claim 2, wherein one of the oppositely facing surfaces is an entry surface and the plurality of laser-induced channels continuously extends from the entry surface toward the other of the oppositely facing surfaces at the oblique angle.

4. The apparatus of claim 1, wherein each of the plurality of laser-induced channels continuously extends from one of the surfaces to the other of the surfaces at the oblique angle such that each of the plurality of laser-induced channels has a length greater than a thickness of the transparent substrate.

5. The apparatus of claim 1, wherein the plurality of laser-induced channels are spaced equally along the laser-induced channel edge.

6. An apparatus, comprising:
a substrate comprising oppositely facing surfaces; and
a plurality of laser-induced channels spaced discretely along the substrate and extending at least partially between the oppositely facing surfaces;
wherein each of the plurality of laser-induced channels forms an oblique angle with at least one of the oppositely facing surfaces; and
wherein the plurality of laser-induced channels at least partially define a separation surface extending between the oppositely facing surfaces, the separation surface having at least one of (i) a roughness with an associated Rq value of less than 1.6 after being formed without post-formation processing or (ii) a straightness of less than 0.025 millimeters upon separation.

7. The apparatus of claim 6, wherein the separation surface comprises a radius that is less than 25 millimeters.

8. The apparatus of claim 1, wherein the apparatus is one of the following: an electro-optic device, an interior electrochromic mirror, an exterior electrochromic mirror, an aircraft electrochromic window, an architectural electrochromic window, a lens cover, a display cover, a display, a microscope slide, cover glass, a mobile phone component, a DNA slide, a bar code, a stain glass window, a light emitting diode, a data storage device, a sandwich assembly comprising a plurality of substantially transparent substrates, safety glasses, eye glasses, organic light emitting diodes, watch, a spring, a two-piece spotter mirror, a curved mirror, a flat-to-curved mirror, an aspheric mirror, an interposer, or a household device.

9. A method comprising:
providing a substrate comprising oppositely facing surfaces;
forming a plurality of laser-induced channels spaced discretely along the substrate and extending at least partially between the oppositely facing surfaces; and
separating the substrate into pieces along a separation surface extending between the oppositely facing surfaces, wherein the plurality of laser-induced channels at least partially define the separation surface, the separation surface having at least one of (i) a roughness with an associated Rq value of less than 1.6 after being formed without post-formation processing or (ii) a straightness of less than 0.025 millimeters upon separation.

10. The method of claim 9, wherein the plurality of laser-induced channels is formed at an oblique angle with respect to one or both of the oppositely facing surfaces of the substrate.

11. The method of claim 9, wherein one of the pieces is an interior portion of the substrate.

12. The method of claim 9, further comprising changing the temperature of at least a portion of the substrate after forming the plurality of laser-induced channels to facilitate separating the substrate into the pieces.

13. The method of claim 9, wherein the plurality of laser-induced channels continuously extends from one of said surfaces toward the other of said surfaces at an oblique angle.

14. The method of claim 9, wherein one of the oppositely facing surfaces is an entry surface and the plurality of laser-induced channels continuously extends from the entry surface toward the other of the oppositely facing surfaces at an oblique angle.

15. The method of claim 9, wherein the plurality of laser-induced channels continuously extends from one of said surfaces to the other of said surfaces at an oblique angle such that each of the plurality of laser-induced channels has a length greater than a substrate thickness.

16. The method of claim 9, wherein the separation surface comprises a radius that is less than 25 millimeters.

17. The method of claim 9, wherein separating the substrate into the pieces includes forming an opening through the substrate.

18. The method of claim 9, wherein the plurality of laser-induced channels are equally spaced along the substrate.

* * * * *